May 11, 1937.  S. J. FINN  2,080,037
MACHINE FOR APPLYING PRESSURE TO SHOE BOTTOMS
Filed March 23, 1935  14 Sheets-Sheet 1

INVENTOR_
Sidney J. Finn
By his Attorney
Harlow M. Davis

INVENTOR
Sidney J. Finn
By his Attorney,
Harlow M. Davis

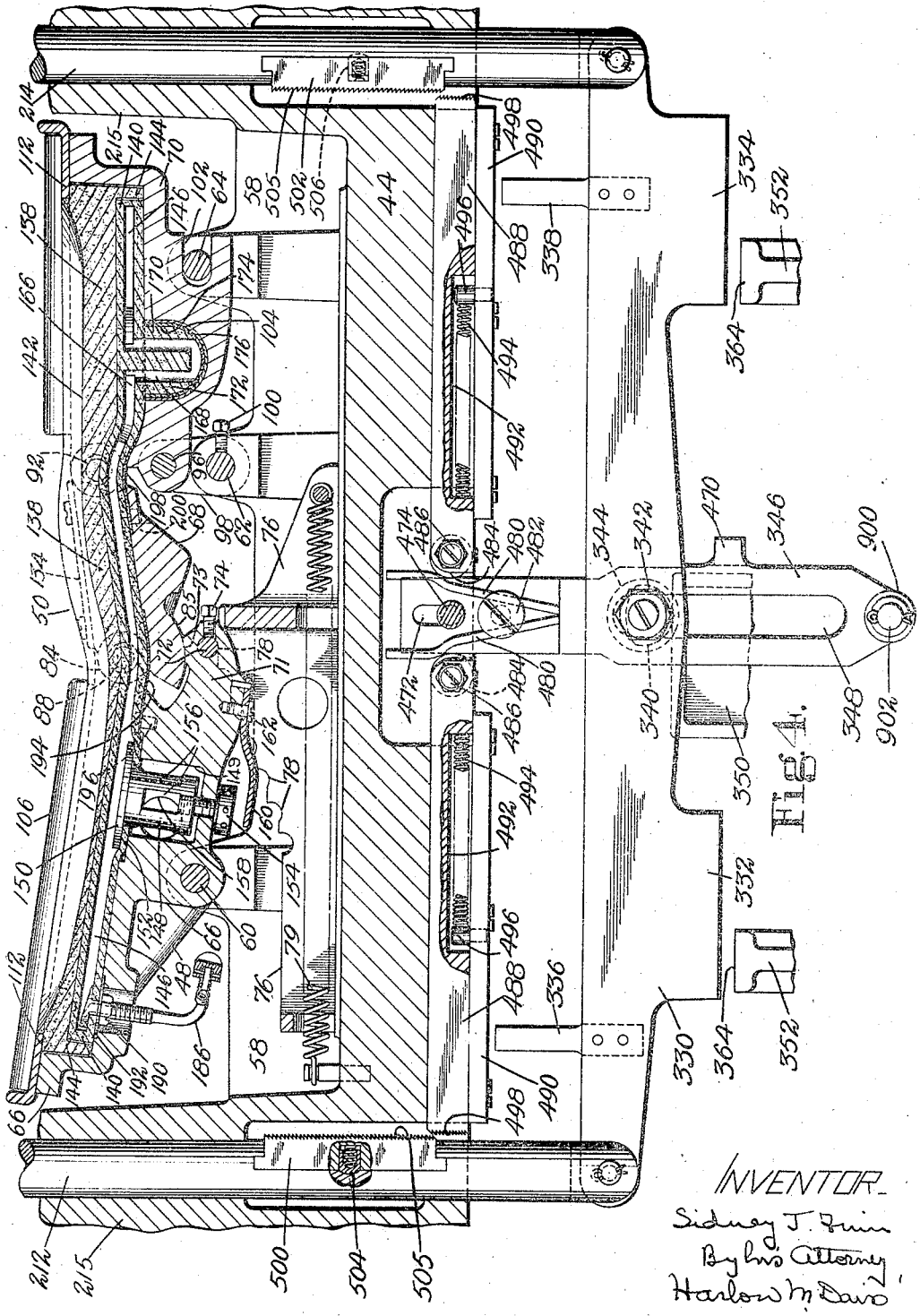

May 11, 1937.  S. J. FINN  2,080,037
MACHINE FOR APPLYING PRESSURE TO SHOE BOTTOMS
Filed March 23, 1935  14 Sheets-Sheet 5
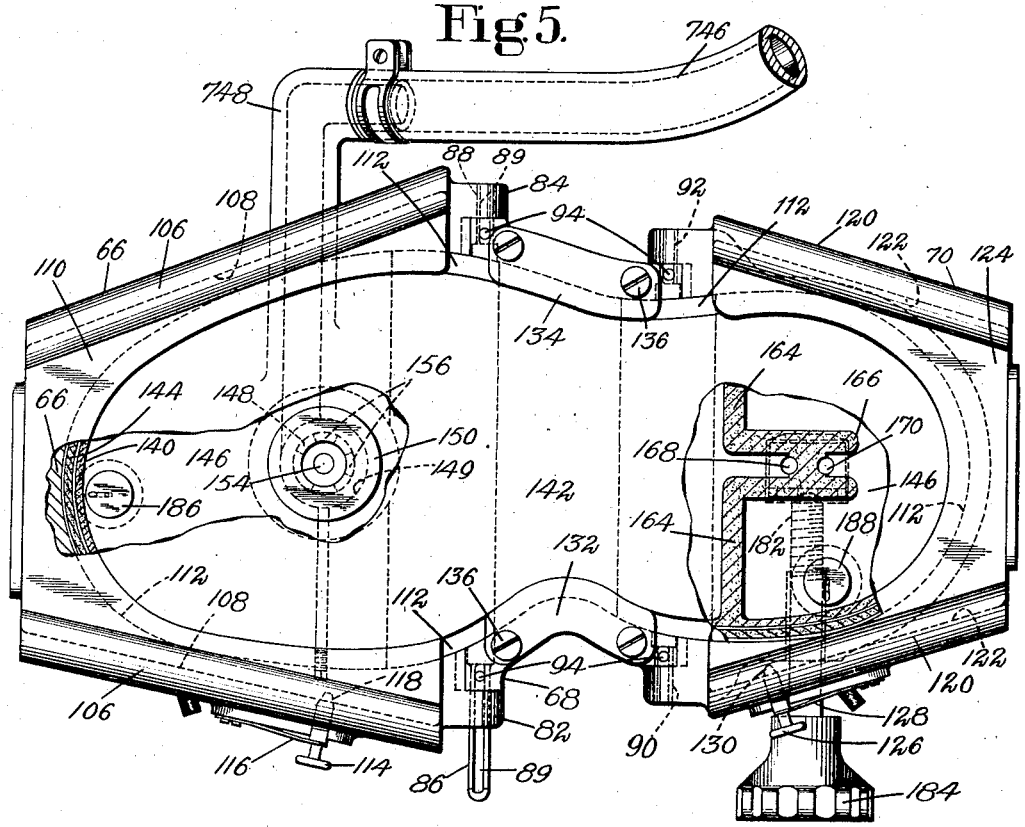

May 11, 1937. S. J. FINN 2,080,037
MACHINE FOR APPLYING PRESSURE TO SHOE BOTTOMS
Filed March 23, 1935 14 Sheets-Sheet 6
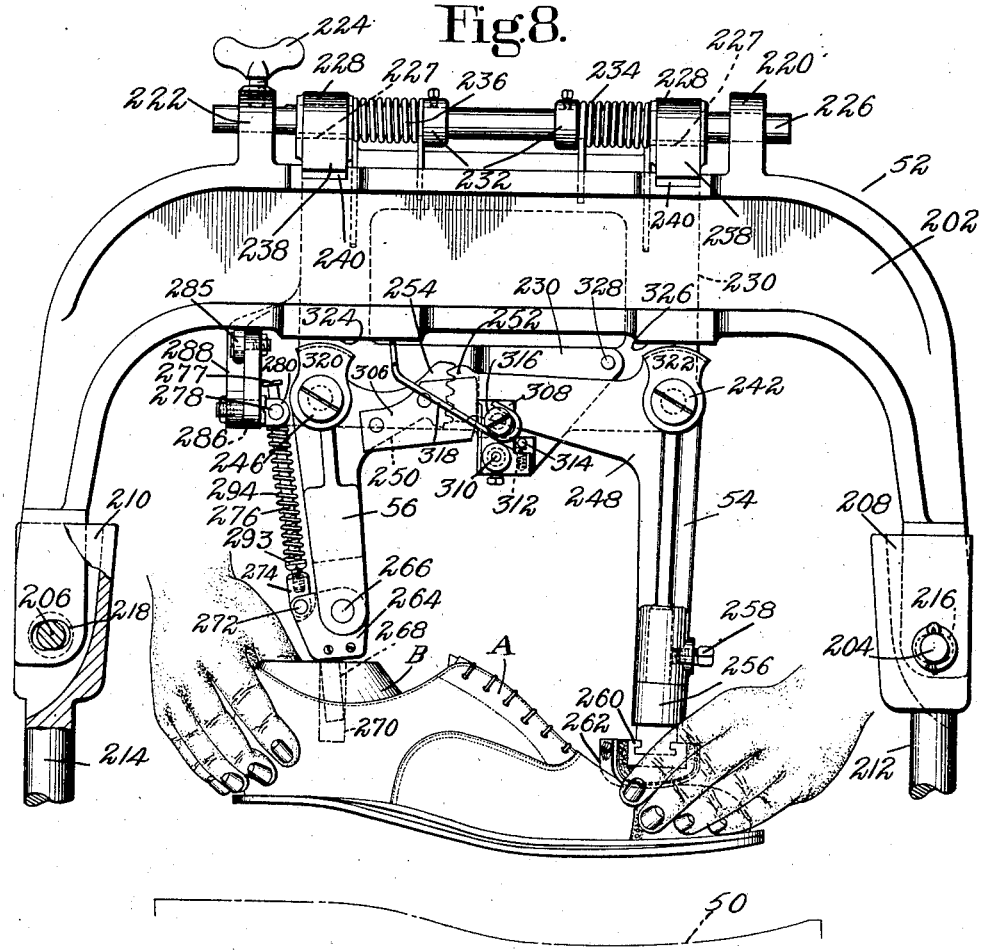
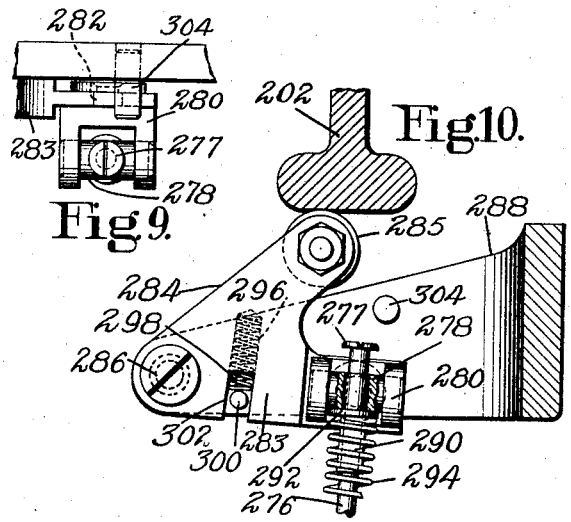
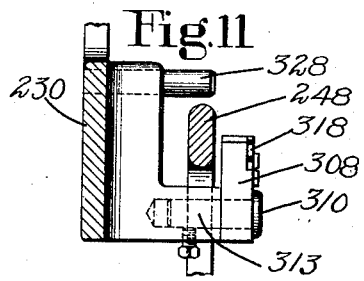
INVENTOR
Sidney J. Finn
By his Attorney
Harlow B. Davis May 11, 1937.  S. J. FINN  2,080,037
MACHINE FOR APPLYING PRESSURE TO SHOE BOTTOMS
Filed March 23, 1935  14 Sheets-Sheet 7
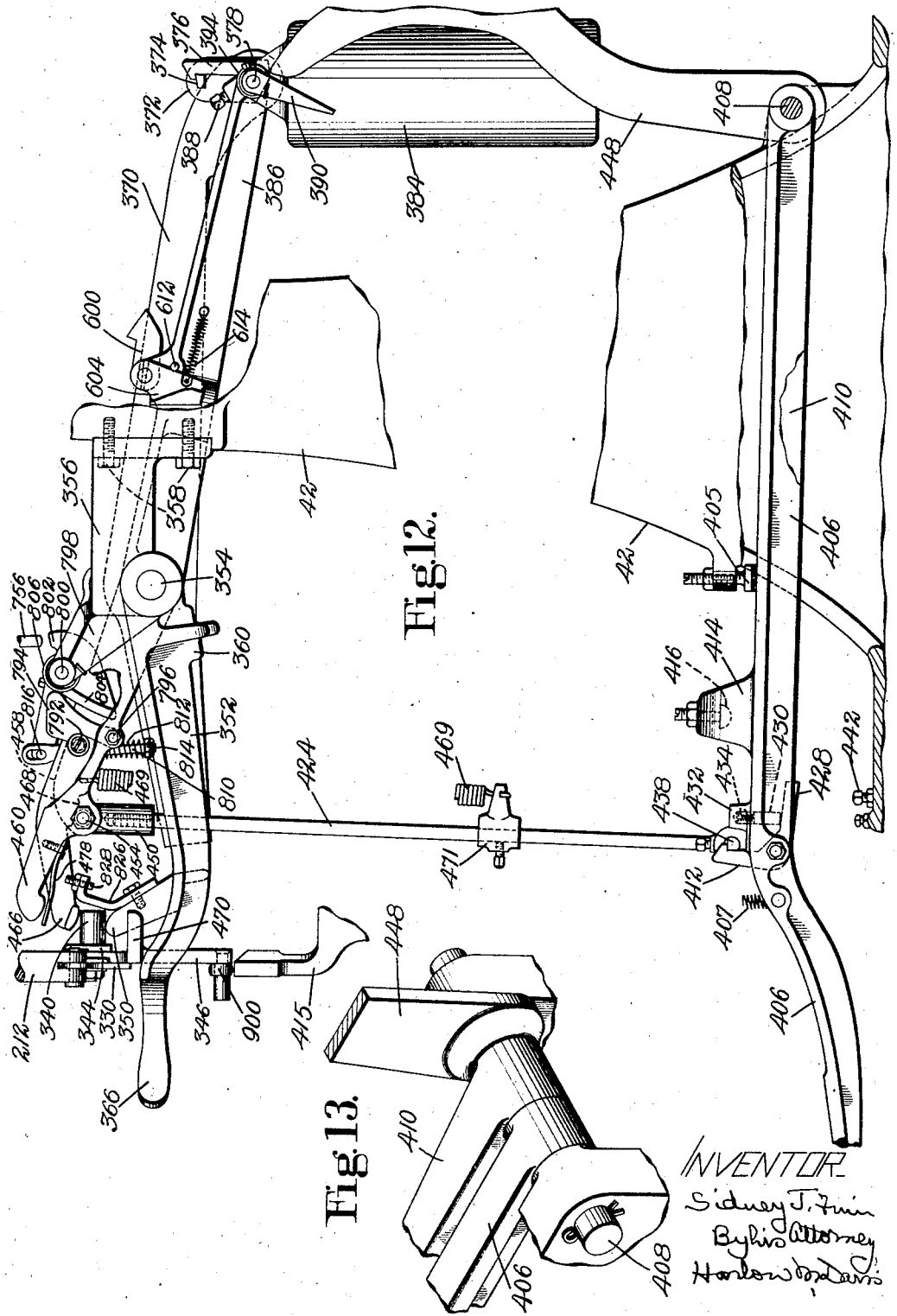

May 11, 1937.  S. J. FINN  2,080,037
MACHINE FOR APPLYING PRESSURE TO SHOE BOTTOMS
Filed March 23, 1935  14 Sheets-Sheet 8
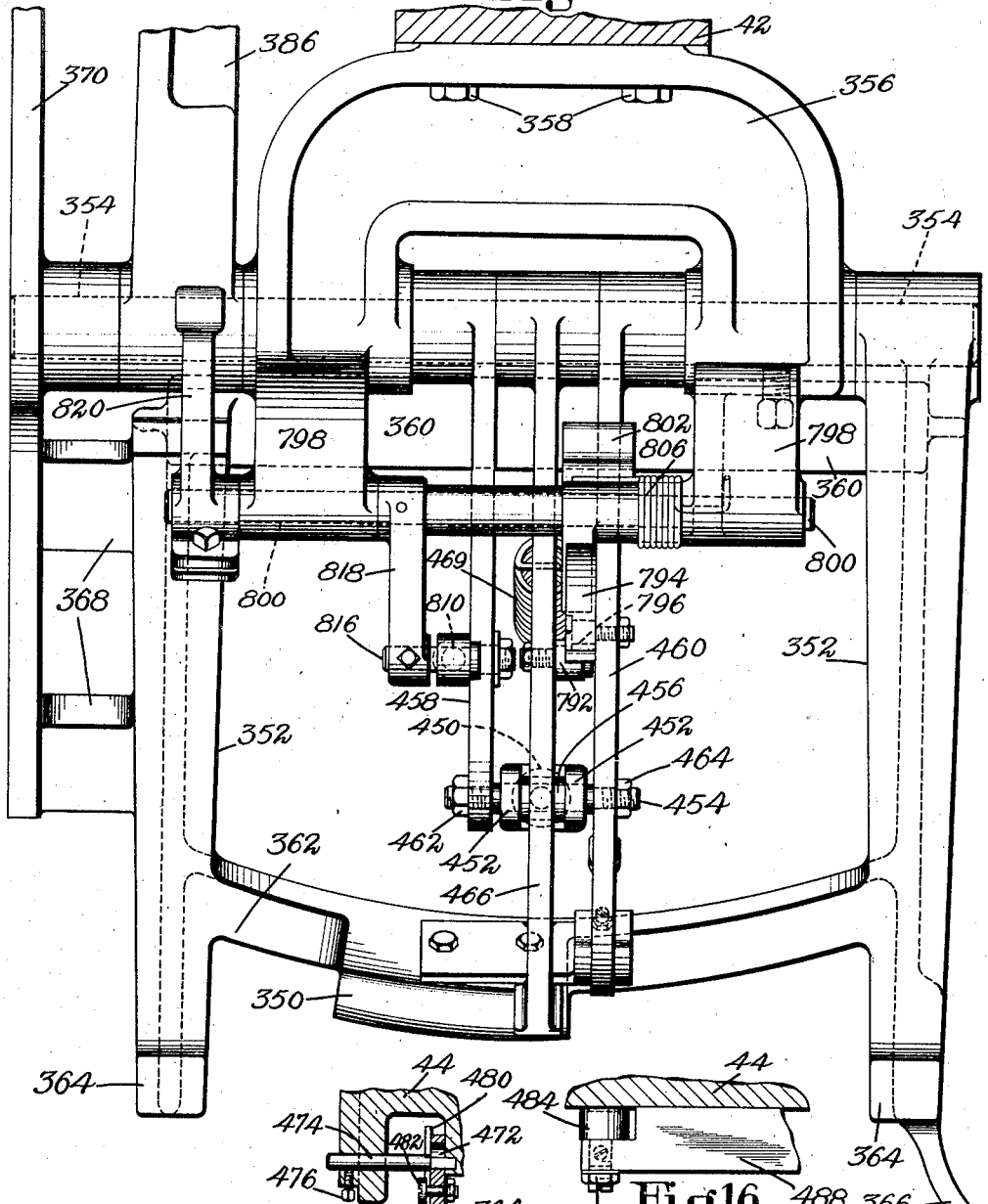
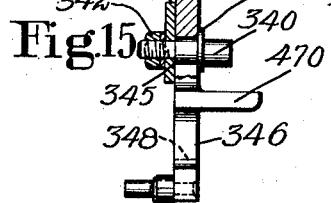

May 11, 1937. S. J. FINN 2,080,037
MACHINE FOR APPLYING PRESSURE TO SHOE BOTTOMS
Filed March 23, 1935 14 Sheets-Sheet 9
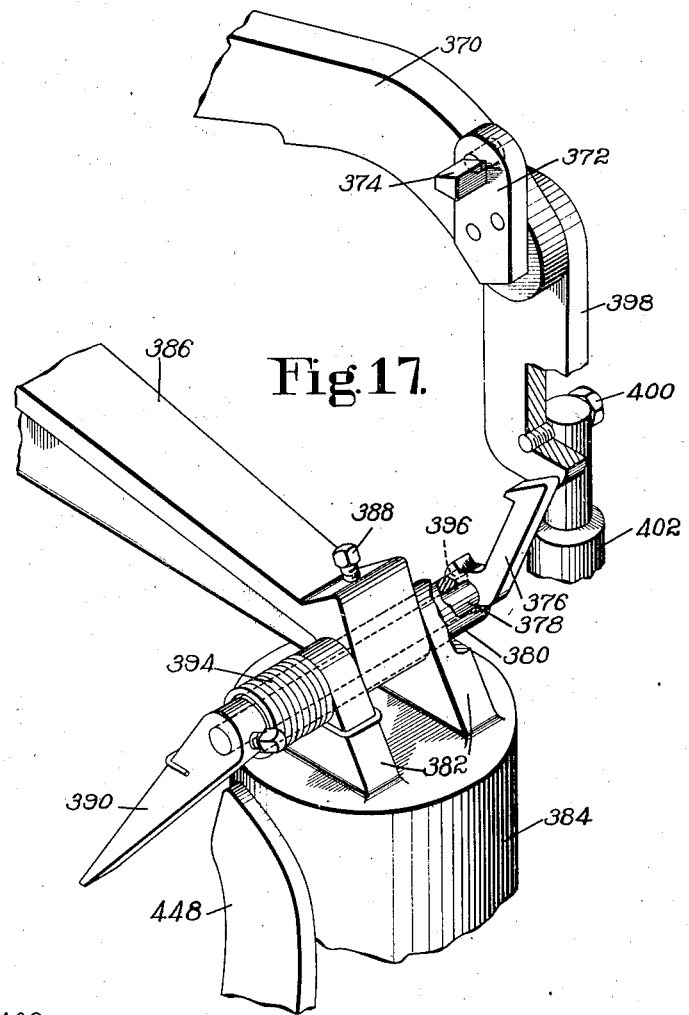
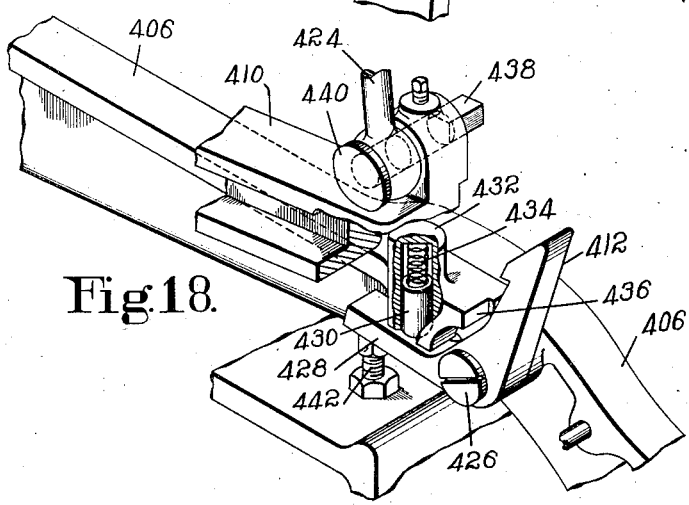

May 11, 1937.  S. J. FINN  2,080,037
MACHINE FOR APPLYING PRESSURE TO SHOE BOTTOMS
Filed March 23, 1935  14 Sheets-Sheet 10
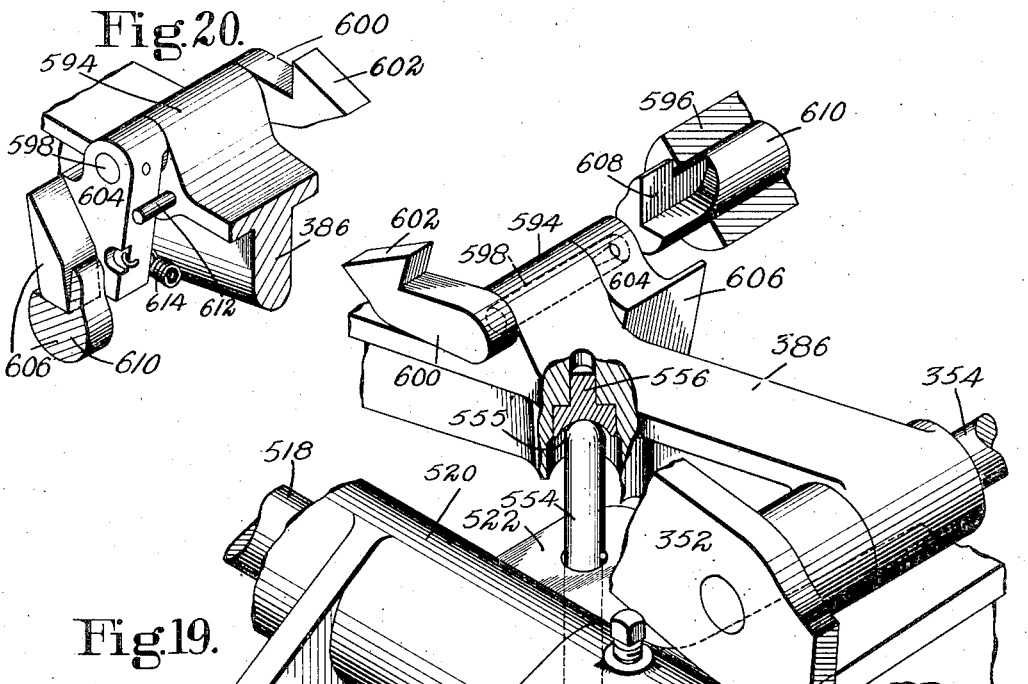

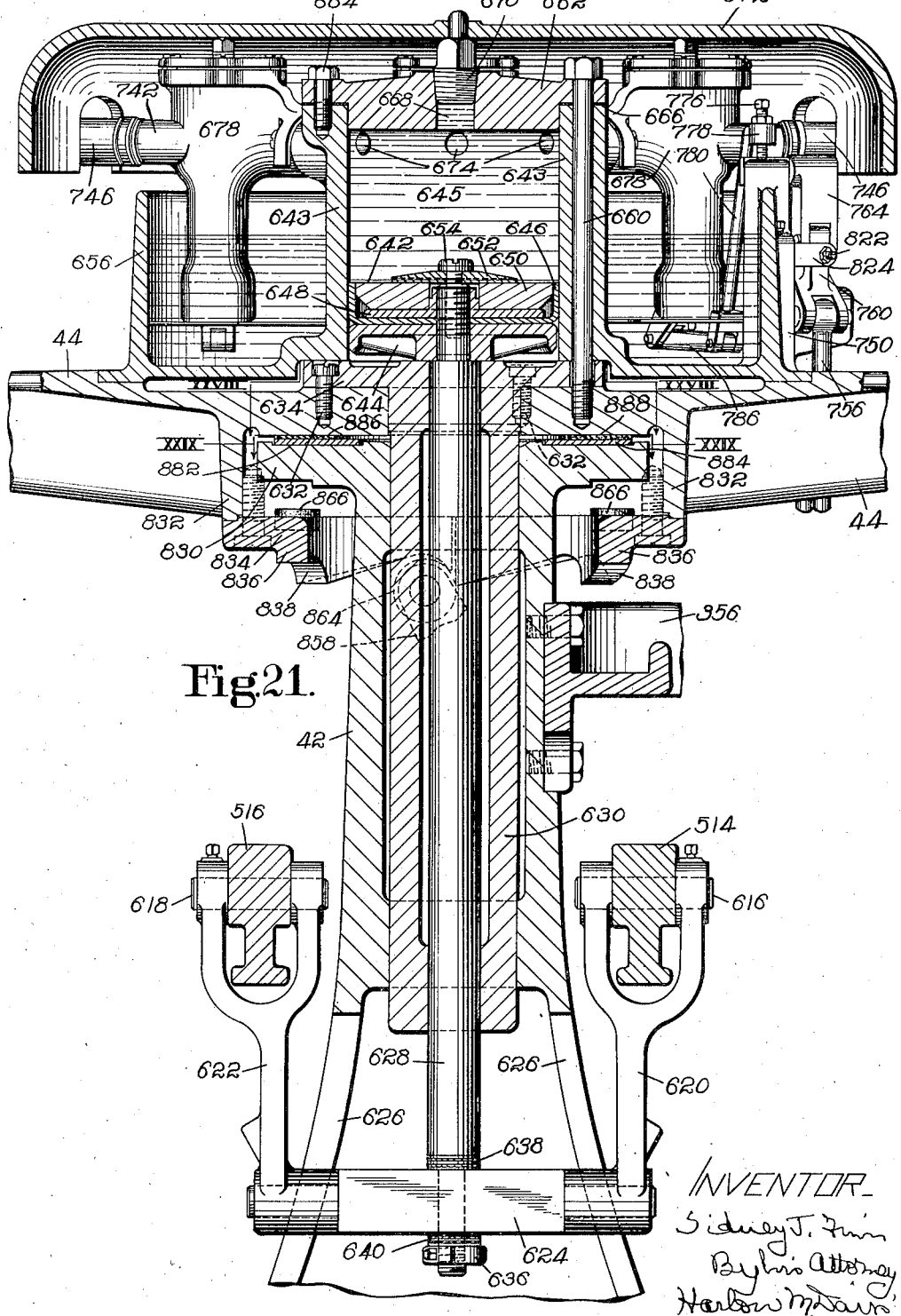

May 11, 1937.   S. J. FINN   2,080,037
MACHINE FOR APPLYING PRESSURE TO SHOE BOTTOMS
Filed March 23, 1935   14 Sheets-Sheet 12

INVENTOR
Sidney J. Finn
By his Attorney
Horlow M. Davis

May 11, 1937. S. J. FINN 2,080,037
MACHINE FOR APPLYING PRESSURE TO SHOE BOTTOMS
Filed March 23, 1935 14 Sheets-Sheet 13
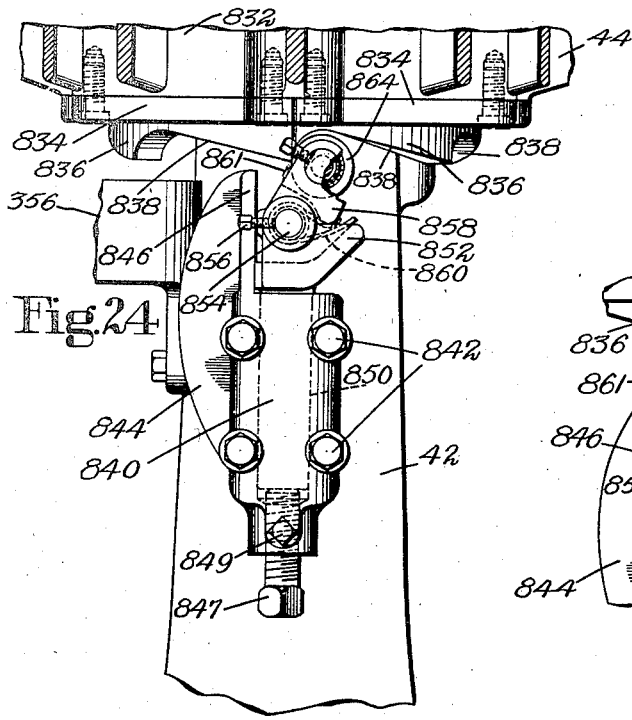
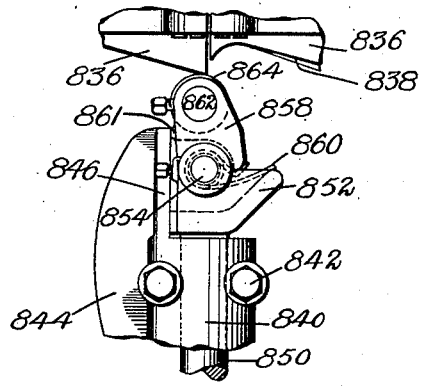
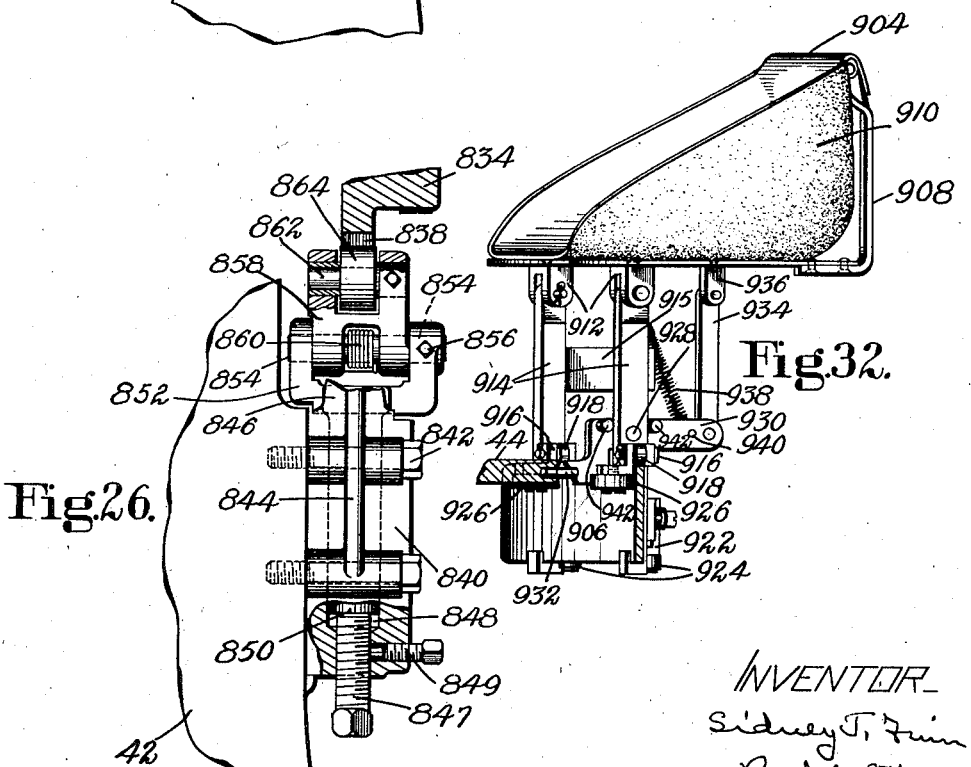
INVENTOR
Sidney J. Finn
By his Attorney
Harlow M. Davis May 11, 1937.　　　　S. J. FINN　　　　2,080,037
MACHINE FOR APPLYING PRESSURE TO SHOE BOTTOMS
Filed March 23, 1935　　14 Sheets-Sheet 14
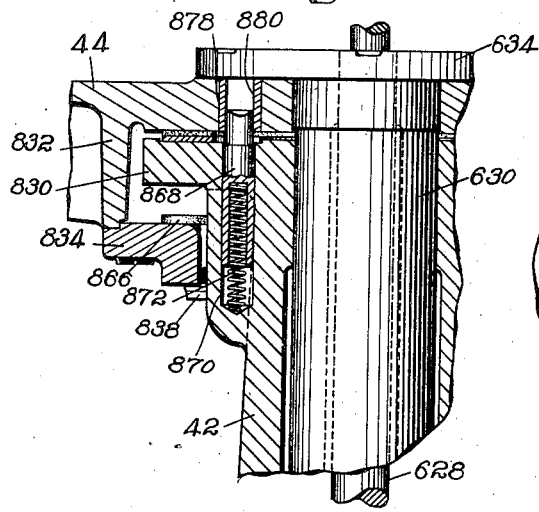
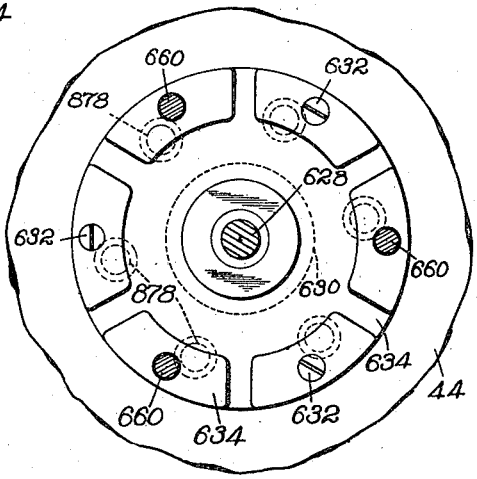
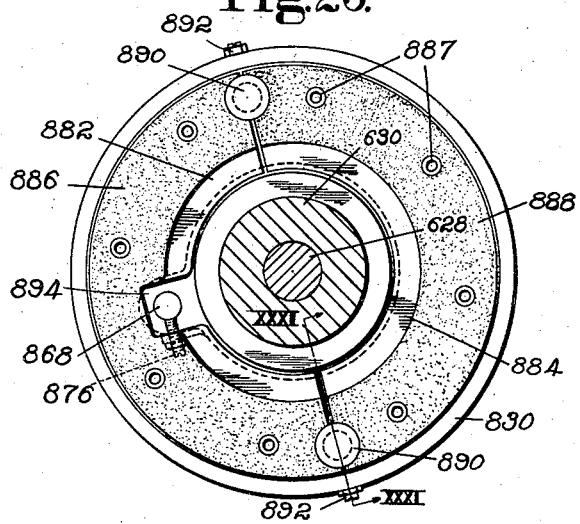
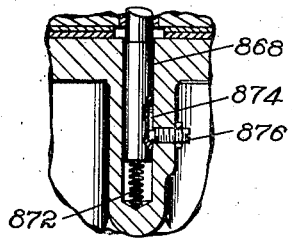
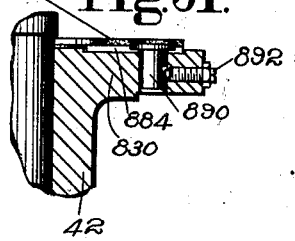

Patented May 11, 1937

2,080,037

UNITED STATES PATENT OFFICE 2,080,037

MACHINE FOR APPLYING PRESSURE TO SHOE BOTTOMS

Sidney J. Finn, Beverly, Mass., assignor to United Shoe Machinery Corporation, Paterson, N. J., a corporation of New Jersey Application March 23, 1935, Serial No. 12,634

117 Claims. (Cl. 12—37)

This invention relates to machines for use in applying pressure to shoe bottoms such, for example, as machines for cement-attaching soles to shoes, the invention being illustrated herein as embodied in a multi-pad turret type machine adapted for use in applying either sole-laying or sole-attaching pressure to shoe bottoms.

Objects of the invention are to provide in a machine of the type referred to improved means for rotating the turret intermittently; to provide an improved pressure-applying pad and supporting structure therefor; to provide improved means to facilitate the placing of the shoes on the pads and for supporting the shoes on the pads while under pressure; and to provide improved mechanism for exerting and controlling the pressure.

In accordance with the foregoing an important feature of the invention resides in a novel construction for effecting intermittent rotation of the turret of the machine to present a plurality of pressure-applying pads successively at an operating station, the construction being such that the turret is alternately moved heightwise against the force of gravity and thereafter permitted to descend by gravity which is utilized to rotate the turret. As illustrated, the elevating means is operated by a power unit which moves the turret heightwise a predetermined distance where it is maintained until the power unit shuts off, after which the turret descends under its own weight. On the descent of the turret inclined surfaces thereon engage fixed means which, under the influence of gravity, forces the turret to rotate a sufficient distance to present another pad at the operating station, this distance being determined by indexing means provided for that purpose.

In accordance with another feature of the invention an improved pad construction is provided for applying pressure to a shoe and sole, this pad as herein illustrated comprising a relatively resilient sole-engaging member supported by an expansible member or bag adapted to be inflated by fluid under pressure to force the resilient member against the shoe bottom. The bag has a relatively shallow chamber which is divided at the heel portion by a transverse wall and a passage connecting the two compartments of the chamber is opened and closed by clamping means, thereby controlling the admission of fluid into the heel portion of the bag. In this way the amount of pressure applied to the heel portion of the shoe may be varied as circumstances require.

Still another feature of the invention resides in the construction of a container or pad box which supports the pad, this member, as illustrated herein, comprising a plurality of movable sections arranged for relative angular adjustment about axes extending transversely of the pad to conform the sole-engaging surface thereof approximately to the longitudinal contour of a shoe bottom. The pad-supporting members are linked together so that angular movement of one effects a corresponding pivotal movement of another. The sections are held in adjusted position by a slide movable at right angles to the transverse axes and engaging one of said members. The slide has declining side walls provided with depressions arranged at different heights for supporting the sections in different angular positions. The construction also permits limited longitudinal movement of some of the sections to permit angular adjustment of the others.

Still another feature of the invention consists in the provision of improved mechanism to facilitate the placing of the shoes and soles on the pads. As illustrated herein, this mechanism comprises a jack for each pad arranged for movement heightwise of the pad and adapted to receive a shoe with a sole and position it properly on the pad. The jack is elevated to receive the shoe and thereafter is permitted to descend by its own weight to bring the shoe into engagement with the pad. Means is provided for elevating each jack when the pad associated therewith is located in the operating station and further means is provided for locking each jack in its lowered position when a shoe has been positioned on the pad. Each jack is automatically unlocked as the turret moves it into the operating station so that it is free to rise when the elevating means operates. The jack is provided with abutments pivoted for swinging movement transversely of the pad and relatively movable longitudinally of the pad, the abutments being constructed and arranged to grip and hold the shoe as it is moved transversely into pressure-receiving position and automatically to release and eject the shoe when the abutments swing out of such position. Further means is provided for preventing relative longitudinal movement of the abutments after the shoe is located in pressure-receiving position.

In accordance with still another feature of the invention improved mechanism is provided for controlling the admission of fluid under pressure to the various pads or bags when pressure is to be applied to the shoe bottoms. This mechanism, as illustrated herein, comprises a plurality of individual valve mechanisms carried by the turret and located opposite the respective bags, each mechanism being operated by toggles provided for that purpose. Fluid is forced into the valve mechanisms from a supply chamber or cylinder integral with the turret and having mounted therein a reciprocative piston operated by a power unit for forcing the fluid into the bags. The pressure in the supply cylinder is also utilized, in accordance with another feature of the invention, for elevating the turret during the introduction of fluid into the bags, the arrangement being such that after the pressure in the cylinder and bags is sufficient to overcome the weight of the turret, the latter is moved upwardly its full distance after which the pressure in the bags increases until the required amount is obtained, each valve mechanism except that next to enter the operating station being positioned at that time so that fluid under pressure can pass to the bags. In this way any of the bags which may have become partially deflated through leakage are reinflated as the pad at the operating station is inflated. Novel means is also provided for exhausting each pad in the position just in the rear of the operating station so that it will enter that station in a substantially deflated condition. As illustrated, means is also provided for preventing the inflation of the bag at the operating station, if the machine is operated to inflate the bags when no shoe is on that pad. Thus there will be no danger of the pad blowing out.

The illustrated machine is also provided, in accordance with another feature of the invention, with novel means for catching each shoe as it is ejected from a jack and for moving the shoe into a position remote from the operating station. As illustrated herein, the means for catching and removing the shoe comprises a basket normally pivoted in an upright position on a frame and arranged to tip under the weight of a shoe whereupon the basket is released from a connection with the turret and is moved along a track in a direction opposite the direction of rotation of the turret. When the shoe is removed from the basket the latter again assumes an upright position and, upon the next rotation of the turret, is moved thereby into position to receive another shoe.

With the above and other objects and features in view the invention will now be described in connection with the accompanying drawings and thereafter pointed out in the claims.

In the drawings,

Fig. 4 is a longitudinal sectional view of the pad box and the mechanism for locking the jack;

Fig. 5 is a plan view of the pad box and pad with parts broken away and in section;

Fig. 6 is a plan view of a portion of the pad and pad box shown in Fig. 5 with parts removed and in section;

Fig. 7 is a perspective view of a clamping member which controls the admission of fluid to the heel portion of the pad;

Fig. 8 is a view of the jack as seen from the rear or from the center of the turret;

Figs. 9, 10 and 11 are detail views, partly in section, of different mechanisms on the jack;

Fig. 12 illustrates in side elevation the treadles and mechanism operated thereby for controlling and locking the jack together with a portion of the mechanism for operating the fluid pressure supply valves;

Fig. 13 is a perspective view of the pivot about which the treadles of the machine fulcrum;

Fig. 14 is a plan view of a part of the jack controlling mechanism;

Figs. 15 and 16 are detail views, partly in section, of portions of the jack locking mechanism;

Fig. 17 is a perspective view on an enlarged scale of the latch mechanism whereby the jack controlling lever is connected to a weighted lever which returns the jack to inoperative position;

Fig. 18 is a perspective view on an enlarged scale of the latch mechanism which connects the treadles to each other during their initial movement;

Fig. 19 is a perspective view on an enlarged scale of the toggle mechanism which returns the weighted lever to its inoperative position and the latch mechanism which holds the weighted lever in such position;

Fig. 20 is a perspective view of the latch mechanism of Fig. 19 as viewed from an opposite direction, the mechanism being shown in its latched position;

Fig. 21 is a transverse sectional view through the central portion of the turret, illustrating the valve mechanism for supplying fluid under pressure to the pads;

Fig. 24 is a view of a portion of the column and turret illustrating the mechanism for rotating the turret;

Fig. 25 is a fragmentary view of the turret rotating mechanism located in a different position from that shown in Fig. 24;

Fig. 26 is a detail view, partly broken away and in section, of the turret rotating mechanism as viewed from the left in Fig. 24;

Fig. 27 is a sectional view of the upper end of the machine column showing the indexing means for locking the turret in one of its six operating positions;

Fig. 28 is a horizontal sectional view taken on the line XXVIII—XXVIII of Fig. 21 showing, in plan, the hub portion of the turret with the valve mechanism removed;

Fig. 29 is a horizontal section through the column taken on the line XXIX—XXIX of Fig. 21;

Fig. 30 is a sectional detail of the turret indexing and locking means as viewed from the left in Fig. 27;

Fig. 31 is a detail sectional view taken on the line XXXI—XXXI of Fig. 29 and showing the manner of securing the brake rings to the upper surface of the column of the machine; and Fig. 32 is an isometric view of the basket which catches the completed shoe as it is dropped from the jack and a portion of the mechanism for supporting and operating said basket.

The illustrated machine, which is arranged to apply sole laying and, if desired, sole-attaching pressure to shoe bottoms having outsoles temporarily located thereon, is provided with a base 40 and a hollow column 42. At its upper end the column 42 supports a circular table or turret 44 which carries at equally spaced intervals a plurality of pressure-applying mechanisms or devices (six in the present instance) indicated generally in Figs. 1 and 2 by the numeral 46, the turret being arranged for rotation intermittently in the column to present the devices successively at an operating station located at the front of the machine. The rotatable turret 44 is also arranged for limited movement heightwise of the column 42, which movement is utilized in effecting rotation of the turret as will appear more fully hereinafter. The pressure-applying mechanisms at each of the six positions on the turret are substantially identical in construction and operation and accordingly a description of the mechanism at one position, for example, that located at the operating station, will be sufficient for a proper understanding of these mechanisms.

Figure 1:
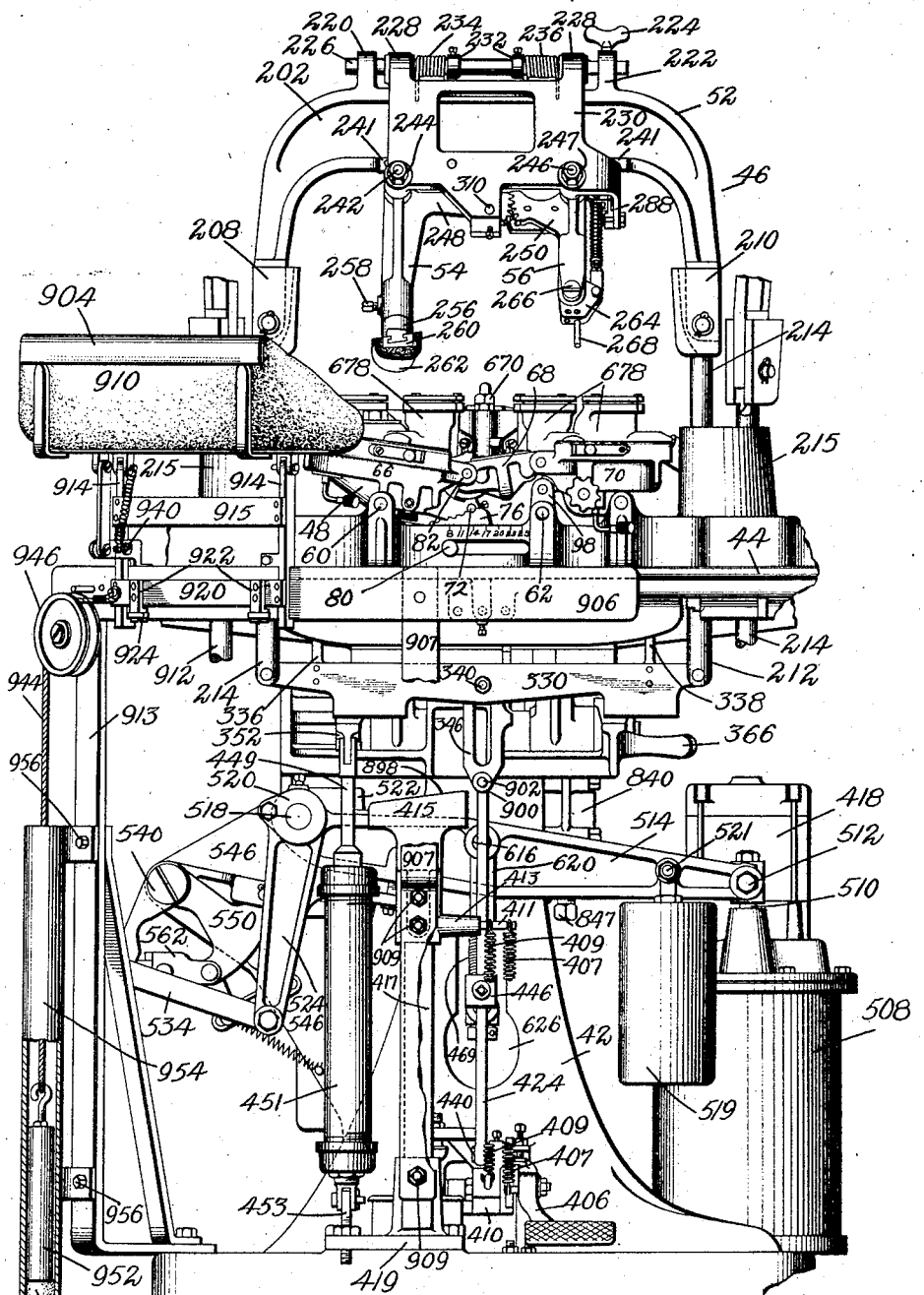
Fig. 1 is a front elevation of the machine with portions of the turret at opposite sides of the machine broken off.
Figure 2:
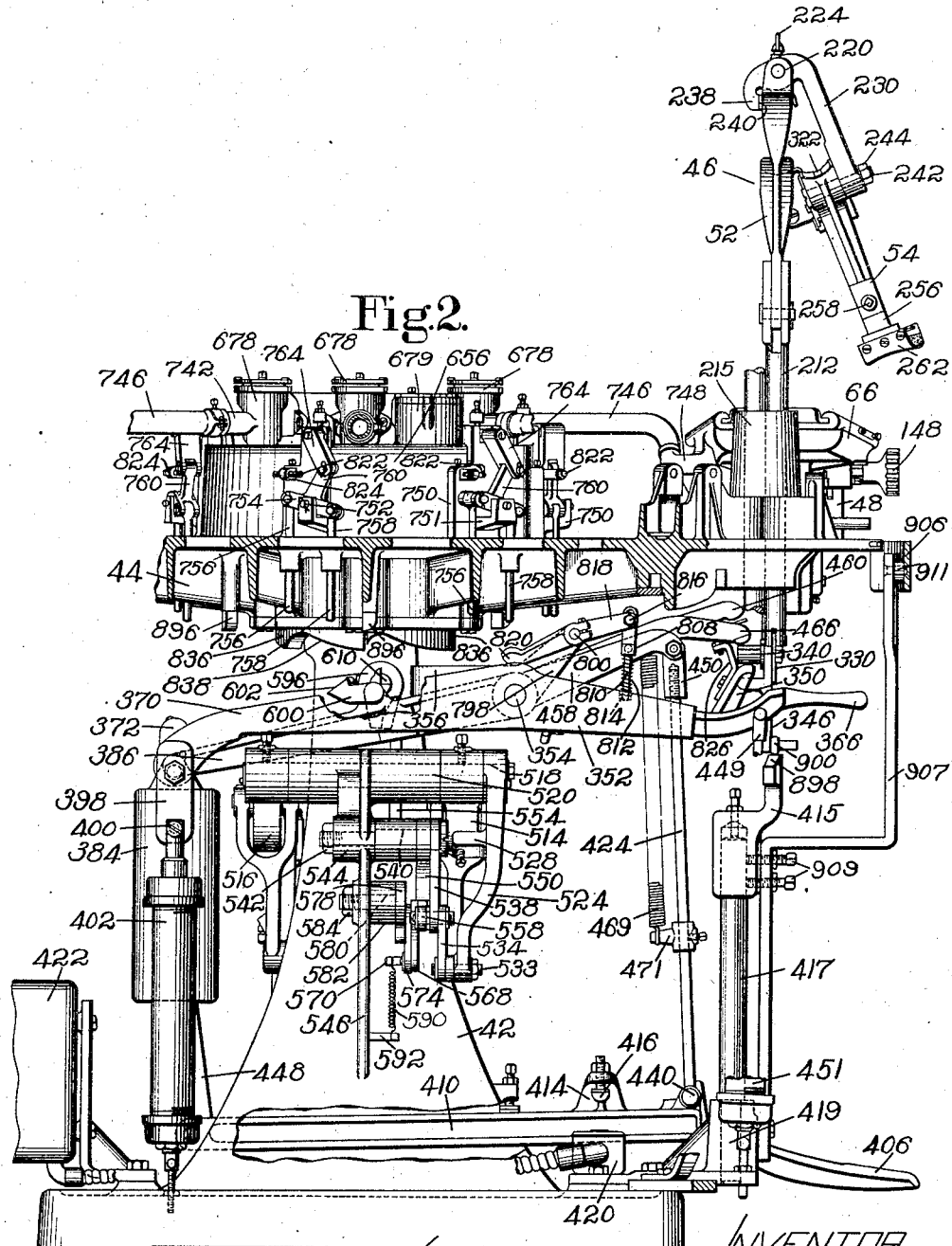
Fig. 2 is a side elevation, partly in section, of the portion of the machine shown in Fig. 1.
Figure 3:
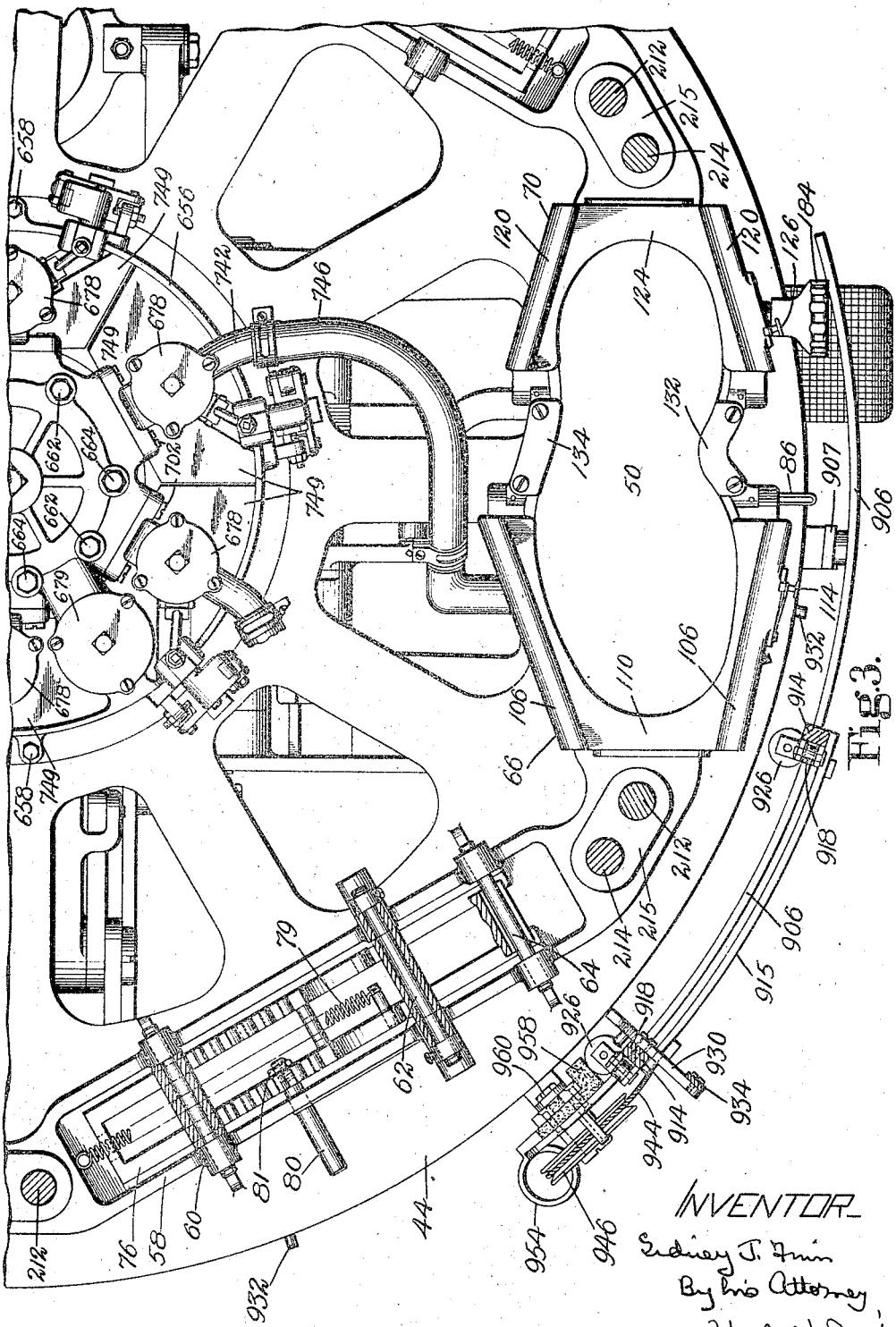
Fig. 3 is a plan view on an enlarged scale of a portion of the turret adjacent to the operating station.

As shown in Figs. 1 and 2, the pressure-applying mechanism 46 comprises a pad box 48 containing a distortable pad, indicated generally in Fig. 3 by the numeral 50, and shoe jacking mechanism 52 provided with a pair of relatively adjustable abutments 54, 56 for engaging respectively the toe portion of a shoe and a last in said shoe, these latter acting to introduce the shoe on the pad and to receive the thrust of the sole-laying or the sole-attaching pressure applied thereby. Before describing the construction of the jack 52, the pad box and pad 50 will be described.

The pad box mechanism is best illustrated in Figs. 3 to 7, inclusive. As shown in Figs. 3 and 4, the pad box 48 is supported on the rotary turret by a base 58 formed integrally with the turret and having journaled in its opposite side walls three transverse shafts 60, 62 and 64 about which the pad box may be adjusted to cause the pad to conform substantially to the longitudinal contour of a shoe bottom. The pad box comprises three relatively adjustable sections 66, 68 and 70 (Fig. 4), preferably of metal such as aluminum, which are located respectively under the forepart, shank, and heel-engaging portions of the pad. The forward section 66 is pivoted on the shaft 60 and has a portion 71 extending rearwardly and provided with a transverse pin 72 fastened by a set screw 74, the opposite ends of the pin projecting laterally beyond each side of the section. The projecting ends of the pin 72 engage the opposite side walls of a slide member 76 slidably mounted in a guideway formed on the turret and arranged to support the inner end of the section 66 in different heightwise positions depending upon the position of the slide 76 longitudinally of the pad box. These side walls slope downwardly toward the forward end of the pad box and contain a series of circular notches 78 arranged to receive the ends of the pin 72. The slide member is held normally at the forward limit of its sliding movement by a tension spring 79 secured at one end to the slide and at the other end to a pin in the turret, the spring passing through holes formed in the opposite ends of the slide member. In Fig. 4, the pin 72 is located in the highest notch 78 so that the forward section 66 of the pad box is closest to the horizontal. The wall of the slide 76 adjacent to the operator (Fig. 3) carries an outwardly projecting stud 80 secured to the wall by a nut 81 and extending through a slot in the base 58 which serves as a handle for moving the slide toward the rear end of the pad box against the tension of the spring 79 to bring the lower notches 78 into alinement with the pin 72 and thus vary the angular position of the section 66 in accordance with the toe spring of the shoe being operated upon.

Above the rearwardly projecting portion 71, the section 66 is provided at its opposite sides with a pair of lugs 82, 84 (Figs. 4 and 5) through which are inserted pins 86, 88 having grooves 89 in their upper sides and enlarged heads the inner surfaces of which are positioned at angles which correspond to the contours of those portions of the side walls of the pad 50 which engage the pins. The upper side of the portion 71 has a curved surface 73 formed thereon which forms an arc the center of which coincides with the axes of the grooved pins 86, 88. The inner portions of the pins 86, 88 extend through lugs or bosses formed on opposite sides of the middle section 68 of the pad box. This middle section has a convexly curved surface 85 formed at its forward end having the same radius as the curved surface 73 on the section 66 and the surface 85 slides on the surface 73 so that the middle section 68 can pivot about the pins 86, 88 while its forward portion remains in contact with and is supported by the section 66. The opposite end of the section 68 is also provided with a pair of lugs through which extend a pair of grooved pins 90, 92 connecting this section to the rear or heel section 70 of the pad box, the inner surfaces of the heads of the pins 90, 92 being positioned at angles which are parallel to the portions of the pad engaged thereby. In order to prevent the pivot pins from rotating in their bearings, the four lugs on the middle section 68 are provided with short vertical pins 94 which enter the grooves in the pivot pins and prevent them from turning.

The rear or heel section 70 of the pad box is supported at its forward end by a transverse pin 96 carried by a pair of upwardly extending links 98 (Figs. 1 and 4) which are pivoted at their lower ends on the shaft 62 which is fixed against rotation in the base 58 by a binding screw 100. As shown in Fig. 4, the section 70 is provided at its rear portion with a longitudinal slot 102 arranged to engage the transverse shaft 64, thereby supporting the section 70 in a substantially horizontal position. A semi-circular opening 104 is formed in the central portion of the section 70 the purpose of which will be explained hereinafter. When the forward section 66 of the pad box is adjusted about its pivot 60 to position the forepart of the pad 50 in accordance with the shape of a shoe bottom, the middle section 68 will rotate about its pivots to assume a position which conforms substantially to the angle of the shank portion of the shoe. The vertical links 98 permit the rear section 70 to move a limited amount longitudinally of the pad during this adjustment and the slot 102 maintains the section 70 in a substantially horizontal position during such movement so that the heel portion of the pad is maintained substantially in its original horizontal position irrespective of the angular positions into which the forward and middle sections of the pad box are adjusted.

The forepart section 66 of the pad box has a pair of rearwardly diverging flange portions 106 (Fig. 5) projecting inwardly from the upper edges of its opposite side walls and below these flanges are formed a pair of grooves 108. These grooves form a guideway for a mask plate 110 the inner edge of which conforms substantially to the contour of the forepart of the pad 50. The inner peripheral portion of the mask plate fits into a recess or depression 112 formed around the margin of the pad thereby confining the pad in the pad box. The mask plate 110 is held in the grooves 108 by a pin 114 mounted in the forward side of the section 66 and forced inwardly by a leaf spring 116 to engage a notch 118 in the forward edge of the mask plate and thereby to position the latter longitudinally of the pad box. The rear section 70 is also provided with a pair of inwardly extending flanges 120 and grooves 122 for receiving a heel-end mask plate 124 the inner edge of which conforms in outline to the periphery of the heel portion of the pad 50 and fits into the recess 112 formed around the margin of the pad. The mask plate 124 is positioned in the grooves 122 by another pin 126 which is urged inwardly through a hole in the side wall by a leaf spring 128 to engage a notch 130 in the forward edge of the mask plate.

The shank portion of the pad 50 is confined in the pad box by a pair of retaining plates 132, 134 secured by screws 136 to the middle section 68, the plates overlapping the recess 112 in the pad. This construction facilitates the removal of the pad from the pad box in case it is desired to use a new pad and also permits the mask plates to be changed quickly should it be desired to utilize a pad of a different shape or size.

The pad 50, the construction of which is best shown in Figs. 4 and 5, is made up of two separate members, a solid outer or shoe-engaging pad 138 and an inner inflatable member or bag 140. The outer member 138 is composed of resilient material such as rubber and has an upper surface 142 for engaging a shoe, this surface conforming in outline to the periphery of a shoe except that it is much larger and is molded to correspond substantially to the shape of a relatively flat shoe bottom, the material of the pad 138 being thinner at its forepart than at its shank and rear portions. Its marginal portion, which is somewhat thicker than its central portion, has the recess 112 referred to above formed therein. At its lower side the pad 138 is provided with a downwardly projecting flange or wall 144 which extends completely around the pad and provides a pocket or recess for receiving the inflatable member 140.

The member 140 comprises a flexible sack or bag preferably of rubber and provided with an air-tight chamber 146 the height of which is relatively small, for example, less than half an inch, but which is capable of being distorted or expanded by inflation to a greater height to apply pressure to a shoe and sole through the admission of fluid under pressure. The bag 140 is clamped to the pad box by a hollow bushing 148 located in a cylindrical opening 149 (Figs. 4 and 6) in the forward section 66 and passing through a hole in the bag. The bushing 148 is provided at its upper end with an annular flange 150 which clamps the bag against a depression 152 in the section 66 by a screw 154 threaded into the lower end of the bushing. The bushing is also provided with four diametrically opposite holes 156 which enter into its hollow central portion and form the means through which fluid under pressure, for example water, is admitted into the chamber 146 from an inlet opening 158 formed in the section 66 and connecting the cylindrical opening 149 with the source of fluid pressure supply, as will be explained more fully hereinafter. A leaf spring 160, fastened by a screw 162 to the lower side of the section 66, limits the movement of the clamping screw 154 to prevent it from dropping out when the screw is loosened to permit removal of the bag 140.

The heel portion of the bag is separated from the shank portion by a transverse wall 164 (Fig. 5) forming an H-shaped construction 166 near the center of the heel end of the bag. At opposite sides of the H-shaped portion of the wall 164 are formed a pair of vertical holes 168, 170 which pass downwardly through a semi-circular projection 172 (Figs. 4 and 6) formed on the lower wall of the bag, this projection entering the opening 104 referred to above in the rear section 70 of the pad box. The projection 172 is preferably covered with a layer of waterproof reinforcing material 174 (Fig. 4) such, for example, as rubberized canvas, which covers the lower ends of the holes 168, 170. This projection fits into a metal container 176, best shown in Fig. 7, which is open at one end and is placed in the opening 104 before the bag is mounted in the pad box. The arrangement of the vertical holes 168, 170 is such that fluid under pressure entering the chamber 146 at the forepart of the bag must pass through the holes in order to enter the rear or heel compartment of the chamber. The container 176 has a cover plate 178 which slides inside the container, as shown in Figs. 6 and 7, and is provided with a pair of projections 180, 181 which, when the cover plate is moved forcibly against the rubber projection 172, will squeeze the rubber to close both vertical holes 168, 170. The cover plate is actuated by a large screw 182 having a reduced end which fits a hole in the center of the cover plate. The screw 182 is threaded into the forward wall of the heel section 70 and is provided with a handle 184 whereby it can be turned to adjust the plate 178 toward or away from the projection 172 to open or close the holes 168, 170. In this way the operator can control the admission of fluid into the heel portion of the bag and thus adapt the latter for operating upon shoes where very little wrapping action is desired at their heel ends and also upon shoes which require substantially uniform wrapping pressure over their entire bottom areas.

As shown in Figs. 4 and 5, the bag 140 is preferably provided at its front and rear portions with air vents 186, 188 which permit air to be expelled from the chamber when water is first introduced therein, these air vents being preferably of any usual construction and as herein illustrated comprising hollow tubes opening into the chamber and having check valves at their lower ends which permit the air to pass out of the tubes but prevent it from passing in, the tubes being closed after the air is exhausted by nuts threaded on their lower ends. Each air vent is clamped against the lower wall of the bag by a nut 190 and a washer 192.

It will be noted in Fig. 4 that the pad-supporting surface of the middle section 68 of the pad box does not join the adjacent portions of the front and rear sections but is spaced therefrom short distances to permit relative adjustment of the three sections. Accordingly, there are transverse openings in the supporting surface of the pad box through which the lower wall of the bag might blow out unless these openings were covered. To prevent such occurrence there are provided two sheets of relatively flexible material such, for example, as spring steel, to cover these openings, the forward sheet 194 being retained in position by a pin 196 (Figs. 4 and 6) which enters a hole in the section 66, and the rear sheet 198 being retained in position by a similar pin 200

(Fig. 4). The sheets are flexible enough to permit relative adjustment of the sections of the pad box and yet will support the lower wall of the bag during the pressure-applying operation.

The shoe-jacking mechanism 52 is best illustrated in Fig. 1, and Figs. 8 to 11, inclusive, Fig. 8 being a view of the mechanism as viewed from the rear. The jack comprises a U-shaped frame or bail 202 extending lengthwise over the central portion of the pad and being pivotally supported at each end by pins 204, 206 mounted in ears 208, 210 formed respectively on enlarged upper portions of two vertical rods 212, 214 slidably mounted in bearings 215 (Fig. 4) formed on the turret, the pivot pins 204, 206 passing through inclined slots 216, 218 (Fig. 8) formed in the lower ends of the bail 202 to permit limited floating movement of the latter longitudinally of the pad and thus prevent binding in case one rod slides faster in its bearing than the other rod.

At the top of the bail 202 are a pair of upstanding ears 220, 222 in which is rigidly secured by a thumb screw 224 a shaft 226. Loosely mounted on the shaft 226 by means of vertically enlarged holes 227 formed in ears 228 is a carrier member 230 (Fig. 1) which is positioned longitudinally of the shaft by a pair of collars 232 fixed to the shaft and forming abutments between which and the ears 228 a pair of torsion springs 234, 236 are located, the inner end portions of the springs engaging the bail 202 and the outer portions contacting with the inner side of the carrier member 230, thereby urging said member into an outwardly inclined position, as shown in Fig. 2. The angle of the carrier member is determined by a pair of arms 238 (Fig. 2) extending downwardly from the ears 228 and arranged to engage flat surfaces 240 formed on the upper portion of the bail 202. On the opposite side of the bail, adjacent to its lower edge, are another pair of flat surfaces 241 (Fig. 1) which are arranged to engage the carrier member 230 and position it in a substantially vertical plane when it is rotated inwardly into operative position by the operator.

Pivoted at the lower portion of the carrier member 230 are the downwardly extending shoe and last-engaging abutments 54, 56 referred to above, the shoe-engaging abutment 54 being pivoted on a shouldered stud 242 (Fig. 2) secured to the carrier member by a nut 244, and the last engaging abutment being pivoted about a similar stud 246 (Fig. 1) fastened to the carrier member by a nut 247. The abutments 54, 56 are provided respectively with upper arms 248, 250 which extend inwardly toward each other and have toothed segments 252, 254 at their inner ends which intermesh to produce equal and opposite movement of the abutments about their respective pivots 242, 246.

The shoe-engaging abutment 54 carries at its lower end a toe rest 256 for engaging the forepart of a shoe A mounted on a last B (Fig. 8), the shank of the member 256 being secured in the arm 54 by a screw 258. The toe rest 256 has a T-shaped slot to receive a slide 260 which permits the toe rest to be adjusted transversely of the shoe. The toe rest may be covered with a layer of felt and/or leather 262 in any usual manner to prevent scarring of the shoe upper.

The lower end of the last-engaging abutment 56 carries a block 264 pivoted on a screw 266 passing through ears formed at the lower portion of the arm. Projecting downwardly from the block 264 is a last pin or spindle 268 arranged to enter the hole or thimble 270 in the heel end of the last B, the last pin, as shown in Fig. 8, being considerably smaller in diameter than the thimble. The block 264 projects beyond the outer side of the arm 56 and is provided with a slot in which is pivotally supported on a pin 272 a coupling 274 having threaded into its upper portion a rod 276 with an enlarged head 277, the upper portion of the rod passing through a hole in a transverse p'n 278 (Figs. 8, 9 and 10) mounted in a U-shaped piece 280 which is pivotally secured by means of a shouldered stud 282 to a reduced portion of the lower arm 283 of a bell-crank lever 284. The bell-crank lever 284 is pivoted on a screw 286 threaded into an arm 288 formed integrally with the carrier member 230 and projecting rearwardly from its right-hand side, as viewed in Fig. 1. The upper arm of the bell-crank lever 284 carries a roll 285. The transverse pin 278 in the U-shaped member 280 is provided with a sleeve 290 having a flange 292 and, between the flange and a washer 293 held on the lower end of the rod 276 by a nut, is located a compression spring 294. The rod 276 slides loosely through the sleeve 290 in the pin 278, its downward movement being limited by the head 277 of the rod.

The bell-crank lever 284 is provided with a hole 296 (Fig. 10) in which is located a compression spring 298, the lower end of the spring bearing against a pin 300 secured in the arm 288 and extending forwardly, as viewed in Fig. 10, into a slot 302 formed in the lever 284. The spring 298 urges the bell-crank lever 284 in a counterclockwise direction, as viewed in Fig. 10, until the reduced portion of the lever engages another pin 304 located in the upper portion of the arm 288, this pin limiting rotation of the bell-crank lever under the influence of the spring 298.

When the abutments are in the position shown in Figs. 1 and 2, with the carrier member 230 inclined outwardly toward the operator, the lower arm of the bell-crank lever 284 is engaging the stop pin 304. The head 277 of the rod 276 is then resting against the transverse pin 278 and the spring 294 is not compressed. Referring to Figs. 8 and 10, the operator grasps the shoe A and inserts the last pin 268 into the thimble of the last B. At the same time he locates the forepart of the shoe under the toe rest 256 thereby determining the angle of the shoe longitudinally. While bringing the forepart of the shoe under the toe rest, the operator swings the two abutments 54, 56 longitudinally of the shoe about their pivots 242, 246 the proper amount to insure that the toe rest will engage the forepart of the shoe at the proper place, the abutments moving equal amounts in opposite directions owing to the gear segments on their upper arms. While still gripping the shoe, he swings the abutments inwardly until the inner side of the carrier member engages the flat surfaces 241 at the lower portion of the bail 202, thus positioning the mechanism in a substantially vertical plane. As the carrier member swings inwardly, the roll 285 on the bell-crank lever 284 engages the lower side of the bail 202 and rotates that lever in a clockwise direction, as viewed in Fig. 10, thereby moving the bell-crank lever away from the stop pin 304. This action compresses the spring 294 and, through the force of the spring, swings the last pin 268 toward the right, as viewed in Fig. 8, thereby forcing the forepart of the shoe upwardly against the toe rest 256 and guiding the pin 268 in the last hole with sufficient force to hold the shoe on the abutments without the assistance of the operator.

The relative longitudinal positions of the two abutments 54, 56 having been determined when the operator located the shoe thereon, it is desirable to insure against further movement of these members after the jacked shoe has been swung inwardly into operative position over the pad. To this end, the upper arm 250 of the last-engaging abutment has secured to its inner side (Fig. 8) a plate 306 having a portion projecting forwardly toward the arm 248 of the shoe-engaging abutment. The forward edge of this plate has a plurality of small horizontal teeth which are arranged to be engaged by a pawl 308 pivoted on a pin 310 which is secured by a set screw in a downwardly and rearwardly extending portion 313 (Fig. 11) of the carrier member 230, the lower portion of the pawl having a tail (Fig. 8) provided with a hole in which is seated a compression spring 312 the upper end of which engages a pin 314 fixed in the member 230 so that the spring urges the pawl in a clockwise direction, as viewed in Fig. 8, to separate it from the teeth on the plate 306. The upper portion of the pawl has secured thereto by a screw 316 a relatively stiff spring 318 which extends upwardly toward the left and is hook-shaped at its upper end. When the carrier member is swung inwardly by the operator the hooked end of the spring 318 engages a surface formed on the under side of the bail 202 and depresses the spring 318 sufficiently to turn the pawl about its pivot 310 in a counterclockwise direction, as viewed in Fig. 8, thereby causing the pawl to engage one of the teeth on the plate 306 and lock the last and shoe-engaging abutments positively in the positions into which they were adjusted when the shoe was jacked. When the spring 318 is moved out from under the bail 202, the compression spring 312 operates to swing the pawl in an opposite direction to unlock the abutments.

The last and shoe-engaging abutments of the jack 52 are provided respectively, adjacent to their pivots 246, 242, with upwardly projecting segments 320, 322 (Fig. 8), the upper surfaces of which, as shown in Fig. 2, are transversely concave. These concave surfaces are arranged to engage substantially complemental convex surfaces 324, 326 formed on the lower side of the bail 202 and arranged to receive the thrust of the pressure applied to the shoe and sole during the sole-laying or sole-attaching operation. This arrangement also helps to prevent relative movement of the abutments longitudinally of the bail even under substantial pressure. Limited heightwise movement of the abutments and the carrier member 230 is permitted by the oversized holes 227 in the lugs 228, as shown in Fig. 8, thus permitting the segments to engage the surfaces on the bail. A pin 328 is provided in the carrier member 230 above the arm 248 of the shoe-engaging abutment to limit movement of the abutments toward each other when no shoe is mounted thereon, this pin being so positioned that it permits the abutments to move toward each other a sufficient distance to receive the smallest shoe which is to be operated upon. The opposite or open position of the abutments is limited by the rearwardly extending portion 313 (Fig. 11) of the carrier member 230 upon which the arm 248 rests when no shoe is mounted on the abutments.

The mechanism for raising and lowering the jack 52 and for locking the jack in operative position when a shoe has been mounted thereon and lowered against the pad 138 will next be described. As stated above, the bail 202 is pivotally supported by pins 204, 206 mounted respectively in the upper ends of the vertical rods 212, 214 which in turn are slidably mounted in bearings 215 formed on the turret 44. The rods extend downwardly through the turret, as shown in Fig. 4, and are connected at their lower ends by a plate-like cross bar 330 having downwardly projecting portions 332, 334 formed thereon and provided adjacent to its opposite ends with upwardly extending fingers or stops 336, 338, the purpose of which will be explained more fully hereinafter. At its central portion the cross bar 330 carries an inwardly extending shouldered stud 340 the inner portion of which is of substantial diameter but has its upper side flatted off somewhat, the stud being rigidly secured to the cross piece by a nut 342, this construction being best shown in Figs. 4, 12 and 15. As illustrated in Fig. 15, the stud 340 is provided with an annular flange 344 about midway of its length and between this flange and an outer shoulder 345, which bears against the cross bar 330, is slidably mounted an upright member 346 which may be operated to lock the jack in its lowered position after the shoe has engaged the upper surface of the pad 138, the slide member 346 being provided with a vertical slot 348 which permits it to slide heightwise on the stud 340.

The inwardly extending portion of the stud 340 is engaged on its lower side by a substantially rectangular projection 350 (Figs. 4 and 12) extending upwardly from the forward end of a jack-elevating lever 352 (Figs. 2, 12 and 14) pivoted on a fixed shaft 354 journaled in bearings formed in a bracket 356 secured by screws 358 to the forward side of the column 42, this lever supporting the jack in an elevated position through the engagement of the projection 350 with the fixed stud 340. As shown in Fig. 14, the jack-elevating lever 352 has two forwardly projecting arms, located outside the bracket 356, these arms being connected adjacent to their fulcrum by a rib 360 and, near their forward ends, being connected by a cross piece 362 which has the rectangular projection 350 formed thereon. The forward ends of the two arms of the lever 352 curve upwardly, as shown in Fig. 12, and are provided with flat surfaces 364 (Figs. 4 and 14) for engaging the downwardly extending projections 332, 334, as will appear hereinafter. The right-hand arm of the lever 352 is provided with a handle 366 whereby it may be operated manually if desired.

The jack-elevating lever 352 has formed on its left-hand arm, as viewed in Fig. 14, a pair of laterally projecting webs 368 which support a third arm 370 having a bearing on the shaft 354 and extending rearwardly, as shown in Fig. 12, a substantial distance beyond the column 42. Fastened to the rear end of the arm 370 is an upstanding plate 372 (Figs. 12 and 17) from the upper portion of which projects a quadrangular lug 374 having its upper surface slanting downwardly toward the front of the machine. The lug 374 is arranged to be engaged by a latch member 376 fastened to a rockshaft 378 rotatably mounted in a fixed bushing 380 (Fig. 17) which passes through a pair of upstanding ears 382 formed on the upper end of a heavy cylindrical weight 384 and secures the weight to a rearwardly extending arm 386 rotatably mounted on the fixed shaft 354, a binding screw 388 securing the bushing 380 in the arm. A downwardly extending tapered arm 390 is secured to the opposite end of the rockshaft 378 and, surrounding the bushing 380 between the arm 390 and the adjacent ear of the weight 384, is a torsion spring 394 having one end hooked around the tapered arm and its opposite end hooked around the ear 382, thereby tending to force the arm 390 in a counterclockwise direction, as viewed in Fig. 12, until a flat surface (not shown) on the hub of the latch member 376 engages a corresponding surface 396 (Fig. 17) formed on the bushing 380 and prevents further rotation of the shaft 378. As shown in Fig. 17, the latch 376 is normally positioned at about 80° to the horizontal so that it will be in a position to snap over the lug 374 on the arm 370 when the two arms are brought into closer proximity to each other, thereby connecting the jack-elevating lever 352 with the arm 386 which carries the weight 384. When the jack is in its elevated or inoperative position, as shown in Figs. 1 and 2, the arm 370 is latched to the weight-carrying arm 386 through the latch mechanism just described, so that the weight 384 is supporting the jack in its elevated position through the engagement of the projection 350 with the inwardly extending stud 340, as shown in Fig. 12. After the shoe has been jacked and moved inwardly over the pad, the latch 376 is swung rearwardly, in a manner to be presently described, to unlatch the arm 370 from the weight-carrying arm 386 and thus permit the jack to descend under its own weight on the slide rods 212, 214, thereby pressing the shoe against the pad 138 with a preliminary pressure equal to the weight of the jack plus the mechanism carried thereby. The arm 370 has a downwardly extending link 398 pivoted to its rear end, the lower end of the link being pivotally connected by a screw 400 to a dashpot 402 which, when the weight-carrying arm 386 is latched to the arm 370 and both members are operated, in a manner to be hereinafter described, to raise the jack to its elevated or inoperative position, will cause the rear portions of the levers to descend slowly so that the jack will not be elevated too rapidly.

The mechanism which releases the arm 370 of the jack-elevating lever 352 from the weight-carrying arm 386 is best illustrated in Figs. 12, 13 and 18. As shown in Fig. 12, the machine is provided with a treadle 406 fulcrumed on a transverse shaft 408 journaled in bearings formed at the rear portion of the column 42. Substantially parallel to the treadle 406 and fulcrumed on the same shaft 408, is a treadle lever 410 which is arranged to be operated by the treadle through latch mechanism 412 mounted on a forward portion of the treadle 406 and connecting the treadle lever 410 to the treadle during a substantial part of its downward movement. The treadle lever 410 has a laterally extending arm 414 which carries a switch button 416 arranged to engage a switch 420 which starts a motor 418, the switch being connected to a switch box 422 (Fig. 2). The forward end of the treadle lever 410 is connected by a treadle rod 424 to mechanism located between the forwardly extending arms of the jack-elevating lever 352 and arranged to operate the jack locking mechanism and also mechanism for controlling the valves through which fluid under pressure is supplied to the several pads, this latter mechanism being best shown in Figs. 12 and 14 and being described hereinafter in connection with the pressure-applying operation. The treadle 406 and the treadle lever 410 are maintained in elevated position against a pair of vertically adjustable stops 405 in lugs on the column 42 by tension springs 407, 409 (Fig. 1) secured at their upper ends to a horizontal pin 411 mounted in a boss 413 projecting laterally from a stationary bracket 415 supported on an upright standard 417 fastened in a lower bracket 419 secured by screws to the base 40.

Fig. 18 illustrates the latch mechanism by which the treadle lever 410 is connected to the treadle 406. The latch 412 is pivoted on the treadle 406 by a screw 426 and has a tail 428 extending inwardly which is engaged by a spring-pressed plunger 430 mounted in a boss 432 on the treadle 406 and urged downwardly by a compression spring 434, a surface 436 being formed on the treadle to act as a stop for limiting rearward movement of the latch 412 so that the latter will be located normally in a substantially vertical position. The latch 412 is arranged to engage a corner formed on a laterally projecting portion 438 of a pivot pin 440 which connects the treadle rod 424 to the treadle lever 410. When the parts are in their inoperative positions, as shown in Fig. 12, the treadle lever 410 is latched to the treadle 406 which will lower said lever and the treadle rod 424 until the tail 428 on the latch engages an adjustable screw 442 mounted in the base of the machine, thereby disengaging the latch 412 and permitting the lever 410 to be elevated by the tension spring 409 (Fig. 1) referred to above. The treadle lever 410 is not disconnected from the treadle 406, however, until after the switch button 416 has contacted the switch 420 (Fig. 2) and has started the motor 418 which operates the machine through one-sixth of a revolution and then automatically shuts off, as will appear hereinafter.

The treadle lever 410 has formed integrally therewith adjacent to its fulcrum an upwardly extending curved arm 448 (Figs. 12 and 13), which is arranged to engage the tapered arm 390 and release the latch 376 which connects the arm 370 to the weight-carrying arm 386. The curved arm 448 is so positioned that the first action which takes place upon depression of the treadle 406 is the unlatching of the arm 370 from the arm 386, thereby permitting the jack with the shoe mounted thereon and held over the pad 138 by the operator to descend under its own weight to press the shoe and sole against the pad. To prevent the jack from descending too rapidly the left-hand arm of the jack-elevating lever 352, as viewed in Fig. 1, is connected by a piston rod 449 to a dashpot 451 pivotally supported at the front of the machine by a vertical rod 453 mounted in a forwardly extending portion of the bracket 419. The jack locking mechanism and the valve operating mechanism are operated in the order named to hold the shoe and sole on the pad against the sole-laying or the sole-attaching pressure, and to inflate the pad to apply such pressure. The jack locking mechanism will now be described.

The upper end of the treadle rod 424 is adjustably connected to a coupling 450 (Fig. 12) having a pair of upwardly extending ears 452 (Fig. 14) through which extends a horizontal pin 454. The pin is surrounded between the ears 452 by a bushing 456 and has reduced end portions which extend through holes in a pair of forwardly extending arms 458, 460 fulcrumed on the fixed shaft 354 inside its bearings in the bracket 356 and being pivotally secured to said pin by nuts 462, 464, so that the arms operate as a single unit. A third arm 466 pivoted on the shaft 354 extends forwardly between the interconnected arms 458, 460 and has a surface 468 (Fig. 12) on its lower side for engaging the bushing 456 between the ears 452, this arm being held in engagement with the bushing by a relatively heavy tension spring 469 the lower end of which is connected by a collar 471 to the treadle rod 424. The forward end of the arm 460 is arranged to engage the upper surface of a horizontal projection 470 extending laterally and inwardly from one side of the upright slide member 346 which operates the jack locking mechanism. As stated above, the slide member 346 is arranged to slide on the shouldered stud 340 which is rigid in the cross piece 330. The upper portion of the slide member 346 is provided with a vertical slot 472 (Figs. 4 and 15) through which passes a pin 474 secured in the turret 44 by a binding screw 476, the pin acting to maintain the slide member in a vertical position during its heightwise movement. The arm 460 does not contact directly with the projection 470, however, but is provided with a leaf spring 478 which extends under the forward end of the arm and contacts yieldingly with the projection 470, the leaf spring overcoming the rebound of the arm 460 when the treadle lever 410 is disconnected from the treadle 460 and thus causing the arm 460 to remain in acting engagement with the projection 470 longer than it would without the spring so that the member 346 will always be depressed its full distance by said arm. The leaf spring 478 also prevents the operation of valve controlling mechanism on the machine in case no shoe is on the pad at the operating station, as will be described more fully hereinafter.

At its upper portion the slide member 346 carries a pair of upwardly diverging springs 480 (Fig. 4) rigidly secured to the member 346 by a screw 482 and being bent outwardly near their upper ends and then extending upwardly in a substantially vertical direction. The springs 480 engage a pair of rolls 484 mounted on studs 486 carried by the inner adjacent ends of a pair of horizontal slides 488 (Figs. 4 and 16) mounted in openings formed in the lower portion of the turret 44 and held therein by a pair of cover plates 490 secured to the turret by screws. The slides 488 are provided at their central portions with longitudinal slots 492 and are urged inwardly toward each other by compression springs 494 mounted in the slots, the inner or adjacent ends of the springs engaging the inner ends of the slots and their outer ends engaging a pair of vertical pins 496 carried by the cover plates 490 and projecting into the slots. The outer ends of the slides 488 extend into openings in the turret through which pass the vertical rods or shafts 212, 214 which support the jack and these outer ends are provided with a plurality of downwardly inclined teeth 498 arranged to engage upwardly inclined teeth 505 formed on the inner sides of hardened plates 500, 502 mounted respectively in T slots formed in the shafts 212, 214, these plates being held in the slots by spring pressed plugs 504, 506 which fit into depressions in the shafts 212, 214, this construction facilitating the removal of the plates from the shafts. The jack locking mechanism is operated in the following manner.

After the jack has been released by depression of the treadle 406 to lower the shoe onto the pad 138, the treadle lever 410, which is then latched to the treadle 406, lowers the arm 460 (Fig. 12) about its pivot 354 until the leaf spring 478 engages the projection 470 on the slide member 346. Further movement of the treadle 406 causes the slide member (which is normally held in its upper position by the springs 480) to move downwardly and to bring the upper portions of the springs against the rolls 484, thereby moving the slides outwardly or away from each other to cause the teeth 498 to engage the teeth 505 on the slide rods 212, 214, thus locking them in their lowered positions. The upper ends of the springs 480 are so shaped that as curved portions pass below the centers of the rolls 484 the springs will hold the slide member 346 in its depressed position, thereby pressing the slides 488 forcibly against the rods 212, 214 to lock them positively in lowered position.

The flat surfaces 364 (Fig. 4) on the forward ends of the arms of the jack-elevating lever 352 operate, during the lowering of the jack, to equalize to a certain extent the downward movement of the shafts 212, 214 by engagement with the lower edges of the projections 332, 334 on the cross piece 330. After the weight-carrying arm 386 has been unlatched from the arm 370 of the jack-elevating lever 352, the latter is swung in a clockwise direction, as viewed in Fig. 2, by the engagement of the projection 350 with the stud 340 as the jack descends. Since the stud 340 is the only portion of the jack mechanism engaging the jack-elevating lever during the downward movement of the jack, it will be clear that one of the shafts 212, 214 might descend quicker than the other on account of the floating arrangement of the entire jack mechanism. Accordingly, to prevent this, the lower edges of the projections 332, 334 are arranged to engage the forwardly extending arms of the jack-elevating lever, thereby retarding the downward movement of either shaft should it descend too rapidly and causing the bail 202 to move downwardly substantially equal amounts at both sides. The upwardly extending stops 336, 338 (Fig. 4) secured to the opposite end portions of the cross piece 330 perform a similar function when the jack is being returned to its elevated or inoperative position. When the weight-carrying arm 386 is again latched to the jack-elevating lever at a later stage in the operation of the machine and the weight is permitted to descend to rotate said lever about its pivot 354 to elevate the jack, the stops 336, 338 can contact with the under side of the turret 44 as the jack nears its elevated position and thus prevent one shaft from moving upwardly too far with respect to the other shaft so that the bail 202 when elevated will assume the substantially balanced position shown in Fig. 1.

It will be apparent from what has gone before that in order to elevate the jack to its inoperative position after pressure has been applied to the shoe and sole, the weight-carrying arm 386 must be rotated about its pivot 354 to raise its rear end and permit the latch 376 to snap over the lug 374 on the arm 370 and these arms must then be maintained in elevated position until the next set of pressure-applying mechanism has, due to rotation of the turret, arrived at the operating station. The elevation of the inner end of the weight-carrying arm is accomplished through the power drive of the machine which also operates the mechanism for supplying fluid under pressure to the bags 140, which mechanism indirectly causes the turret to rotate to move the shoe at the operating station away from that station and to present the next set of mechanism at such station.

The power drive of the machine is provided by an electro-hydraulic unit 508 (Fig. 1) actuated by the motor 418 which is bolted directly thereto. The electro-hydraulic unit 508 is preferably one of the commercial devices marketed under the name of "Thrustor Unit," one type of which is disclosed in Letters Patent of the United States No. 1,902,480, granted March 21, 1933, upon an application of William J. Woods. For the purposes of the present invention it will be sufficient to explain that the electro-hydraulic unit comprises a cylinder containing a piston (not shown) which is arranged for movement heightwise of the cylinder when the motor 418 is energized by contact of the button 416 with the switch 420. The motor is connected to a rotary pump which forces liquid such as oil from above the piston to below it thereby causing the piston to move upwardly with considerable force. The amount of pressure created by the "Thrustor Unit" may be controlled automatically by any usual type of pressure-controlled switch, preferably located in the switch box 422 (Fig. 2) and being so arranged that it will shut off the motor when the unit has built up the required pressure below the piston.

The piston of the "Thrustor Unit" operates a pair of upwardly extending rods 510 located at opposite sides of the unit and being pivotally connected at 512 to the ends of a pair of arms or levers 514, 516 (Figs. 1 and 2) extending transversely of the machine at opposite sides of the column 42 and being secured by set screws to a horizontal shaft 518 rotatably mounted in a bearing 520 formed at the outer end of a laterally projecting portion 522 of the column 42. The levers 514, 516 are rotated upwardly about their pivot 518 by the operation of the "Thrustor Unit" 508. When the full movement of the piston of the "Thrustor Unit" has been completed and its maximum pressure has been reached, the motor shuts off automatically and the levers are returned to their original positions by means of a pair of heavy weights 519 pivoted at 521 near the right-hand ends of the levers. Fig. 1 shows only those elements of the above mechanism which are adjacent to the operator but it is to be understood that at the opposite side of the "Thrustor Unit" the construction is substantially the same.

The mechanism for lifting the weight-carrying arm 386 until it becomes latched to the inner arm 370 of the jack-elevating lever is connected to, and operated by, the forward transverse lever 514. This mechanism and the means whereby the weight-carrying arm is retained in elevated position until released by the treadle will now be described, these mechanisms being best shown in Figs. 1, 2, 19 and 20.

Referring first to Fig. 19, there is mounted on the shaft 518 a bell-crank lever 524 the hub of which is clamped to the hub of the lever 514 by a bolt 526 so that the two levers operate as a unit, the bolt passing loosely through a slot (not shown) in the hub of the lever 524 and being threaded into the lever 514. The bell-crank lever has a forwardly and inwardly extending arm 528 which carries at its outer end a screw 530 threaded into the lever 514 and held in position by a binding screw 532, this construction providing a slight relative adjustment between the two levers. The lower arm of the bell-crank lever 524 is pivotally connected at 533 to a link 534 the other end of which is pivotally connected by a pin 536 to a downwardly extending arm 538 fulcrumed on a fixed stud 540 which is fastened by a nut 542 (Fig. 2) in a bearing 544 formed at the outer end of a web portion 546 of the lateral projection 522 on the column. Pivoted on the stud 540 between the arm 538 and the bearing 544 is a substantially horizontal arm 548 and outside this arm is a downwardly inclined segmental member 550. At the end of the horizontal arm 548 is a socket 552 in which rests an upstanding rod 554 passing through and supported by the laterally projecting portion 522 of the column and having its upper end rounded over to engage a depression 555 formed in the lower surface of a hardened steel plug 556 driven into an opening formed in the lower portion of the weight-carrying arm 386, the rod 554 having sufficient lateral movement in the column to permit its upper end always to seat itself in the depression 555. Pivotally mounted on the pin 536, inwardly of the arm 538 as viewed in Fig. 19, is a toggle link 558 pivotally secured at its other end by a pin 560 to a U-shaped toggle link 562. The opposite end of the U-shaped link straddles the lower end of the segmental member 550 and is pivotally connected thereto by a pin 564. At its forward end, as viewed in Fig. 19, the link 562 has a small projection 566 which maintains the toggle in a straightened position. The U-shaped link 562 has a downwardly projecting arm 568 provided at its lower end with a pin 570 which enters a slot 572 formed in a link 574 the opposite end of which is pivotally connected at 576 to a stationary plate 578 having a threaded shank 580 whereby it is rigidly secured in a boss 582 (Fig. 2) on the web 546 by a nut 584. The arm 548 is provided near its central portion with a laterally extending right angle lug 586 in which and the main portion of the arm is mounted a horizontal pin 588. The upper end of the segmental member 550 is provided with a circular recess which engages the pin 588.

The pin 570 on the lower arm of the toggle link 562 extends through the slot 572 and is connected by a spring 590 to a pin 592 (Fig. 2) mounted in the web portion 546 of the column 42, the spring tending to maintain the toggle 558, 562 in a straightened condition, as shown in Fig. 19. Before proceeding to describe the operation of the toggle and mechanism associated therewith, the mechanism by which the weight-carrying arm 386 is maintained in elevated position after it has been raised by the toggle mechanism will be described.

The weight-carrying arm 386 (Figs. 19 and 20) has an upwardly extending projection 594 formed thereon adjacent to the column 42 and opposite a boss 596 formed on the column. Rotatably mounted in the projection 594 is a pin 598, the forward end of which carries a rearwardly projecting arm 600 having an inclined cam surface 602 formed thereon. The opposite end of the pin 598 has secured thereto a latch member 604 having at its forward end, as viewed in Fig. 19, a laterally projecting lug 606 the upper portion of which is tapered (Fig. 20) and the lower portion of which is substantially rectangular in shape and adapted to fit into a recess 608 formed in a stud 610 secured in the boss 596. A pin 612 is provided in the arm 386 to limit the forward or counterclockwise movement (as viewed in Fig. 20) of the latch member 604 and a spring 614 secured at one end to the latch and at its other end to the arm 386 tends normally to keep the latch against the pin.

When the "Thrustor Unit" 508 is thrown into operation the transverse levers 514, 516 are swung upwardly about their pivot 518 and the lower arm of the bell-crank lever 524 is swung toward the right to swing the segmental member 550 upwardly about its pivot 540, thereby rotating the horizontal arm 548 and forcing the rod 554 against the weight-carrying arm 386. This arm thereupon moves upwardly about its pivot 354 to elevate the weight 384. As the arm 386 moves upwardly the tapered lug 606 on the latch 604 engages the stud 610 and is deflected against the tension of the spring 614 until the arm 386 has been elevated high enough to permit the latch to snap into the recess 608, thereby latching the weight-carrying arm to the column 42. At the same time the latch 376 (Fig. 17) on the inner end of said arm latches over the projection 374 on the arm 370, thereby connecting the two arms so that when the jack is to be raised again into its inoperative position the elevating mechanism is ready to operate.

After the weight-carrying arm 386 has been latched to both the arm 370 and the column of the machine, the lever 514 continues to rotate upwardly under the force of the "Thrustor Unit." In order, therefore, that the weight-carrying arm will not be carried above the position where it becomes latched to the column and the arm 370, the toggle 558, 562 of the elevating mechanism is broken to permit the lever 514 to continue its movement without acting on the arm 386. The breaking of the toggle at the right point in the operation of the mechanism is accomplished by setting the stationary plate 578 (Fig. 19) in such a position that, as the bell-crank lever 524 swings the toggle mechanism toward the right, as viewed in Fig. 19, the end of the slot 572 in the link 574 will engage the pin 570 and break the toggle 558, 562, thereby permitting the lever 514 to be moved upwardly for the full movement of the "Thrustor Unit" without causing the arm 548 to act further upon the weight-carrying arm 386.

The weight-carrying arm is unlatched from the column automatically by rotation of the turret and this occurs at the same time that a pressure-applying device enters the operating station so that the jack will be elevated at once to release the shoe which has been held under pressure for the required time. However, since this action involves mechanism which has not yet been described, an explanation thereof will be left until the mechanism referred to has been described. The means for supplying fluid under pressure to the several bags 140 will now be described.

Referring particularly to Figs. 1 and 21, the transverse levers 514, 516 are provided opposite the column 42 with pins 616, 618 upon which are pivoted depending Y-shaped arms 620, 622 the lower ends of which support a crossbar 624 passing through an opening 626 in the column. Secured to the middle of the crossbar is a shaft 628 which extends upwardly through a sleeve 630 secured in the column by screws 632 (Figs. 21 and 28) passing through an annular flange or shoulder 634 formed at the upper end of the sleeve 630. The shaft 628 is secured to the crossbar 624 by a split collar 636 threaded on a reduced portion of the shaft and a pair of ball bearings 638, 640 are interposed at opposite sides of the crossbar between the shoulder on the shaft and the collar 636 to permit the shaft to turn in the sleeve relatively to the crossbar.

The upper end of the shaft 628 is reduced in size and carries a plunger or piston 642 which is arranged to reciprocate heightwise in a vertical cylinder 643 (Fig. 21) having a chamber 645. The piston 642 comprises a pair of oppositely disposed cup-shaped members 644, 646, the upper member 646 being preferably of rubber, and both members being clamped against the shoulder on the shaft by a circular plate 648 threaded on the reduced end of the shaft. A relatively thick disk 650 of leather supports the upstanding edge of the member 646 against the side wall of the cylinder and is held against the plate 648 by a washer 652 and a screw 654 threaded into the end of the shaft 628, thus making the piston substantially water-tight in the cylinder.

The cylinder 643 is formed at the center of a circular container or reservoir 656 (Figs. 2, 3 and 21) of substantial depth for holding liquid such as water. The reservoir is located in a slight depression formed in the upper surface of the turret and is held therein by screws 658 (Fig. 3) and by long bolts 660 (Figs. 21 and 28) passing through the side wall of the cylinder and through enlarged holes in the flange of the sleeve 630, the bolts being threaded into a portion of the turret adjacent to the sleeve. The bolts 660 also secure a cover plate 662 to the upper end of the cylinder, three additional short bolts 664 (Figs. 3 and 21) and a gasket 666 being employed to insure that the cylinder will be water-tight even under substantial pressure. The cover 662 has a central opening 668 to permit access to the chamber of the cylinder without removing the cover plate, this opening being plugged by a tapered screw 670. The screw is provided with a projection which supports a large circular plate 672 having a downwardly extending edge portion which serves as a cover to prevent objects from dropping into the reservoir, the plate being also supported by adjacent parts of the valve mechanism, as shown in Fig. 21.

The upper end of the cylinder 643 is provided with six radially extending openings or ports three of which are indicated in Fig. 21 by the numeral 674, the ports being equally spaced around the cylinder at points substantially opposite the six positions on the turret at which the pressure-applying devices 46 are located. The cylinder also has a seventh radial opening 676 (Fig. 22) located between two of the ports 674. The six ports 674 lead from the chamber 645 to six valve mechanisms 678 located radially of the turret and controlling the admission of fluid under pressure to the bags 140 and the exhausting of fluid therefrom. The seventh port 676 leads from the chamber 645 into a supply valve mechanism 679 (Figs. 3 and 22) which transfers fluid from the reservoir 656 to the chamber.

Figure 22:
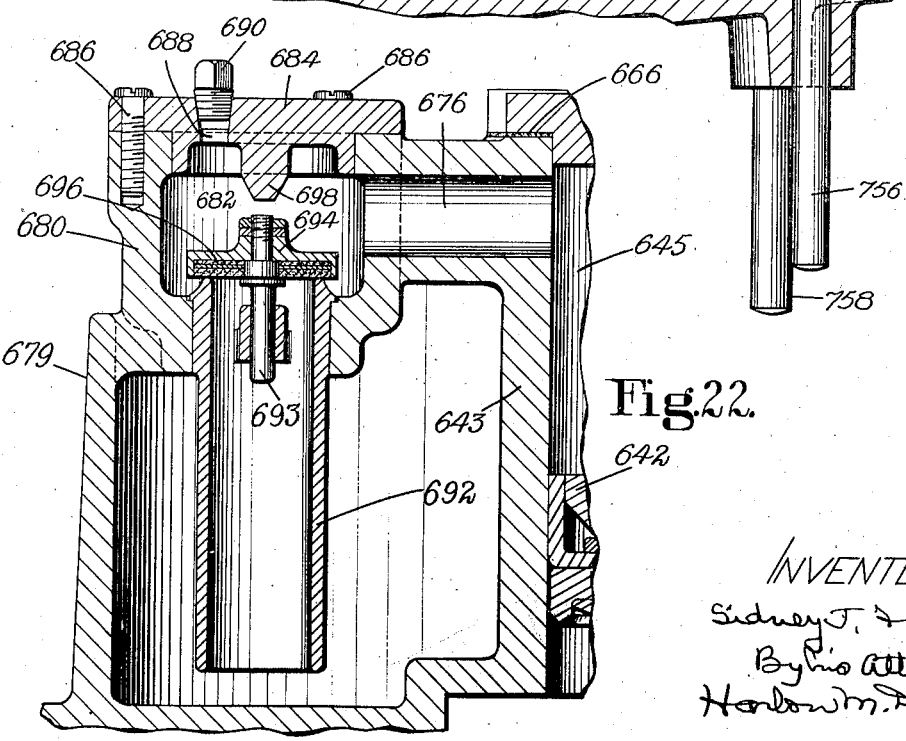
Fig. 22 is a sectional view of the fluid pressure supply valve.

The supply valve 679 is best shown in Fig. 22 and comprises a housing 680 formed integrally with the reservoir and having an upper chamber 682 closed at the top by a cover 684 secured in place by screws 686, the cover having a hole 688 through which air may be expelled from the chamber if desired and which is normally plugged by a tapered screw 690. The lower wall of the chamber 682 supports a relatively large sleeve 692 fixed in the housing and extending downwardly into the reservoir to within a short distance of its bottom surface so that a substantial portion of the sleeve is always immersed in the water in the reservoir. At its upper end the sleeve 692 is provided with a boss having a vertical hole in which is slidably mounted the shank portion 693 of a circular valve 694 having a seat against the upper edge of the sleeve. The valve 694 may be of any usual construction and, as illustrated herein, may have a washer 696 of fiber, felt or similar material at its inner side to prevent leakage. Above the valve on the cover plate 684 is a downwardly extending lug 698 which engages the valve in its open position and prevents it from opening too far. As stated, the valve mechanism 579 supplies water from the reservoir to the chamber 645 in the cylinder 643 and the piston 642 then forces the water under pressure through the control valves 678 and into the bags 140 to inflate the latter and apply sole-laying or sole-attaching pressure to the shoe and sole being held by the locked jack against the pad 138. After the pressing operation is completed, that is, after the shoe has nearly completed one full revolution of the turret and is about to be returned to the operating station, the water is exhausted from the bag and returns to the valve 678 associated with that bag where it is emptied into the reservoir. On each reciprocation of the piston 642 in the cylinder, therefore, a fresh supply of water is transmitted from the reservoir to the chamber 645 where it is forced under pressure into the bag at the operating station (and into any of the other bags which may have lost pressure through leakage except the bag just in advance of the operating station, as will presently appear) and is exhausted into the reservoir instead of being returned directly to the chamber 645 of the cylinder.

Figure 23:
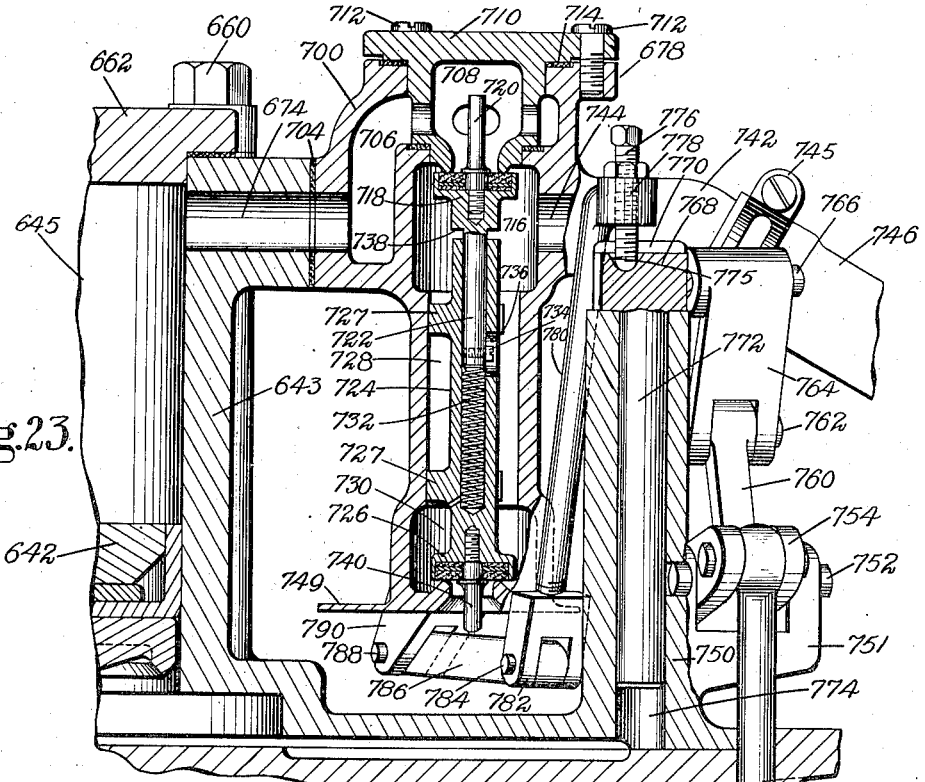
Fig. 23 is a sectional view of one of the valves which admits fluid under pressure to the pad associated therewith and permits it to be exhausted therefrom.

The valve mechanism 678 for each pad, which is illustrated in Fig. 23, comprises a casting 700 secured by screws 702 (Fig. 3) to projecting portions of the cylinder wall, packing material 704 being used to render the connection water-tight. Each port 674 of the cylinder lines up with a hole in its corresponding casting to form a continuous passage into a vertical chamber 706 which communicates with an upper chamber 708 closed at the top by a cover plate 710 secured by screws 712 to the upper side of the casting and bearing against a gasket 714 to prevent leakage. The chamber 708 opens downwardly into a valve chamber 716 and the opening between the two chambers is normally closed by an upwardly facing valve 718, hereinafter referred to as the inlet valve, and having an upwardly extending pin 720 threaded therein which facilitates disassembling the mechanism. The valve seats itself against the edge of the opening between the two chambers and has a downwardly extending stem 722 which is telescoped into the shank portion 724 of a downwardly facing valve 726, hereinafter called the outlet valve, and arranged by means of a pair of three-armed flanges 727 for vertical sliding movement in a hollow depending portion 728 of the casting 700, the lower end of said hollow portion leading into a lower valve chamber 730 having at its bottom side an upwardly facing opening or port against which is seated the enlarged portion of the outlet valve 726, a suitable packing material being secured to the valve to make it water-tight. A compression spring 732 of predetermined strength is mounted in the hole in the shank portion of the outlet valve 726 and the upper end of the spring presses against the lower end of the stem 722 of the inlet valve, thereby keeping the two valves separated so that both valves are normally closing the openings in the two valve chambers. The head of a small screw 734 in the valve stem 722 rides in a slot 736 in the shank 724 of the outlet valve and prevents the two members from separating or turning relatively to each other. At the upper end of the valve stem 722 is formed a shoulder 738 which is arranged to engage the upper end of the shank 724 of the outlet valve and thus limit movement of the two valves toward each other. The outlet valve 726 carries a downwardly projecting pin 740 which extends below the lower face of the valve the purpose of which will be explained hereinafter. The casting 700 is provided at its outer or right-hand side, as viewed in Fig. 23, with a large pipe 742 connected by an opening 744 to the valve chamber 716 and through which water under pressure passes from the chamber into the bag 140 associated with that valve mechanism. Clamped to the outer end of the pipe 742 by a collar 745 is a flexible hose 746 (Figs. 3 and 23) which is clamped at its other end to a pipe 748 (Fig. 5) extending rearwardly from the forward section 66 of the pad box, the hole in the pipe being a continuation of the inlet port 158 formed in the forward section 66 and connecting with the opening 149 in which the hollow bushing 148 which admits water to the bag 140 is secured, as shown in Fig. 4.

As the valve mechanism 678 is illustrated in Fig. 23 the parts are in position to admit water under pressure to its corresponding bag 140. Moreover, this is the position in which the elements of each valve are located after water has been admitted to its bag and it is moving around the machine on the turret. Accordingly, the pressure in each bag will be raised or replenished to the required amount should leakage occur after it leaves the operating station but before the pressing operation has been completed. Since the inlet valve 718 is normally held against the opening in the inlet chamber 708 by the compression spring 732, it will act as a check valve to prevent water from leaving the bag through the inlet chamber. When the shoe reaches the station just in advance of the operating station, however, the positions of the parts are changed by depression of the treadle and the valve mechanism is then positioned so that the inlet valve 718 is closed positively and the outlet valve 726 is held open to permit the water to be exhausted from the bag into the reservoir and cause the bag to enter the operating station in a substantially deflated condition. At this station the parts are again returned to the position shown in Fig. 23 by the same movement of the treadle which closed the inlet valve when that mechanism was one position in advance of the operating station, and the inlet valve remains in this "open" position until the pressure-applying mechanism again reaches the position just in advance of the operating station. Each of the six valve castings 700 is provided at its lower side with a laterally extending plate-like flange 749 which overlies a substantial portion of the bottom of the reservoir and prevents the water which is returned to the reservoir from splashing up and wetting adjacent portions of the machine.

Before proceeding to describe the treadle-operated mechanism for positively closing the inlet valve at the position in advance of the operating station and, by the same treadle movement, for opening the inlet valve of the mechanism located at such station, it may be well at this point to give a brief description of the manner in which water under pressure is transferred from the reservoir to a bag 140 with the valve mechanism 678 open or located as shown in Fig. 23.

Referring to Fig. 21, the transverse levers 514, 516, on their downward movement under the pull of the weights 519 (Fig. 1), lower the piston 642 in the cylinder 643 and thereby create sufficient suction in the chamber 645 to draw up enough water from the reservoir and through the valve 694 (Fig. 22) to fill the cylinder. As the levers 514, 516 are swung upwardly on the next operation of the "Thrustor Unit", the supply valve 694 is closed by the downward pressure of the water in the chamber 682 under the action of the piston 642 and accordingly, when the pressure in the cylinder chamber 645 and valve chambers 708 becomes great enough to overcome the force of the compression springs 732 (Fig. 23) in each of the valve mechanisms 678, the inlet valves 718 are forced open and water fills the chambers 716, the openings 728, and lower chambers 730, thereby sealing the outlet valves 726 and permitting water to pass into the bags 140. Those bags which are up to full pressure will not, of course, receive any more water, but the deflated bag at the operating station and any other bags below the desired pressure will be inflated until the pressure in each bag is brought up to the required amount.

The treadle-operated means associated with each valve mechanism 678 for opening the outlet valve 726 at the position in advance of the operating station and for positively closing the inlet valve while causing the reverse action to take place in the valve mechanism located at the operating station will next be described.

The mechanism for operating the valves 678 is best shown in Figs. 2 and 23, there being a separate set of mechanism for each valve. The wall of the reservoir 656 is provided opposite each pressure-applying mechanism with lugs 750 each having a projection 751 provided with an upstanding ear which, together with the wall of the reservoir, supports a horizontal pin 752. Pivoted on the pin 752 is a rocker arm 754 having ears formed at its opposite ends and between these ears at each end of the arm are downwardly extending rods 756 and 758 which extend through bosses formed on the lower side of the turret and project beyond the bosses for a considerable distance, as shown in Fig. 2. The rocker arm 754 has an upwardly extending arm 760 adjacent to its pivot which forms the lower link of a toggle, the arm 760 being pivotally connected by a pin 762 to an upper link 764 which completes the toggle. The upper end of the toggle link 764 is pivoted on an outwardly extending pin 766 (Fig. 23) carried by a block 768 slidably mounted between upwardly projecting ears 770 formed at the upper edge of the reservoir, the block being formed on the upper end of a vertical shaft 772 which is arranged for heightwise movement in a hole 774 formed in the wall of the reservoir. The upper surface of the block 768 has a depression 775 formed therein which is engaged by a screw 776 threaded through an enlarged portion 778 formed at the upper end of a downwardly inclined rod 780 located inside the reservoir and provided at its lower end with a U-shaped coupling 782. Pivoted to the coupling 782 on a pin 784 is a substantially horizontal link 786 the opposite end of which is pivoted on a pin 788 extending through downwardly projecting ears 790 formed on the bottom of the casting 700. The upper side of the link 786 passes directly under the pin 740 which projects downwardly from the outlet valve 726 so that, when the link is swung in an upward direction about the pivot 788, it will engage the pin 740 and raise the outlet valve 726 away from its seat, thereby holding the outlet valve open until the link 786 is lowered again to its original position. Moreover, in opening the valve 726 in the manner described, the upper end of its shank portion 724 will engage the shoulder 738 on the inlet valve 718 and hold this valve forcibly against the opening in the chamber 708.

The outlet valve 726 is opened by the link 786 when the toggle 760, 764 is straightened to elevate the block 768 and thus raise the connecting rod 780. When the toggle is broken, as shown in Figs. 2 and 23, the valves are closed by the compression spring 732 but the inlet valve can be opened. The toggle remains in a straightened position until it reaches the operating station and a shoe has been mounted on the pad ready to receive pressure. The operator then breaks the toggle through depression of the treadle, as will be presently described, and simultaneously straightens the toggle of the valve mechanism next to come into the operating station.

The mechanism for breaking the toggle 760, 764 at the operating station, and for straightening the toggle of the mechanism just in advance of the operating station, has been referred to above in connection with the jack locking mechanism and is best illustrated in Figs. 2, 12 and 14. Referring first to Fig. 12, it will be recalled that the arm 460 is lowered about its pivot 354 by depression of the treadle 406 until it engages the horizontal projection 470 of the locking member 346 which it then lowers against the action of the diverging springs 480 to lock the jack, the latter having by this time fully descended together with the jack-elevating lever 352. The central arm 466, which is held against the arms 458, 460 by the tension spring 469, moves downwardly about the pivot 354 with these arms. After the jack has reached its lowest position and has been locked, the stud 340 becomes stationary so that further downward movement of the treadle causes the outside arms 458, 460 to descend further relatively to the central arm 466 which is held against further downward movement by the stud 340, this action being permitted by the tension spring 469.

The central arm 466 carries on its right side, as viewed from the front of the machine, a roll 792 and the arm 460 carries an upwardly extending member 794 pivoted on a screw 796 secured in the arm 460. The member 794 has a curved cam surface on its forward side which is arranged to engage the roll 792 and to force the member 794 rearwardly or in a clockwise direction, when downward movement of the arm 466 is stopped by the stud 340. The bracket 356 (Figs. 12 and 14) has two forwardly and upwardly projecting portions 798 formed thereon in which is journaled a transverse shaft 800. Rotatably mounted on the right-hand portion of this shaft is a relatively wide segmental cam member 802 having a narrow tail 804 which extends forwardly and is engaged by a rearwardly extending portion of the pivoted member 794, the segmental cam 802 being maintained normally in a forwardly rotated position by a torsion spring 806 having one end hooked around the portion 798 and the other end hooked around the cam, this forward position of the cam being determined by a laterally projecting portion thereof which engages the arm 460, as shown in Fig. 14. When the pivoted member 794 is deflected rearwardly by the roll 792, the segmental cam is rotated in a counterclockwise direction, as viewed in Fig. 12, and a surface on its upper end engages the downwardly extending rod 756 of the toggle mechanism 760, 764 and forces this rod upwardly to rotate the rocker arm 754 in a direction to break the toggle 760, 764 and thereby to close the outlet valve and permit the inlet valve 718 to open under fluid pressure.

The forwardly extending arm 458 has pivoted on its forward side, as viewed in Fig. 2, a small block 808 which supports an upwardly extending rod 810, the upper portion of which is enlarged and is held against the block by a compression spring 812 surrounding the lower portion of the rod and bearing at its upper end against the block and at its lower end against a pair of nuts 814. The enlarged portion of the rod is slotted and in the slot is a pin 816 carried at the outer end of a forwardly extending arm 818 (Fig. 14) pinned to the shaft 800. Fixed to the left-hand end of the shaft 800 is a rearwardly extending arm 820, the inner end of which is enlarged to engage the downwardly extending rod 758 of that set of toggle mechanism which is located just in the rear of the operating station. When the treadle 406 is depressed to lower the treadle rod 424 and thereby to unlock the inlet valve of the mechanism at the operating station, the arm 458 moves downwardly and, through the spring-pressed rod 810 and the arm 818, rotates the shaft 800 to move the arm 820 upwardly to engage the toggle rod 758 and to straighten the toggle 760, 764, further downward movement of the arm 458 being taken up by the spring 812. The toggle is stopped in its straightened position by a screw 822 (Fig. 2) threaded horizontally through an outwardly projecting lug 824 formed on the portion 750 of the wall of the reservoir.

The machine is provided with safety means for preventing the treadle-operated valve-controlling mechanism from breaking the toggle 760, 764 and unlocking the inlet valve 718 at the operating station to inflate the bag 140 when no shoe is on the jack. This means comprises an upwardly extending arm 826 (Figs. 2 and 12) secured by screws to the projection 350 on the jack-elevating lever 352 and carrying at its upper end a screw 828 which is in position to engage the leaf spring 478 on the arm 460 as the latter is rotated downwardly through the depression of the treadle 406 to operate the jack locking member 346. It will be recalled that the lever 352 is attached to a dashpot 451 which prevents this lever and the jack from descending too rapidly in bringing the shoe against the pad 138. In the operation of the machine the operator may depress the treadle 406 faster than the lever 352 and jack are permitted to descend by the dashpot. The leaf spring 478, therefore, will engage the screw 828 and retard the downward movement of the treadle or, in other words, cause the mechanisms to move downwardly as a unit. When the shoe on the jack engages the pad the stud 340 becomes stationary, as explained above, so that further depression of the treadle causes relative movement between the two arms 460 and 466 to operate the valve cam 802 and thereby to break the valve operating toggle.

When no shoe is on the jack, however, the jack will have farther to travel downwardly and, without the screw 828 to retard the downward movement of the arms 460, 466, they might easily overtake the slowly descending stud 340 and cause relative movement between the two arms to break the toggle and open the inlet valve before the jack had lowered far enough under the influence of the dashpot to move the stud below the reach of the arm 466. Accordingly, the screw 828 prevents this by engaging the leaf spring 478 and causing the entire mechanism to move downwardly together as a unit so that the arm 466 can never overtake the stud 340 and unlock the inlet valve when no shoe is mounted on the jack. After the jack has fully descended the leaf spring on the arm 460 engages the horizontal projection 470 and locks the jack in its lowered position whether or not there is a shoe on the jack.

I come now to the mechanism with which the machine is provided for rotating the turret 44 intermittently in the column 42 to present the pressure applying devices 46 successively at the operating station, this mechanism being best illustrated in Figs. 24 to 31, inclusive. As stated above, besides rotating in the column 42 the turret is arranged for limited heightwise movement relatively to the column. The turret is raised through the operation of the "Thrustor Unit" 508 in elevating the piston 642 to supply fluid under pressure to the various bags 140. This is accomplished in the following manner: As the piston moves upwardly in the chamber 645 (Fig. 21) it increases the pressure in the water-filled chamber so that the water enters the various bags through the valve mechanisms 678 until the pressure in the bags and in the chamber 645 becomes sufficient to overcome the weight of the turret at which time the turret will commence to rise in the column. As shown in Fig. 21, the turret rests of its own weight on a laterally projecting flange 830 formed at the upper end of the column 42. Outside this flange the turret is provided with a downwardly extending circular wall 832 which surrounds the flange 830 and has bolted to its lower side a pair of semicircular rings 834 having formed on their under sides six downwardly facing cam portions 836 having similarly shaped cam surfaces 838 at their lower sides, these surfaces inclining upwardly from the lowest end of each cam to a point adjacent to the rings 834 and then curving downwardly again on a relatively small radius. Secured to the right-hand side of the column, as viewed in Fig. 1, some distance below the cams 836, is a bracket 840 (Figs. 24 and 26) fastened to the column by bolts 842 and having an upwardly projecting web portion 844 with an inwardly facing vertical wall 846 formed thereon above the main portion of the bracket. The bracket 840 is provided with a vertical hole in which is adjustably mounted on a supporting screw 847 secured in position by a binding screw 849, a shaft 850 carrying at its upper end a U-shaped member 852 through which passes a horizontal pin 854, the pin being secured in one side of the U-shaped member by a set screw 856. Pivoted on the pin 854 is a short H-shaped arm 858 (Fig. 26) and surrounding the pin between the lower ears of the arm 858 is a torsion spring 860, one end of the spring engaging the U-shaped member 852 and the other end being hooked under the arm 858, thereby tending to urge the arm in a counterclockwise direction, as viewed in Fig. 25, until a projection 861 on the arm engages the inwardly facing wall 846, thus maintaining the arm in a substantially vertical position. In the ears at the upper end of the arm 858 is rotatably mounted in suitable bearings (Fig.

26) a pin 862 and between the ears the pin carries a roll 864. The roll 864 is so positioned that when the machine is at rest the roll is engaging one of the cam surfaces 838 of the six downwardly facing cams 836. When one of the pressure-applying units is located at the operating station, the roll 864 will be positioned at the lowest part of the cam surface 838 adjacent to its curved portion and the arm 858 will have been rotated by such portion toward the right, as viewed in Fig. 24, against the action of the torsion spring 860.

Inside the downwardly extending turret wall 832 the rings 834 (Fig. 21) are provided with a number of circular plugs 866 made of rubber, or other resilient material, which are seated in suitable recesses and are arranged to engage the lower side of the flange 830 and thus limit upward movement of the turret in the column 42.

When the fluid pressure in the bags 140 reaches approximately thirty pounds to the square inch the weight of the turret 44 is overcome and the latter moves upwardly away from the flange 830 and continues its upward movement until the plugs 866 strike the lower surface of the flange 830. The piston 642 continues its upward movement, however, to increase the pressure in the bags until it is approximately 70 or 80 pounds to the square inch which is the pressure generally required to perform the sole-laying or the sole-attaching operation. During this time the turret is, of course, maintained in its elevated position by the pressure in the chamber 645. As soon as the turret has moved high enough on the column to release the roll 864 from the curved portion of the cam surface 838, the arm 858 will be swung toward the left in Fig. 24 by the spring 860 to cause its forward edge to engage the inner surface of the wall 846, as shown in Fig. 25, thereby positioning the roll 864 under the high portion of the next cam surface 838.

As stated above, the switch mechanism which controls the operation of the "Thrustor Unit" can be set so that it will throw out automatically and cause the unit to cease operating when the pressure in the pads reaches the required amount, for example, 70 or 80 pounds to the square inch. After the "Thrustor Unit" has ceased operating, the piston 642 commences almost immediately to be lowered by downward movement of the levers 514, 516 under the action of the weights 519 pivoted near their outer ends. This action reduces the pressure in the cylinder 643 until it is not sufficient to maintain the turret in its elevated position. Accordingly, gravity causes the turret to descend or settle back toward its original position against the supporting flange 830 on the column. While the turret is descending to its original position by gravity, the roll 864 is engaging the surface 838 of that cam 836 under which it was swung when the turret was elevated. The turret is, therefore, caused to turn or rotate as it descends until the roll is again engaging the low or curved portion of the cam surface. The length of this cam surface is such that the turret will be rotated exactly one-sixth of a revolution during its descending movement. The arm 858 will be swung toward the right, as shown in Fig. 24, during the latter part of the rotation of the turret so that it will be in position to be swung up later into a vertical position and thus locate the roll 864 under the high part of the next cam 836 when the turret is again elevated by the piston.

In order that the turret will stop in exactly the right position to locate each pressing device at the operating station, the flanged portion 830 of the column is provided at a point adjacent to the operating station with an upwardly extending indexing plunger 868 (Figs. 27 and 30) slidably mounted in a hole 870 formed in a lug on the side of the column and urged upwardly by a compression spring 872 entering a hole in the lower portion of the plunger and bearing at its lower end against the bottom of the hole 870. The upper end of the plunger is beveled or inclined in the direction of travel of the turret, as shown in Fig. 30, and is rounded over somewhat at its edges to reduce the friction when the plunger engages the bottom surface of the turret as the latter is descending toward the flange 830. To keep the beveled end of the plunger always facing in the right direction a slot 874 is formed in its lower portion which is engaged by the end of a screw 876 threaded into the boss on the turret, as shown in Fig. 30. This slot and screw arrangement also limits upward movement of the plunger 868 under the force of the compression spring 872. The turret is provided with six vertical holes 878 (Fig. 28) which are located radially thereof at points adjacent to each of the six pressure-applying devices and spaced outwardly of the axis of the turret a distance corresponding to the position of the plunger so that they will be in line with the plunger. Each hole is provided with a bushing 880 which fits the reduced end of the plunger and into which the latter snaps as the hole registers therewith. This mechanism constitutes positive means for indexing and locking the turret in exactly the right position to present each pressure-applying device at the operating station. The plunger is withdrawn from the bushing 880 when the turret is elevated under the action of the piston 642, and the plunger will be depressed as the turret descends and engages the rounded end of the plunger before the latter has registered with the next succeeding hole 878.

Since the turret and the mechanism carried thereby weigh in the vicinity of six hundred pounds it acquires considerable momentum as it rides down the inclined cam surfaces 838. Accordingly, a friction brake is provided to retard the rotation of the turret as it approaches the column, thereby insuring that the plunger 868 of the indexing mechanism will snap into the holes 878 and lock the pressure-applying devices successively at the operating station and also insuring that the plunger will not be sheared off by the momentum of the turret. The brake comprises a pair of thin semi-circular rings or plates 882, 884 (Figs. 21 and 29) located in depressions formed in the upper surface of the flange 830 and having secured to their upper surfaces by rivets 887 layers 886, 888 of any suitable brake lining material. The plates 882, 884 are secured to the flange of the turret, as shown in Figs. 29 and 31, by a pair of headed pins 890 which are countersunk into the plates to bring their top surfaces below the exposed surfaces of the brake lining material, the pins being secured in the column by binding screws 892 which enter wedge-shaped grooves in the pins and tend to urge them downwardly against the plates. At the point on the column where the plunger 868 is located, the plate 882, as shown in Fig. 29, has a slot 894 formed therein to permit the plunger to pass through. As the turret nears the lower end of its downward movement, the horizontal surface inside the wall 832 will engage the brake lining and thus slow down the rotation of the turret so that the indexing plunger 868 will always snap into the proper hole 878.

Referring now to Figs. 2 and 19, it will be recalled that the rearwardly extending latch arm 600 associated with the latch 604 has an inclined surface 602 thereon extending rearwardly and downwardly, as viewed in Fig. 2. When the weight-carrying arm 386 has been rotated upwardly about its pivot 354 by the power-operated toggle mechanism illustrated in Fig. 19, the latch arm 600 is located in a much higher plane than that shown in Fig. 2. The rearwardly inclined surface 602 is then in a position to be engaged by a plurality of downwardly extending fingers 896 (Fig. 2), one for each set of pressure-applying mechanisms, the forward surfaces of these fingers being rounded over to reduce friction and each finger being rigidly secured in a boss formed in a web portion of the turret. The six fingers 896 are so positioned around the turret that one of them will engage the inclined surface of the latch arm 600 and rotate said arm downwardly to disconnect the latch 606 from the stud 610 on the column at the same time that the indexing plunger 868 (Fig. 27) snaps into the hole 878 associated with the pressure-applying mechanism which is then being rotated into the operating station. In other words, the timing of the mechanism is such that as the pressure-applying mechanism which is approaching the operating station reaches that station and is locked therein by the plunger 868, a finger 896 will simultaneously unlatch the weight-carrying arm 386 from the column 42, thereby permitting the weight arm and the jack-elevating lever 352, which is latched to said arm through the arm 370 and latch mechanism 374, 376, to descend under the pull of the weight 384 and force the jack upwardly through the engagement of the projection 350 with the stud 340.

Before the above action takes place, however, the jack locking mechanism (Fig. 4) must be released to permit the jack to be elevated. To accomplish this, there is provided on an upwardly extending arm of the stationary bracket 415 (Figs. 2 and 12), which is supported at the front of the machine by the standard 417 fixed in the lower bracket 419, an inclined cam surface 898 which extends upwardly toward the right, as viewed in Fig. 1, and is in position to engage a roll 900 (Figs. 1, 2 and 4) secured by a pin 902 to the lower end of the jack locking slide member 346. As the turret rotates a sixth of a revolution to bring the next pressure-applying device into the operating station, the roll 900 engages the inclined cam surface 898 and elevates the jack locking member to permit the horizontal locking slides 488 to be pressed inwardly or toward each other by their compression springs 494, thereby disengaging the slides from the vertical shafts 212, 214. The jack is now free to rise under the action of the weight-carrying arm 386 when it is later unlatched from the column 42. Since the valve-operating mechanism of the pressure-applying device which has just entered the operating station has been operated at the position in advance of the operating station to open the outlet valve and to close the inlet valve, the bag 140 will, of course, be deflated at the time the jack is returned to its elevated position.

As the jack goes up the shoe leaves the pad and, since the operator is not now holding the abutments 54, 56 in their operative or vertical position, the torsion springs 234, 236 (Fig. 8) swing the carrier member 230 and the abutments forwardly toward their outwardly inclined position, as shown in Fig. 2. This moves the roll 285 on the bell-crank lever 284 (Fig. 10) out from under the lower edge of the bail 202 and permits the compression spring 298 to force that lever upwardly or in a counterclockwise direction, to straighten the last pin 268 which has been holding the shoe on the abutments 54, 56. When the last pin 268 straightens there is nothing holding the shoe on the abutments, and, accordingly, as they swing outwardly the shoe is thrown forwardly into a basket or tray 904 (Figs. 1 and 32) which rides on a circular track or rail 906 and is at that time in position to receive the shoe as it drops from the jack.

The circular track 906 comprises a relatively thin curved plate located parallel to the edge of the turret and supported by an upwardly extending angle bar 907 (Fig. 2) secured by screws 909 to the upper and lower brackets 415, 419. The upper end of the angle bar carries a collar 911 through which the member 906 is riveted to the bar so that the latter will be spaced a short distance from the track. The opposite end of the track 906 is similarly secured to an upstanding frame 913 (Fig. 1) bolted to the base of the machine. The basket 904 comprises a frame 908 (Fig. 32) covered with heavy canvas, felt, or similar material 910 and having two pairs of downwardly protecting ears 912 at its inner portion. Pivoted to these ears are a pair of upright supporting arms 914 braced by a cross piece 915 and having laterally projecting ears 916 at their lower portions between which are mounted a pair of rolls 918 arranged to ride on the upper edge of the track 906. The supporting members 914 are provided below the rolls 918 with T-shaped slots whereby they are supported and slide on the track and, at their lower portions as viewed in Fig. 1, are provided with another crossbar 920 having secured thereto adjacent to its opposite ends a pair of L-shaped members 922 carrying at their lower sides another pair of rolls 924, these rolls being adapted to engage the lower portion of the track. Adjacent to the laterally projecting ears 916 the supporting members 914 are provided with rearwardly extending lugs in which are mounted another pair of rolls 926 arranged to engage the side of the track 906 opposite that engaged by the rolls 924 so that the basket and its supporting mechanism may ride freely along the track while the members 914 are maintained in an upstanding position.

The forward supporting member 914, as viewed in Fig. 32, is provided with a pivot pin 928 upon which is pivoted an arm 930 which extends over the track and then projects downwardly and forwardly and has a rearwardly inclined edge portion which is arranged to be engaged successively by short horizontal pins 932 (Figs. 3 and 32) mounted in the edge of the turret 44 when the arm 930 is in the position shown in Fig. 32. The outer portion of the arm 930 is pivotally connected by an upstanding link 934 to a lug 936 formed near the central portion of the frame 908 and a tension spring 938 is connected to the arm 930 by a screw 940. The upper end of the spring is connected to the pin which secures the forward arm 914 to the ears 912 and the spring tends to maintain the basket in the upright or substantially horizontal position shown in Figs. 1 and 32. The arm 930 is provided at each side of the forward supporting link 914 with laterally projecting pins 942 which limit the rotation of the arm 930 about its pivot 928.

When the shoe at the operating station is thrown off the abutments 54, 56 the basket is located in front of the operating station so that the shoe lands therein. The weight of the shoe tips the basket downwardly about its pivots in the ears 912 against the tension of the spring 938 and this action rotates the arm 930 in a clockwise direction, as viewed in Fig. 32. The inner end of the arm 930 is thus rotated out of the path of the pin 932 which is engaging the arm at that time and is holding the basket in front of the operating station to receive the shoe. The arm 914 has secured thereto a cord 944 (Fig. 1) which runs over a pulley 946 secured at the extreme left-hand end of the circular track 906 on the upstanding frame 913. The other end of the cord 944 is attached to a weight 952 located in a tubular casing 954 secured by screws 956 to the frame. At the bottom of the casing is a rubber bumper 957 against which the weight strikes at the end of its downward movement. When the basket is tipped downwardly by the weight of the shoe to move the inwardly projecting end of the arm 930 upwardly out of the path of the pin 932, the weight 952 pulls the basket along the track 906 toward the left, as viewed in Figs. 1 and 3, until the left-hand roll 926 engages a stop 958 (Fig. 3) secured by a screw 960 to the inner side of the track. The operator then removes the shoe from the basket which causes the latter to swing upwardly under the action of the spring 938 and thus resume its upright or substantially horizontal position so that the arm 930 is again in position to be engaged by one of the pins 932 and to be moved by rotation of the turret, as the next pressure-applying mechanism advances into the operating station, to locate the basket in position at the front of the machine to receive the shoe which will be automatically ejected by the jack. The above arrangement permits the operator to prepare the shoe and sole which is next to be mounted on the jack without giving his attention to the shoe which has received pressure and is about to be released by the mechanism entering the operating station.

In the operation of the machine briefly summarized, the operator mounts a shoe with an outsole stuck temporarily thereon on the abutments 54, 56 and swings the latter inwardly over the pad, thereby locking the shoe on the jack. He then depresses the treadle 406 which rotates the upstanding arm 448 (Fig. 12) against the tapered arm 390 and unlatches the jack-elevating lever 352 from the weight-carrying arm 386. The jack descends against the resistance of the dashpot 451 until the shoe is pressed against the pad by the weight of the jack. By this time the operator has depressed the treadle sufficiently to cause the forwardly extending arm 460 to engage the lug 470 on the jack locking member 346 to depress the latter and lock the jack in its lowered position through the operation of the slide members 488. Further depression of the treadle causes the valve-operating arm 820 (Fig. 14) to be rotated upwardly and straighten the toggle mechanism which controls the valves of the pressure-applying mechanism which is next to enter the operating station, thereby opening the outlet valve and positively closing the inlet valve. At about the same time, the central arm 466 of the treadle-operated mechanism (Fig. 12) engages the stud 340 and causes relative movement between the arms 460 and 466 to operate the segmental valve cam 802, thereby unlocking the inlet valve of the mechanism at the operating station and closing its outlet valve. Final movement of the treadle brings the switch button 416 into contact with the switch 420 and starts the motor which operates the "Thrustor Unit", the treadle lever 410 being simultaneously unlatched from the treadle 406 and being returned to its elevated position by the spring 409.

The "Thrustor Unit" swings the transverse levers 514, 516 upwardly about their pivot 518 to raise the plunger 642 and to force the water in the cylinder 643 through the several valve mechanisms 678 into the bag 140 at the operating station and into any other bags which are below the required pressure. As the lever 514 rotates upwardly it operates the toggle mechanism illustrated in Fig. 19 to elevate the weight-carrying arm 386 until it is again latched in its upper position to the column 42, this arm also latching over the rearwardly extending arm 370 of the jack-elevating lever 352 so that it will lower this arm when the next jack is to be elevated. As the pressure in the cylinder 643 and in the bags increases it overcomes the weight of the turret and the latter rises until the rubber plugs 866 engage the flange on the column thereby stopping upward movement of the turret. Elevation of the turret permits the arm 858 of the turret rotating mechanism to snap under the high portion of the next cam 836 and thus be in position to rotate the turret when the pressure in the cylinder is reduced. When the pressure in the pads reaches the desired amount, for example, 70 or 80 pounds to the square inch, the pressure-controlled switch shuts off the motor and stops the "Thrustor Unit", thereby permitting the arms 514, 516 to descend under the weights 519 and to lower the piston in the chamber. This reduces the pressure in the chamber and permits the turret to descend. The inclined cam surface 838 on the turret thereupon rides along the roll 864 to rotate the turret one-sixth of a revolution, the brake mechanism on the column operating as the turret descends to retard its rotation and permit the indexing plunger 868 to snap into the hole 878 of the next pressure-applying mechanism and thus position this mechanism at the operating station. Since the valves of this mechanism have been operated at its previous position to open the outlet valve and close the inlet valve, the pad 140 will enter the operating station in a substantially deflated condition. As the mechanism moves toward the operating station the cam surface 898 (Fig. 1) on the bracket 415 engages the roll 900 to release the jack locking mechanism and, shortly after, one of the rigid fingers 896 engages the inclined surface 602 of the latch arm 600 to unlatch the weight-carrying arm 386 from the column 42 and permit the arm to descend with the jack-elevating arm 352 and thereby to elevate the jack to its inoperative position. As soon as the shoe leaves the pad the abutments 54, 56 swing outwardly and release the shoe which is thrown into the basket 904 in front of the operating station. The weight of the shoe tips the basket, releases the arm 930 from its engagement with the pin 932, and permits the weight 952 to move the basket along the curved track 906 to its position at the left-hand side of the machine. Before introducing another shoe, the operator removes the shoe from the basket which permits the latter to resume its upright position so that it will be carried forwardly to the front of the machine on the next rotation of the turret. The operator then selects another shoe, mounts it on the jack and depresses the treadle to cause the machine to repeat the operations just described.

Having described my invention, what I claim as new and desire to secure by Letters Patent of the United States is:

1. A machine for applying pressure to shoe bottoms having, in combination, a supporting column, a turret mounted on the column, a plurality of pressure-applying devices carried by the turret, and means acting alternately against and with gravity for rotating the turret intermittently on the column to present the devices successively at an operating station and for actuating the pressure-applying devices.

2. A machine for applying pressure to shoe bottoms having, in combination, a supporting column, a turret mounted on the column, a plurality of pressure-applying devices carried by the turret, and means for rotating the turret intermittently to present the devices successively at an operating station and for simultaneously actuating the pressure-applying devices, said means opposing the force of gravity to actuate the pressure-applying devices without rotating the turret and then utilizing the force of gravity for rotating the turret.

3. A machine for applying pressure to shoe bottoms having, in combination, a rotary turret, a plurality of inflatable pads mounted on the turret for applying pressure to shoe bottoms, means for rotating the turret intermittently to present said pads successively at an operating station, said means operating to elevate the turret and then to rotate it as it descends by gravity to its original position, and means operating prior to the heightwise movement of the turret for inflating the pads.

4. A machine for applying pressure to shoe bottoms having, in combination, a supporting column, a turret mounted on the column, a plurality of pressure-applying devices carried by the turret, fluid pressure means for successively moving the turret heightwise on the column and permitting it to return to its original position by gravity, means for causing said fluid pressure means to actuate the pressure-applying devices, and mechanism for rotating the turret sufficiently during each return movement to present each pressure-applying device in turn at an operating station.

5. A machine for applying pressure to shoe bottoms having, in combination, a supporting column, a turret mounted on the column, a plurality of inflatable pressure-applying pads carried by the turret and arranged to be presented successively at an operating station, fluid pressure means for elevating the turret on the column and for thereafter permitting it to descend to its original heightwise position by gravity, mechanism carried by the turret and cooperating with mechanism on the column for causing the turret to rotate as it descends and thereby to present another device at the operating station, and means for causing said fluid pressure means to inflate the pads prior to its elevation of the turret.

6. A machine for applying pressure to shoe bottoms having, in combination, a hollow supporting column, a turret mounted in said column, a plurality of inflatable pressing devices carried by the turret and arranged each to receive a sole and shoe, a plurality of inclined cam surfaces on the column, each surface being located opposite a pressing device, fluid pressure means for successively elevating the turret in the column and permitting it to return to its original heightwise position by gravity, a roll on the column for engaging the cam surfaces and causing the turret to rotate during each descending movement, thereby presenting each device in turn at an operating station, and means for causing the fluid pressure means to inflate the pressing device at the operating station before said fluid pressure means elevates the turret.

7. A machine for applying pressure to shoe bottoms having, in combination, a vertical supporting column, a rotary turret mounted on said column, a plurality of pressure-applying devices carried by the turret and arranged to be presented in turn at an operating station, means for successively elevating the turret in the column and permitting it to descend by gravity, said means operating also to actuate the pressure-applying devices, mechanism for causing the turret to rotate as it descends and thereby position another device at the operating station, and means for locking the turret after it has completed its descending movement.

8. A machine for applying pressure to shoe bottoms having, in combination, a hollow supporting column, a turret mounted for heightwise and rotary movement on said column, a plurality of inflatable pressure-applying pads mounted radially on the turret and arranged to be presented successively at an operating station, fluid pressure means for elevating the turret and for permitting it to descend under its own weight, said means operating to inflate the pads before elevation of the turret, mechanism on the column for engaging the turret and causing it to rotate during such descent to present another pad at the operating station, means on the column for locking the turret when said pad has been rotated into the operating station, and means for retarding the rotation of the turret during the latter part of its descending movement to facilitate the operation of the locking means.

9. A machine for applying pressure to shoe bottoms having, in combination, a supporting column, a turret rotatably mounted in the column and arranged for movement heightwise thereof, a plurality of inflatable pressure-applying pads mounted at spaced intervals on said turret, and means for inflating the pads and for causing intermittent rotation of the turret to present each pad in turn at an operating station, said means comprising a fluid pressure cylinder integral with the turret, a reciprocating piston for causing the fluid pressure in said cylinder to inflate the pads and for increasing said pressure until it overcomes the force of gravity and raises the turret in the column, movement of said piston thereafter reducing the pressure in the cylinder sufficiently to permit the turret to descend under its own weight, cams on the bottom of the turret having upwardly inclined cam surfaces, and a roll on the column for successively engaging the cam surfaces during each descent of the turret and causing the turret to rotate as it descends, thereby moving each pad in turn into the operating station.

10. A machine for applying pressure to shoe bottoms having, in combination, a supporting column, a turret mounted on said column, a plurality of inflatable pressure-applying pads on the turret each adapted to receive a sole and shoe, fluid pressure means for elevating the turret when a pad is located at an operating station and for permitting the turret to descend thereafter under the force of gravity, mechanism for causing the turret to rotate during its downward movement to move the pad out of the operating station and move the next pad in, means for indexing the turret to locate the last-named pad in said operating station, and means for causing the turret-elevating means to inflate the pads to apply pressure to the shoes and soles thereon.

11. A machine for applying pressure to shoe bottoms having, in combination, a vertical supporting column, a rotary turret mounted thereon and arranged for movement heightwise thereof, a plurality of inflatable pads mounted radially of the turret and arranged to be presented in succession at an operating station, fluid pressure means for inflating the pads, and means cooperating with said fluid pressure means for presenting each pad at said operating station, said means comprising power-operated mechanism for causing the fluid pressure means to raise the turret when a pad is located at the operating station and then permit it to descend under gravity, cams on the turret having downwardly facing inclined cam surfaces, a roll on the column for engaging said cam surfaces successively when the fluid pressure means permits the turret to descend, thereby causing it to rotate during its descending movement, a brake for retarding rotation of the turret, and a plunger for locking the turret against rotation at the end of its downward movement.

12. A machine for applying pressure to shoe bottoms having, in combination, a supporting column, a rotary turret mounted on the column and arranged for movement heightwise thereof, a plurality of inflatable pads on the turret for applying pressure to shoe bottoms, fluid pressure means for inflating the pads, said means operating successively to elevate the turret on the column and to permit it to descend by gravity, means for rotating the turret as it descends to present each pad in turn at an operating station, and a spring-pressed plunger on the column arranged successively to snap into holes in the turret and thereby to lock the turret against rotation at the end of each downward movement, said plunger being depressed by the column as the latter descends and then snapping into a hole as said hole is moved over the plunger by rotation of the turret, unlocking of the turret being effected by its raising off the plunger during its next elevating movement.

13. A machine for applying pressure to shoe bottoms having, in combination, a supporting column, a rotary turret mounted on said column, a plurality of inflatable bags carried by the turret and arranged each to apply pressure to a sole and shoe, means for inflating each bag at an operating station to apply pressure to the sole and shoe mounted thereon, and means for rotating the turret intermittently to move the bags successively into the operating station, said means acting to elevate the turret while the bag at the operating station is being inflated and then permitting the turret to descend to its original heightwise position through gravity which it utilizes in rotating the turret.

14. A machine for applying pressure to shoe bottoms having, in combination, a supporting column, a turret mounted on said column, a plurality of inflatable bags on the turret each arranged to receive a sole and shoe, means for inflating each bag at an operating station to apply pressure to the sole and shoe thereon, said means also elevating the turret on the column and, after the required pressure is produced in the bag, permitting the turret to descend through gravity, and mechanism on the column for rotating the turret as it descends thereby moving the next bag into the operating station.

15. A machine for applying pressure to shoe bottoms having, in combination, a supporting column, a turret mounted on said column, a plurality of inflatable bags on the turret each arranged to receive a sole and shoe, means for inflating each bag at an operating station to apply pressure to the sole and shoe thereon, said means also elevating the turret on the column and, after the required pressure is produced in the bag, permitting the turret to descend through the force of gravity, mechanism for rotating the turret as it descends to present the next bag at the operating station, and means actuated by heightwise movement of the turret for locking it against rotation after the bag has been positioned in said station.

16. A machine for applying pressure to shoe bottoms having, in combination, a supporting column, a turret mounted on said column, a plurality of inflatable bags on the turret each arranged to receive a sole and shoe, means for inflating each bag successively at an operating station to apply pressure to the sole and shoe thereon, said means also elevating the turret on the column and, after the required pressure is produced in the bag, permitting the turret to descend through the force of gravity, mechanism on the column for engaging the turret as it descends an . for rotating it to present the next bag at the operating station, and means actuated alternately by descent and elevation of the turret for locking the latter against rotation and for unlocking it to permit rotation.

17. A machine for applying pressure to shoe bottoms having, in combination, a supporting column, a turret mounted on the column, a plurality of inflatable pressure-applying bags carried by the column, means for inflating each bag at an operating station and for raising the pressure in any other bags which may be below the required pressure except the bag next to enter the operating station, means for stopping said inflating means when the required pressure is produced in the bags, means for elevating the turret intermittently and permitting it to descend by gravity, and means assisted by gravity for rotating the turret to present each bag in turn at the operating station.

18. A machine for applying pressure to shoe bottoms having, in combination, a supporting column, a turret mounted on the column, a plurality of inflatable shoe receiving bags mounted at spaced intervals on the turret, means for inflating each bag in turn at an operating station and for raising the pressure in any other bags which through leakage may be below the required pressure except the bag next to enter the operating station, said means operating during the inflating operation to elevate the turret in the column, means for automatically stopping the inflating means when the required pressure is produced in the bags, thereby permitting the turret to descend by gravity to its original heightwise position, and mechanism on the column for engaging the turret as it descends and rotating it to present the next bag at the operating station.

19. A machine for applying pressure to shoe bottoms having, in combination, a supporting column, a turret mounted on the column, a plurality of inflatable shoe receiving bags mounted at spaced intervals on the turret, means for inflating each bag in turn at an operating station and for raising the pressure in any other bags which through leakage may be below the required pressure except the bag in advance of the operating station, said means operating during the inflating operation to elevate the turret in the column, means for automatically shutting off said inflating means when the required pressure is produced in the bags, thereby permitting the turret to descend by gravity to its original heightwise position, a roll for engaging the turret as it descends by gravity and for rotating it to move the next bag into the operating station, and a plunger for locking the turret in position after such rotation.

20. A machine for applying pressure to shoe bottoms having, in combination, a supporting column, a turret mounted on the column, a plurality of inflatable bags carried by the turret and arranged to apply pressure to a sole and shoe, a plurality of cams on the turret having upwardly inclined surfaces, said cams being located opposite the bags, means for inflating the bags at an operating station to apply pressure to the sole and shoe, said means operating also to elevate the turret and thereafter to permit it to descend by gravity, and a roll on the column for engaging the cams successively during each descent of the turret and rotating it to present another bag at the operating station, said roll being movable into position to engage the succeeding cam upon each elevation of the turret.

21. A machine for applying pressure to shoe bottoms having, in combination, a supporting column, a turret mounted on the column, pressure-applying pads on the turret for receiving a sole and shoe, a plurality of downwardly facing cams carried by the turret and having upwardly inclined cam surfaces, means for elevating the turret and permitting it to descend by gravity, said means acting also to operate the pressure-applying pads, means for engaging the cam surfaces successively on each descent of the turret and rotating the turret after the pads have been operated, a friction brake for retarding rotation of the turret at the end of its downward movement, and means for locking the turret against rotation until its next elevating movement.

22. A machine for applying pressure to shoe bottoms having, in combination, a supporting column, a turret mounted on the column, a plurality of inflatable bags carried by the turret and arranged each to apply pressure to a sole and shoe, a plurality of cams on the turret having upwardly inclined surfaces, one of said cams being located opposite each of the bags, means for inflating the bags at an operating station to apply pressure to the sole and shoe, said means operating also to elevate the turret and thereafter to permit it to descend by gravity, a roll on the column for engaging the cam surfaces successively on each descent of the turret and thereby rotating said turret to present the bags in turn at the operating station, friction means for braking the rotation of the turret as the bag moves into the operating station, and a plunger for locking the turret against rotation after the bag has been positioned at said operating station.

23. A machine for applying pressure to shoe bottoms having, in combination, a supporting column, a rotary turret mounted on said column, a plurality of inflatable sole and shoe receiving pads carried at spaced intervals on the turret and arranged to be presented one at a time at an operating station, a piston arranged to reciprocate heightwise in a fluid pressure cylinder formed integrally with the turret, a lever for actuating said piston, said lever being elevated by power to raise the piston and thereby to inflate the pads and to elevate the turret through the fluid pressure in the cylinder but being lowered thereafter by weights so that the turret can descend by gravity, cams on the bottom of the turret having upwardly inclined bottom surfaces, one of said cams being located opposite each pad, a roll on the column for engaging the cam surfaces successively as the turret descends and rotating said turret to move the next pad into the operating station, a friction brake for retarding rotation of the turret, and a spring plunger in the column for entering openings in the turret and locking the latter at the end of each rotary movement.

24. In a machine for applying pressure to shoe bottoms, a jack for supporting a shoe and sole in pressure receiving position comprising a frame, shoe engaging members carried by the frame and arranged for swinging movement transversely thereof to receive a shoe and move it into pressure receiving position, and means actuated by swinging movement of said members for causing them to grip the shoe and hold it in pressure receiving position.

25. In a machine for applying pressure to shoe bottoms, a jack for supporting a shoe and sole in pressure receiving position comprising a frame, shoe engaging members carried by the frame and arranged for swinging movement transversely thereof to receive a shoe and to move with it into pressure receiving position, said members being also arranged for swinging movement longitudinally of the frame to position them for shoes of different lengths, means for causing said members to swing equal amounts in opposite directions longitudinally of the frame, and means actuated by transverse swinging movement of said members for locking them against further longitudinal movement after a shoe has been mounted thereon.

26. In a machine for applying pressure to shoe bottoms, a jack for supporting a shoe and sole in pressure receiving position comprising a frame, shoe engaging abutments pivoted on the frame and arranged for swinging movement transversely thereof, said abutments being also arranged for pivotal movement longitudinally of the frame to position them for shoes of different lengths, a gear segment on each abutment meshing with a gear segment on the other abutment to cause the abutments to move equal amounts in opposite directions longitudinally of the frame, and means actuated by transverse swinging movement of the abutments for causing them to grip the shoe and hold it in pressure receiving position without the assistance of an operator.

27. In a machine for applying pressure to shoe bottoms, a jack for supporting a sole and shoe in pressure receiving position comprising a bail, shoe engaging abutments pivoted on the bail and arranged for swinging movement transversely thereof, said abutments being also arranged for pivotal movement longitudinally of the bail to adapt them for engaging shoes of different lengths, and means operated by swinging movement of the shoe transversely of the bail into pressure receiving position for causing the abutments to grip the shoe and for thereafter locking them against further longitudinal movement.

28. In a machine for applying pressure to shoe bottoms, a jack for supporting a sole and shoe in pressure receiving position comprising a bail, a pair of shoe engaging abutments pivoted on the bail and arranged to swing outwardly to receive a shoe and to be swung inwardly to locate it in pressure receiving position, said abutments being relatively adjustable longitudinally of the bail to adapt them for receiving shoes of different lengths, means operated by swinging the abutments into pressure receiving position for causing them to grip the shoe, stops on the bail for locating the abutments in said position, and means for locking the abutments against relative longitudinal movement after they are located in such position.

29. In a machine for applying pressure to shoe bottoms, a jack for supporting a shoe in pressure receiving position comprising a frame, a carrier member pivoted on the frame and arranged for swinging movement transversely thereof, a pair of shoe engaging abutments pivoted on the carrier member for swinging movement longitudinally of the frame, said abutments and carrier member being arranged to be swung from an outwardly inclined shoe receiving position into pressure receiving position, means for causing the abutments to grip the shoe as they are swung into pressure receiving position, said means operating also to cause the abutments automatically to release and eject the shoe as they swing outwardly into said inclined position, and springs for swinging said abutments into said inclined position.

30. In a machine for applying pressure to shoe bottoms, a jack for supporting a sole and shoe in pressure receiving position comprising a frame, a pair of shoe engaging abutments pivoted on the frame and arranged for swinging movement transversely thereof, said abutments being also arranged for relative pivotal movement in equal amounts and opposite directions longitudinally of the frame, and means actuated by the transverse swinging movement of the abutments for locking them against relative pivotal movement longitudinally of the frame when they are located in pressure receiving position and for automatically unlocking them as they move out of such position.

31. In a machine for applying pressure to shoe bottoms, a jack for supporting a shoe in pressure receiving position comprising a frame, a pair of shoe engaging abutments pivoted on the frame for swinging movement transversely thereof, said members being also arranged for pivotal movement relatively to each other longitudinally of the frame to position them for shoes of different lengths, spring means for normally holding the abutments at the outer limit of their transverse swinging movement, means for causing said abutments to swing equal amounts in opposite directions when moved longitudinally of the frame, means on the frame for determining the inner limit of the transverse swinging movement of the abutments and thereby locating them in pressure receiving position, means on one of said abutments for urging the shoe against the other abutment as they are swung into pressure receiving position, thereby causing the abutments to grip the shoe and hold it without the assistance of an operator, and means for locking the abutments against relative longitudinal movement after they have been moved into pressure receiving position.

32. In a machine for applying pressure to shoe bottoms, a jack for supporting a shoe and sole in pressure receiving position comprising a frame, a carrier member pivoted on the frame for swinging movement transversely thereof, a pair of shoe engaging abutments pivoted on said carrier member and arranged for equal and opposite swinging movement longitudinally of the frame, springs for normally holding the carrier member in an outwardly inclined shoe receiving position, and means actuated by movement of said carrier member into and out of pressure receiving position for locking the abutments against longitudinal movement and unlocking them to permit such movement, said means comprising a pawl pivoted on the carrier member and arranged to engage teeth formed on one of the abutments, a spring for holding the pawl normally out of engagement with said teeth, and a spring arm arranged to engage the frame on inward swinging movement of the carrier member and to rotate the pawl into engagement with the teeth on said abutment thereby locking the abutments, reverse movement of the carrier member permitting the pawl to return to inoperative position to unlock the abutments.

33. In a machine for applying pressure to shoe bottoms, a jack for supporting a shoe and sole in pressure receiving position comprising a frame, a carrier member pivoted on the frame for swinging movement transversely thereof and limited movement heightwise thereof, a pair of shoe engaging abutments pivoted on said member and arranged for swinging movement longitudinally of the frame, and surfaces on the abutments for engaging the frame during heightwise movement of the carrier member when pressure is applied to the shoe and sole, thereby causing the frame to take the thrust of said pressure.

34. In a machine for applying pressure to shoe bottoms, a jack for supporting a shoe and sole in pressure receiving position comprising a frame, a carrier member pivoted on the frame and arranged for limited movement heightwise thereof when pressure is applied to the shoe, a pair of shoe engaging abutments pivoted on said member and arranged for equal and opposite swinging movement longitudinally of the frame to adapt them for shoes of different lengths, and surfaces on the abutments for engaging adjacent surfaces on the frame during heightwise movement of the carrier member when pressure is applied to the shoe, thereby causing the frame to receive the thrust of said pressure.

35. In a machine for applying pressure to shoe bottoms, a jack for supporting a shoe and sole in pressure receiving position comprising a frame, a carrier member pivoted on the frame and arranged for limited movement heightwise thereof when a shoe is put under pressure, a pair of shoe engaging abutments pivoted on said carrier member and arranged for swinging movement of equal amounts in opposite directions longitudinally of the frame, and concave surfaces on said abutments for engaging substantially complemental surfaces on the frame during the heightwise movement of the carrier member relatively to the frame when pressure is applied to the shoe, thereby causing the frame to receive the thrust of the pressure applied to the shoe and to prevent longitudinal displacement of the abutments.

36. In a machine for applying pressure to shoe bottoms, an endless carrier member, a plurality of pads mounted on the carrier member each adapted to receive and apply pressure to a sole and shoe, a jack for each pad, each jack being arranged to swing outwardly to receive a shoe and sole and to swing inwardly to position the shoe and sole on a corresponding pad, means at an operating station for effecting relative heightwise movement between each jack and pad to move the shoe against the pad, and means for locking the jack against further heightwise movement after the shoe has been located on the pad.

37. In a machine for applying pressure to shoe bottoms, a supporting column, a turret mounted on said column, a plurality of shoe receiving pads stationary on the turret for applying pressure to shoes and soles, a jack for each pad, said jacks being constructed and arranged to receive shoes and soles and to locate them on their respective pads, mechanism at an operating station for moving each jack heightwise relatively to its pad to position a shoe and sole on said pad, means for actuating said mechanism, means independent of the jack for causing the pad to apply pressure to the shoe and sole, and means for locking the jack while the shoe is under pressure.

38. In a machine for applying pressure to shoe bottoms, a supporting column, a turret mounted on said column, a plurality of pads stationary on the turret each adapted to apply pressure to a sole and shoe, jacks for locating a sole and shoe on each pad, said jacks being arranged for movement heightwise of the stationary pads and being normally supported at the lower limit of their heightwise movement, mechanism for elevating each jack at an operating station to permit a shoe to be mounted thereon and for lowering the jack to position the shoe on the pad, and means for locking each jack in its lowered position prior to the pressure-applying operation.

39. In a machine for applying pressure to shoe bottoms, a supporting column, an endless carrier member mounted on said column, a plurality of pads on the carrier member each adapted to apply pressure to a sole and shoe, jacks for locating a shoe and sole on each pad, said jacks being arranged for movement heightwise of the pads, a pair of slide rods for supporting each jack, said rods normally supporting the jack at the lower limit of its heightwise movement, mechanism for elevating said slide rods to raise the jack for receiving a shoe, and mechanism carried by the carrier member and cooperating with means on the slide rods for locking the jack in its lowered position while pressure is being applied to the shoe.

40. In a machine for applying pressure to shoe bottoms, a supporting column, a rotary turret mounted on said column, a plurality of pressure-applying pads adapted to engage and apply pressure to a sole and shoe, means for rotating the turret intermittently to present the pads successively at an operating station, a jack for each pad, said jacks being arranged to receive the shoes and soles at the operating station and to locate them on the corresponding pads, mechanism on the column for moving the jacks heightwise relatively to the pads when the latter are located at the operating station to position the shoes on said pads, means on the rotary turret for locking the jacks in pressure receiving position, and means independent of the turret for actuating said locking means.

41. In a machine for applying pressure to shoe bottoms, a supporting column, a turret mounted on said column, a plurality of pressure-applying pads on the turret adapted to receive a sole and shoe, means for rotating the turret intermittently to present the pads successively at an operating station, a jack for positioning a shoe on each pad and for receiving the thrust of the pressure applied thereto, mechanism for elevating each jack at the operating station to permit a shoe to be mounted thereon, said mechanism being actuated by rotation of the turret, and means for thereafter releasing the jack from the control of said elevating mechanism and thereby permitting it to descend by gravity to position the shoe on the pad.

42. In a machine for applying pressure to shoe bottoms, a supporting column, a rotary turret mounted on said column, a plurality of pads on the turret adapted to engage and apply pressure to a sole and shoe, means for rotating the turret intermittently to present the pads successively at an operating station, a jack for each pad constructed and arranged to introduce a shoe and sole thereon and to receive the thrust of the pressure applied to the shoe, mechanism for elevating said jacks separately at the operating station to permit a shoe and sole to be mounted thereon, said mechanism comprising a lever and a weight-carrying arm latched thereto, and means for unlatching the weight-carrying arm from the lever to permit the jack to descend under its own weight and position the sole and shoe on the pad.

43. In a machine for applying pressure to shoe bottoms, the combination of a supporting column, a rotary turret mounted on the column, a plurality of pads on the turret each arranged to engage and apply pressure to a sole and shoe, means for rotating the turret intermittently to present the pads successively at an operating station, a jack for each pad, a lever for elevating the jacks in turn at the operating station to permit shoes and soles to be mounted thereon, a weight-carrying arm for actuating said lever, said arm being latched to said lever, and means actuated by rotation of the turret for causing the weight-carrying arm to actuate said lever.

44. In a machine for applying pressure to shoe bottoms, the combination of a supporting column, a rotary turret mounted on the column, a plurality of pads on the turret each arranged to engage and apply pressure to a sole and shoe, means for rotating the turret intermittently to present the pads successively at an operating station, a jack for each pad, each jack comprising a frame movable heightwise of the pad and a pair of shoe engaging abutments movable longitudinally thereof, a lever for elevating the jacks separately at the operating station to permit a shoe and sole to be mounted on said abutments, a rotatable arm for actuating said lever, a weight for rotating said arm, and means actuated by rotation of the turret for causing the weight to rotate the arm and thereby elevate the jack.

45. In a machine for applying pressure to shoe bottoms, the combination of a supporting column, a turret mounted on the column, a plurality of pads on the turret each arranged to apply pressure to a sole and shoe, means for rotating the turret intermittently to move the pads successively into an operating station, jacks for receiving shoes and soles at said station and introducing them on the pads, each jack being movable heightwise of a pad to receive a shoe and position it on a corresponding pad, a lever for elevating each jack at the operating station, a weight-carrying arm for actuating said lever, said arm being latched to said lever during the elevating movement, and means on the column for maintaining said arm in an operative position before the jack moves into the operating station.

46. In a machine for applying pressure to shoe bottoms, the combination of a supporting column, a turret mounted on the column, a plurality of pads on the turret each arranged to apply pressure to a sole and shoe, means for rotating the turret intermittently to move the pads successively into an operating station, jacks for receiving shoes with soles at said station and introducing them on the pads, each jack being arranged for movement heightwise of a pad to receive the shoe and to position it on a pad, a lever for elevating each jack at the operating station, an arm for causing said lever to elevate the jack through the descent of a weight carried by said arm, said arm being latched to said lever during the jack-elevating movement, means for unlatching the weight-carrying arm from the lever to permit the jack to descend by gravity to locate the shoe on the pad, and means for moving the weight-carrying arm into latched engagement with said lever before the next jack is to be elevated.

47. In a machine for applying pressure to shoe bottoms, the combination of a supporting column, a rotary turret mounted on the column, a plurality of pads on the turret each arranged to engage and apply pressure to a sole and shoe, means for rotating the turret intermittently to present each pad in turn at an operating station, a jack for each pad constructed and arranged to move heightwise thereof to receive a shoe and thereafter to position it on a corresponding pad, a lever for elevating each jack at the operating station to permit the shoe with a sole to be mounted thereon, an arm connected to said lever and causing it to elevate each jack through the rotation of said arm under the action of a weight carried by the arm, treadle-operated means for disconnecting said arm from the elevating lever to permit the jack to descend by gravity and position the shoe on the pad, and means for returning said arm and weight to operative position before the next jack is to be elevated.

48. In a machine for applying pressure to shoe bottoms, the combination of a supporting column, a rotary turret mounted on the column, a plurality of pads on the turret each arranged to engage and apply pressure to a sole and shoe, means for rotating the turret intermittently to present each pad in turn at an operating station, a jack for each pad constructed and arranged to move heightwise thereof to receive a shoe and position it on the pad, a lever for elevating each jack at the operating station to permit the shoe to be mounted thereon, a weight-carrying arm latched to said lever and causing it to elevate the jack, means on the column for maintaining said arm in operative position prior to the elevation of the jack, and means for returning said arm into position to elevate the next jack after the jack at the operating station has moved on.

49. In a machine for applying pressure to shoe bottoms, the combination of a supporting column, a rotary turret mounted on the column, a plurality of pads on the turret each arranged to engage and apply pressure to a sole and shoe, means for rotating the turret intermittently to present each pad in turn at an operating station, a jack for each pad constructed and arranged to move heightwise thereof to receive a shoe and position it on the pad, a lever for elevating each jack at the operating station to permit the shoe to be mounted thereon, a weight-carrying arm latched to said lever and causing it to elevate the jack, a latch on the column for maintaining said arm in operative position prior to the elevation of the jack, and power-operated means for returning said arm into latched position before the next jack has moved into the operating station.

50. In a machine for applying pressure to shoe bottoms, the combination of a supporting column, a rotary turret mounted on the column, a plurality of pads on the turret each arranged to apply pressure to a sole and shoe, means for rotating the turret intermittently to present each pad in turn at an operating station, a jack for each pad constructed and arranged to be elevated and lowered at the operating station to position a shoe and sole on the pad at said station, a lever for elevating each jack, a weight and arm for actuating said lever, a latch on said arm for engaging said lever, treadle-operated means for unlatching the lever from the arm after a shoe has been mounted on the jack, thereby permitting the jack to descend by gravity and position the shoe on the pad, power-operated means for moving the arm into latched relation with the lever before the next jack is moved into the operating station, means for supporting said arm in such position, and means operated by rotation of the turret for releasing the arm from said supporting means to elevate the next jack.

51. In a machine for applying pressure to shoe bottoms, the combination of a supporting column, a rotary turret mounted on the column, a plurality of pads on the turret for applying pressure to shoes and soles, a jack for each pad, said jacks being movable heightwise to receive and locate shoes on their respective pads, means for elevating and rotating the turret intermittently to present the pads successively at an operating station, said means first elevating the turret and then permitting it to descend by gravity whereby it is rotated, a lever for elevating each jack at the operating station to permit a shoe to be mounted thereon, a weight carried by an arm for actuating said lever, said arm and lever being latched together during the jack-elevating movement, and means operated by rotation of the turret for automatically causing the weight-carrying arm to actuate the jack-elevating lever.

52. In a machine for applying pressure to shoe bottoms, the combination of a supporting column, a rotary turret mounted on the column, a plurality of pads on the turret for applying pressure to shoes and soles, a jack for each pad, said jacks being movable heightwise to receive and locate shoes on their respective pads, means for elevating and rotating the turret intermittently to present the pads successively at an operating station, said means first elevating the turret and then permitting it to descend by gravity whereby it is rotated, a lever for raising each jack at the operating station to receive a shoe with a sole, a weight carried by an arm for actuating said lever, a latch connecting said arm to the lever, a latch on the column for holding the arm and weight in elevated position prior to the elevation of the jack, means on the turret for unlatching the arm from the column and permitting the weight to descend, thereby elevating the jack at the operating station, said means being operated by rotation of the turret, treadle-operated means for unlatching the lever from the weight-carrying arm after a shoe has been mounted on the elevated jack, thereby causing the jack to descend under its own weight to locate the shoe on the pad and to move the elevating lever into inoperative position, and power-operated means for raising the weight and arm until the latter becomes latched to the elevating lever and to the column to hold the weight in position to elevate the next jack.

53. In a machine for applying pressure to shoe bottoms, the combination of a supporting column, a rotary turret mounted on the column, a plurality of pads on the turret for applying pressure to shoes and soles, a jack for each pad, said jacks being movable heightwise to receive and locate shoes on their respective pads, means for elevating and rotating the turret intermittently to present the pads successively at an operating station, said means rotating the turret as it descends by gravity, a lever for elevating each jack at the operating station to receive a shoe and sole, a weighted arm for actuating said lever, a latch on said arm for connecting it to said lever, treadle-operated means for unlatching the arm from the lever to permit the jack at the operating station to descend and position a shoe on the pad, power-operated means for returning the weighted arm to operative position after the jack has descended and for causing it to latch again to the elevating lever, a latch on the column for holding the weighted arm in such position, and fixed projections on the turret for automatically releasing the latch on the column and permitting the weighted arm to descend to elevate the next jack after the latter has moved into the operating station, each projection being so positioned that it operates as soon as the jack is located in the operating station.

54. In a machine for applying pressure to shoe bottoms, the combination of a supporting column, a rotary turret mounted on the column, a plurality of pads on the turret for applying pressure to shoe bottoms, jacks for introducing a shoe on each pad, means for elevating each jack to receive a shoe, mechanism for returning the elevating means to operative position after a jack has been elevated, said mechanism having an operating movement greater than is necessary to return the elevating means, and means for permitting said mechanism to complete its movement after the elevating means has been returned.

55. In a machine for applying pressure to shoe bottoms, the combination of a supporting column, a rotary turret mounted on the column, a plurality of pads on the turret for receiving soles and shoes, means for rotating the turret intermittently to present each pad in turn at an operating station, jacks for introducing a shoe on each pad, means for elevating each jack at the operating station, said means operating through the force of gravity, a power unit for returning said elevating means to operative position after a jack has been elevated, said unit having an operating stroke greater than the movement necessary to return the elevating means, and means for permitting the unit to complete its stroke after the elevating means has been returned without affecting said means.

56. In a machine for applying pressure to shoe bottoms, the combination of a supporting column, a rotary turret mounted on the column, a plurality of pads on the turret for receiving soles and shoes, means for rotating the turret intermittently to present each pad in turn at an operating station, jacks for introducing a shoe on each pad, means for elevating each jack at the operating station, said means acting through the force of gravity to elevate the jacks, a power unit for returning said means to operative position after a jack has been elevated, said unit having an operating stroke greater than the amount necessary to return the elevating means, and toggle mechanism actuated by the power unit for permitting the latter to return the elevating means to operative position and then to complete its stroke without acting further on said elevating means.

57. In a machine for applying pressure to shoe bottoms, the combination of a supporting column, a rotary turret mounted on the column, a plurality of pads on the turret arranged each to apply pressure to a sole and shoe, means for rotating the turret intermittently to present the pads successively at an operating station, a shoe jack for each pad, a lever for elevating each jack at the operating station to receive a shoe, a weight arm for actuating said lever, said arm being latched to said lever during its operative movement and being held in operative position prior to such movement by a latch on the column, a power unit for returning the weight arm into latched relation to the column after it has elevated a jack, said unit having an operating stroke greater than is necessary to return the arm, a transverse lever connected to said unit and engaging said arm, and toggle connections between the transverse lever and the weight arm for causing the unit to act on the arm only until it becomes latched to the column and thereafter, through the breaking of the toggle, to permit said unit to finish its operating stroke.

58. In a machine for applying pressure to shoe bottoms, in combination, a supporting column, a rotary turret mounted on the column, a plurality of bags mounted on the turret and arranged for inflation to apply pressure to shoes and soles, means for rotating the turret intermittently to present each bag in turn at an operating station, valve mechanisms associated with each bag, means for forcing fluid under pressure through said valve mechanisms to inflate the bags, and means for controlling said mechanisms to permit fluid to exhaust from the bag next to enter the operating station while the bag at said operating station and any other bags below the required pressure are receiving fluid under pressure.

59. In a machine for applying pressure to shoe bottoms, a plurality of bags arranged each to apply pressure to a sole and shoe, means for presenting each bag in turn at an operating station, means for forcing fluid under pressure into the bags to cause them to become inflated and apply pressure to the shoes and soles, means for controlling the admission of fluid pressure to each bag, said means comprising inlet and outlet valves normally closed, said inlet valves being arranged to open under fluid pressure, and means for positively locking the inlet valve that is located one position in the rear of the operating station against opening under fluid pressure while fluid is being forced through the other inlet valves into the bags and for holding the outlet valve at such position open, thereby permitting fluid to exhaust from the bag at said position while the other bags are being inflated.

60. In a machine for applying pressure to shoe bottoms, a supporting column, a rotary turret mounted on the column, a plurality of inflatable pressure-applying bags mounted on the turret and arranged to be presented one by one at an operating station to receive a sole and shoe, means for rotating the turret intermittently, valve mechanisms associated with each bag and having inlet and outlet valves, means for forcing fluid under pressure through said inlet valves to inflate the bags, and means at the operating station for holding the inlet valve of the mechanism next to enter the operating station closed and its outlet valve open so that fluid will be exhausted from the bag associated with said mechanism as the bag moves into the operating station.

61. In a machine for applying pressure to shoe bottoms, a supporting column, a rotary turret mounted on said column, a plurality of inflatable bags on the turret each arranged to apply pressure to a sole and shoe, means for rotating the turret intermittently to present the bags successively at an operating station, valve mechanisms associated with each bag for admitting fluid under pressure thereto and permitting it to be exhausted therefrom, a cylinder on the turret for supplying fluid under pressure to all of the valve mechanisms simultaneously, and a piston for creating fluid pressure in the cylinder and thereby forcing the fluid into the valve mechanisms.

62. In a machine for applying pressure to shoe bottoms, a supporting column, a rotary turret mounted on said column, a plurality of inflatable bags on the turret each arranged to apply pressure to a sole and shoe, means for rotating the turret intermittently to present the bags successively at an operating station, valve mechanisms associated with each bag for admitting fluid under pressure thereto and permitting it to be exhausted therefrom, a cylinder on the turret for supplying fluid under pressure to all of the valve mechanisms simultaneously, a piston arranged to reciprocate in said cylinder and force fluid under pressure through the valve mechanisms and into the bags, and a power unit for operating said piston.

63. In a machine for applying pressure to shoe bottoms, a supporting column, a rotary turret mounted on said column, a plurality of inflatable bags on the turret each arranged to receive and apply pressure to a sole and shoe, means for rotating the turret intermittently to present the bags successively at an operating station, valve mechanisms associated with each bag for admitting fluid under pressure thereto and permitting it to exhaust therefrom, each of said mechanisms having inlet and outlet valves which are normally closed, said inlet valves being arranged to open under fluid pressure, means at the operating station for locking the inlet valve of the mechanism next to enter said station against opening under fluid pressure and for opening its outlet valve to permit the corresponding bag to exhaust, a cylinder on the turret for supplying fluid under pressure to the valve mechanisms, and a piston for simultaneously forcing fluid through the inlet valves that are not locked against opening and into their respective bags.

64. In a machine for applying pressure to shoe bottoms, a supporting column, a rotary turret mounted on the column, means for rotating the turret intermittently, a plurality of inflatable bags on the turret each arranged to apply pressure to a sole and shoe, valve mechanisms for each of the bags, said mechanism having both inlet and outlet valves, means for normally maintaining said inlet and outlet valves closed but permitting the inlet valves to open under fluid pressure, means for forcing fluid under pressure through said inlet valves and into the bags to apply pressure to the soles and shoes, and means for locking each inlet valve against opening under fluid pressure when that valve mechanism is one position in the rear of an operating station and for holding its outlet valve open to permit fluid to exhaust from the bag associated with said mechanism as the bag moves into the operating station.

65. In a machine for applying pressure to shoe bottoms, the combination of a plurality of inflatable bags each arranged to receive and apply pressure to a sole and shoe, means for presenting the bags in turn at an operating station, mechanism for forcing fluid under pressure into the bags to inflate said bags and thereby apply pressure to shoes and soles mounted thereon, oppositely facing inlet and outlet valves associated with each bag, means for holding said valves normally closed but permitting the inlet valve to open under fluid pressure, means for moving the outlet valve next to enter the operating station relatively to the inlet valve to open said outlet valve and permit the bag associated therewith to become deflated, and connections between said valves for locking the inlet valve against opening under fluid pressure after said movement so that no fluid can enter the bag next to move into the operating station.

66. In a machine for applying pressure to shoe bottoms, the combination of a plurality of inflatable bags each arranged to receive and apply pressure to a sole and shoe, means for presenting the bags in turn at an operating station, mechanism for supplying fluid under pressure to inflate said bags and thereby apply pressure to shoes and soles mounted thereon, oppositely facing inlet and outlet valves associated with each bag, a spring for holding said valves normally closed but permitting the inlet valve to open under fluid pressure, toggle means for moving the outlet valve of the bag next to enter the operating station toward the inlet valve to open said outlet valve and hold it open while fluid under pressure is being forced into the other bags, thereby permitting said bag to become inflated, and a shoulder on said outlet valve for engaging the inlet valve and locking it against opening under fluid pressure while the outlet valve is held open, thereby preventing fluid from entering said bag.

67. In a machine for applying pressure to shoe bottoms, a supporting column, a rotary turret mounted on the column, a plurality of inflatable bags carried by the turret and arranged each to receive and apply pressure to a sole and shoe, valve mechanisms associated with each bag and arranged to admit fluid under pressure thereto and to permit it to be exhausted therefrom, separate mechanisms for controlling each valve mechanism, and means for operating the controlling mechanisms.

68. In a macnine for applying pressure to shoe bottoms, a supporting column, a rotary turret mounted on the column, a plurality of inflatable bags carried by the turret and arranged each to receive and apply pressure to a sole and shoe, valve mechanisms associated with each bag and arranged to admit fluid under pressure thereto and to permit it to be exhausted therefrom, each mechanism having an inlet valve and an outlet valve, toggle mechanisms for controlling said inlet and outlet valves, and manually operated means at an operating station for operating the toggle mechanisms separately.

69. In a machine for applying pressure to shoe bottoms, a supporting column, a rotary turret mounted on the column, a plurality of inflatable bags carried by the turret and arranged each to receive and apply pressure to a sole and shoe, means for rotating the turret intermittently to present each bag in turn at an operating station, valve mechanisms associated with each bag for admitting fluid under pressure thereto and permitting fluid to be exhausted therefrom, each mechanism having an inlet valve and an outlet valve, spring means for normally holding the inlet and outlet valves closed but permitting the inlet valves to open under fluid pressure, toggle mechanisms for locking the inlet valves against opening under fluid pressure and for holding the outlet valves open, and treadle-operated means for actuating each toggle mechanism when the bag associated therewith is located just in the rear of the operating station.

70. In a machine for applying pressure to shoe bottoms, a supporting column, a rotary turret mounted on the column, a plurality of inflatable bags carried by the turret and arranged each to receive and apply pressure to a sole and shoe, means for rotating the turret intermittently to present each bag in turn at an operating station, valve mechanisms associated with each bag and containing inlet and outlet valves, a toggle for controlling the operation of each valve mechanism, said toggles being normally broken to permit the inlet and outlet valves to close but allowing the inlet valves to open under fluid pressure, and an arm for straightening each toggle when its valve mechanism is in the position just in the rear of the operating station, thereby preventing the inlet valve from opening under fluid pressure and holding the outlet valve open to permit the bag associated with said mechanism to become deflated.

71. In a machine for applying pressure to shoe bottoms, a supporting column, a rotary turret mounted on the column, a plurality of inflatable bags carried by the turret and arranged each to receive and apply pressure to a sole and shoe, means for rotating the turret intermittently to present each bag in turn at an operating station, valve mechanism associated with each bag and containing oppositely facing inlet and outlet valves, a spring for normally maintaining the valves closed but permitting the inlet valve to open under fluid pressure, a toggle connected with each valve mechanism and arranged to change the positions of said inlet and outlet valves, said toggle being broken when the valves are in closed position, and a treadle-operated arm for straightening each toggle when its valve mechanism is located just in the rear of the operating station, thereby locking the inlet valve against opening under fluid pressure and holding the outlet valve open to permit fluid to exhaust from the bag associated with that valve mechanism.

72. In a machine for applying pressure to shoe bottoms, a plurality of inflatable bags arranged each to apply pressure to a sole and shoe, valve mechanisms connected with each bag, a supply chamber for forcing fluid under pressure into said valve mechanisms and through them into the bags, toggle mechanisms for controlling said valve mechanisms, and a treadle-operated arm for actuating said toggle mechanisms.

73. In a machine for applying pressure to shoe bottoms, a supporting column, a rotary turret mounted on said column, a plurality of inflatable bags on the turret each arranged to apply pressure to a sole and shoe, means for rotating the turret intermittently to move each bag in turn into an operating station, valve mechanisms connected with each bag, said mechanisms having both inlet and outlet valves, toggles on the turret for controlling the operation of said valve mechanisms, said toggles being broken to close the valves but permitting the inlet valves to open under fluid pressure and being straightened to close said inlet valves against opening under fluid pressure and to open the outlet valves, an arm for straightening each toggle when the bag associated therewith is located one position in the rear of the operating station, thereby permitting that bag to become deflated, and a cam for breaking said toggle when said bag is located at the operating station, thereby permitting said valve to open under fluid pressure so that the bag will be inflated.

74. In a machine for applying pressure to shoe bottoms, a supporting column, a rotary turret mounted on the column, a plurality of inflatable bags on the turret each arranged to apply pressure to a sole and a shoe, means for rotating the turret intermittently to move the bags in turn into and out of an operating station, means for inflating the bags, valve mechanisms connected with each bag, said mechanisms having inlet and outlet valves, springs for normally holding the inlet and outlet valves closed but permitting the inlet valve to open under fluid pressure, toggles on the turret for controlling the operation of said inlet and outlet valves, said toggles being broken when the valves are closed by the springs and being straightened to open the outlet valves and prevent the inlet valve from opening under fluid pressure, a movable arm for straightening each toggle one position in the rear of the operating station, thereby permitting its bag to exhaust, a rotatable cam for breaking the toggle of the bag at the operating station simultaneously with the straightening of the first-mentioned toggle, thereby permitting the inlet valve of the last-named bag to open under fluid pressure so that the bag will be inflated to apply pressure to a shoe and sole mounted thereon, and manually-operated means for rotating said cam.

75. In a machine for applying pressure to shoe bottoms, an endless carrier, a plurality of inflatable bags on the carrier arranged each to apply pressure to a sole and shoe, means for presenting the bags successively at an operating station, means for inflating each bag at said station, controlling mechanism for said inflating means, and means for actuating said controlling means constructed and arranged to operate only when a shoe is mounted on the bag.

76. In a machine for applying pressure to shoe bottoms, an endless carrier, a plurality of inflatable bags mounted on the carrier and arranged each to receive and apply pressure to a sole and shoe, means for moving the carrier intermittently to present the bags in turn at an operating station, means for inflating the bags, toggle mechanism for controlling the operation of said inflating means, and means at the operating station for actuating said controlling mechanism, so that the bag at the operating station will be inflated only when a sole and shoe are mounted thereon.

77. In a machine for applying pressure to shoe bottoms, a supporting column, a rotary turret mounted on the column, a plurality of inflatable bags on the turret arranged each to apply pressure to a shoe and sole, means for rotating the turret intermittently to present the bags in turn at an operating station, means for inflating the bags successively at the operating station and for simultaneously reinflating any of the other bags which may have become deflated through leakage, and treadle-operated mechanism for controlling the operation of the inflating means, said mechanism being constructed and arranged to prevent the bag at the operating station from being inflated when no shoe is mounted thereon.

78. In a machine for applying pressure to shoe bottoms, an endless carrier, a plurality of inflatable bags mounted on the carrier and arranged each to receive and apply pressure to a sole and shoe, means for moving the carrier intermittently to present the bags in turn at an operating station, means for inflating the bags to apply pressure to the shoes and soles, a valve for controlling the admission of fluid under pressure into each bag, means for opening and closing said valve, said means including a pair of arms movable as a unit and, when a shoe is on the bag at the operating station, movable also relatively to each other, a cam operated by relative movement of said arms, a toggle which is broken by said cam, and connections between the toggle and the valve permitting the valve to be opened to admit fluid under pressure to the bag at the operating station.

79. In a machine for applying pressure to shoe bottoms, a supporting column, a rotary turret mounted on the column, a plurality of inflatable bags on the turret arranged each to apply pressure to a shoe and sole, means for rotating the turret intermittently to present the bags in turn at an operating station, jacks for introducing shoes on the bags, means for inflating the bags successively at the operating station and for simultaneously reinflating any of the other bags which may have become deflated through leakage, valves for controlling the operation of said inflating means, toggle mechanisms for opening and closing said valves, treadle-operated means for actuating said mechanisms including a pair of arms arranged to be moved as a unit by a treadle and carrying mechanism for breaking the toggle at the operating station to permit the valve at said station to be opened by fluid pressure to inflate the bag, said mechanism being operated by relative movement of the two arms, and means on each jack for causing relative movement of said arms during depression of the treadle.

80. In a machine for applying pressure to shoe bottoms, an endless carrier, a plurality of inflatable bags on the carrier arranged each to apply pressure to a shoe and sole, means for presenting the bags in turn at an operating station, jacks for positioning shoes on the pads, means for inflating the bags successively at the operating station, valves for controlling the operation of said inflating means, said valves having inlet and outlet ports, toggle mechanisms for each valve arranged to open and close said ports, means for straightening each toggle when it is located in the position at the rear of the operating station to close the inlet port and open the outlet port, and treadle-operated mechanism for breaking each toggle after it has moved into the operating station to permit fluid under pressure to pass through the inlet port, said mechanism comprising a pair of arms operated by a treadle and normally movable together as a unit, a rotatable cam, a roll on one of said arms for rotating said cam, and a projection on the jack for causing relative movement between said arms during their movement by the treadle, thereby operating the cam which breaks the toggle.

81. In a machine for applying pressure to shoe bottoms, a supporting column, a rotary turret mounted on the column, a plurality of inflatable bags on the turret each arranged to receive and apply pressure to a sole and a shoe, means for rotating the turret intermittently to move the bags in turn into an operating station, valve mechanisms connected with each bag, said mechanisms having inlet and outlet valves, toggles on the turret for controlling the operation of said valves, said toggles being broken to permit the inlet valves to open under fluid pressure and being straightened to lock said valves in closed position and to open the outlet valves, a movable arm for straightening each toggle one position in the rear of the operating station, thereby permitting the bag at said position to exhaust, a rotatable cam for breaking the toggle of the bag at the operating station simultaneously with the straightening of the first-mentioned toggle, thereby permitting the last-named bag to become inflated to apply pressure to the shoe and sole mounted thereon, means for rotating said cam, and mechanism for preventing rotation of the cam and breaking of the toggle at the operating station when no shoe is mounted on that bag.

82. In a machine for applying pressure to shoe bottoms, the combination of a pad for applying pressure to a sole and shoe, a jack for introducing a shoe on said pad, said jack being constructed and arranged to swing transversely of the pad, means for swinging the jack outwardly when pressure on the shoe is relieved to permit the shoe to drop therefrom, and movable means set in operation by the weight of the shoe for receiving the shoe and transporting it into a position remote from the pad.

83. In a machine for applying pressure to shoe bottoms, the combination of an endless carrier, a plurality of pads on the carrier, means for moving the carrier to present the pads successively at an operating station, a jack over each pad, each jack being constructed and arranged to swing transversely of the pad, means for swinging the jacks outwardly when pressure on the shoe is relieved to permit the shoe to drop therefrom, and means released by the shoe for transporting the shoe.

84. In a machine for applying pressure to shoe bottoms, the combination of an endless carrier, a plurality of pads on the carrier, means for moving the carrier to present the pads successively at an operating station, a jack for each pad, each jack being constructed and arranged to swing transversely of the pad to grip the shoe when swung inwardly and to release the shoe when swung outwardly, means for swinging each jack outwardly at the operating station when pressure on the shoe is relieved, and means released by the shoe for conveying it to a point remote from the operating station.

85. In a machine for applying pressure to shoe bottoms, the combination of an endless carrier, a plurality of pads on the carrier, means for moving the carrier intermittently to present the pads in turn at an operating station, a jack over each pad arranged to swing outwardly at the operating station when pressure on the shoe is relieved to permit a shoe to drop therefrom, a track parallel to the path of the carrier, a carriage on the track, a basket mounted on said carriage, means constantly urging the carriage in one direction, means on the carrier for moving the carriage in the opposite direction, and means operated by contact of a shoe with the basket for releasing the carriage from the carrier.

86. In a machine for applying pressure to shoe bottoms, the combination of an endless carrier, a plurality of pads on the carrier for applying pressure to shoes and soles mounted thereon, means for moving the carrier to present the pads successively at an operating station, jacks for introducing a shoe and sole on each pad, each jack having shoe engaging means arranged to swing transversely of the pad and to grip the shoe when it is located in pressure receiving position and to release the shoe as it moves out of said position, springs for causing said engaging means to swing out of pressure receiving position when pressure on the shoe is relieved thereby releasing the shoe, and a basket for catching the shoe and automatically conveying it to a point remote from the operating station.

87. In a machine for applying pressure to shoe bottoms, the combination of an endless carrier, a plurality of pads on the carrier for applying pressure to shoes and soles, means for moving the carrier intermittently to present the pads in turn at an operating station, jacks for introducing shoes with soles on each pad, each jack having shoe engaging abutments arranged to swing transversely of the pad from an outwardly inclined position into a substantially vertical pressure receiving position, means for causing the abutments to grip the shoe in pressure receiving position and automatically to release it as they swing into the outwardly inclined position thereby ejecting the shoe, a basket for catching the shoe and removing it to a position remote from the operating station, said basket being movable in a direction opposite to the direction of movement of the carrier member, and means on said carrier member for returning the basket into position to receive another shoe.

88. In a machine for applying pressure to shoe bottoms, the combination of an endless carrier, a plurality of pads on the carrier for applying pressure to shoes and soles, means for moving the carrier intermittently to present the pads in turn at an operating station, jacks for introducing shoes and soles on each pad, each jack having shoe engaging abutments arranged to swing transversely of the pad to position a shoe thereon, springs for causing the abutments to swing into an outwardly inclined position automatically upon the release of pressure on the shoe, thereby ejecting the shoe, a basket for catching the shoe as it is ejected and moving it away from the operating station, said basket being normally pivoted in an upright position on a movable frame but being arranged under the weight of a shoe to rotate about its pivot into a downwardly inclined position, a weight connected to the frame for moving it in a direction opposite to the direction of movement of the carrier member when the basket has been rotated by a shoe into an inclined position, and means on the carrier member for engaging the frame when the basket is located in an upright position and moving it therewith to return and hold the basket in shoe receiving position.

89. In a machine for applying pressure to shoe bottoms, the combination of a rotary turret, a plurality of pads on the turret, means for rotating the turret intermittently to present the pads in turn at an operating station, a jack over each pad arranged to swing outwardly at the operating station to permit a shoe to drop therefrom, a track parallel to the path of the turret edge, a carriage movable on said track, a basket mounted on the carriage, means constantly urging the carriage in one direction and means on the turret for engaging the carriage and moving it in the other direction, and means operated by contact of a shoe with the basket for releasing the carriage from engagement with the turret, thereby permitting the basket to move the shoe away from the operating station.

90. In a machine for applying pressure to shoe bottoms, the combination of a rotary turret, a plurality of pads on the turret for applying pressure to shoes and soles, means for rotating the turret intermittently to present the pads in turn at an operating station, jacks for introducing a shoe and sole on each pad, each jack having shoe engaging abutments arranged to swing transversely of the pad from an outwardly inclined position into pressure receiving position to locate the shoe on the pad, said abutments being arranged to grip the shoe when it is located in pressure receiving position and to release and eject the shoe as they swing into said outwardly inclined position, springs for causing the abutments to swing outwardly when the pressure on the shoe is relieved, thereby ejecting the shoe from the abutments, and a basket held at the operating station by engagement with the turret for catching the shoe and automatically moving it into a position remote from the operating station, said basket being released from the turret by the weight of the shoe.

91. In a machine for applying pressure to shoe bottoms, the combination of a supporting column, a rotary turret mounted on the column, a plurality of pressure-applying pads carried by the turret, means for rotating the turret intermittently to present the pads in turn at an operating station, a jack for each pad provided with shoe engaging abutments arranged to swing transversely of the pad to place a shoe thereon and to grip the shoe during said swinging movement, said abutments ejecting the shoe upon release of pressure thereon, and a basket for catching each shoe as it drops from the abutments and for removing the shoe from the vicinity of the operating station, said basket being normally engaged by the turret and arranged to be released therefrom by the weight of the shoe, a weight for moving the basket in a direction opposite to the direction of rotation of the turret after a shoe has been deposited therein, and means on the turret for engaging the basket when the shoe is removed therefrom and returning said basket to the operating station upon the next rotation of the turret.

92. In a machine for applying pressure to shoe bottoms, the combination of a pad for applying pressure to a sole and shoe, a plurality of members for supporting the pad in operative position, connections between said members permitting angular adjustment of each member to conform the pad approximately to the longitudinal contour of a shoe bottom, and means engaging one of said members for holding all of said members in adjusted position.

93. In a machine for applying pressure to shoe bottoms, the combination of a pad for receiving a sole and shoe, separate members for supporting the forepart, shank and heel portions of said pad, said members being arranged for relative angular adjustment about axes extending transversely of the pad to conform the pad approximately to the longitudinal contour of a shoe bottom, and single means movable relatively to all of said members for effecting adjustment thereof simultaneously.

94. In a machine for applying pressure to shoe bottoms, the combination of a pad for receiving a sole and shoe, a plurality of members for supporting said pad, said members being arranged for relative angular adjustment about a plurality of axes extending transversely of the pad to conform the pad approximately to the longitudinal contour of a shoe bottom, and means movable longitudinally of the pad for supporting said members in adjusted position.

95. In a machine for applying pressure to shoe bottoms, the combination of a pad for receiving a sole and shoe, a plurality of interconnected movable members for supporting respectively the forepart, shank and heel portions of said pad, said members being arranged for relative angular adjustment about axes extending widthwise of the pad to conform the sole engaging surface thereof substantially to the longitudinal contour of a shoe bottom, and means independent of said members and movable longitudinally relatively to the pad for maintaining said members in different adjusted positions.

96. In a machine for applying pressure to shoe bottoms, the combination of a pad for receiving a sole and shoe, a plurality of sections for supporting said pad, said sections being adjustable relatively to each other about axes extending transversely of the pad to conform the exposed surface thereof substantially to the longitudinal contour of a shoe bottom, a member for supporting said sections in different adjusted positions, said member being movable longitudinally of said sections, and means for maintaining said member in supporting position when the sections have been adjusted.

97. In a machine for applying pressure to shoe bottoms, the combination of a pad for receiving a sole and shoe, means for supporting said pad comprising separate members at the forepart, shank and heel portions of the pad which are adjustable about axes extending widthwise of the pad to conform it approximately to the longitudinal contour of a shoe bottom, and a slide movable longitudinally of the pad and engaging only the forepart member for holding all of said members in adjusted position.

98. In a machine for applying pressure to shoe bottoms, the combination of a pad for receiving a sole and shoe, means for supporting said pad comprising separate members located at the forepart, shank and heel portions of the pad and pivotally connected together to permit relative angular adjustment thereof about transverse axes to conform the pad approximately to the longitudinal contour of a shoe bottom, and single means for adjusting all of said members and maintaining them in adjusted position.

99. In a machine for applying pressure to shoe bottoms, the combination of a pad for receiving a sole and shoe, separate members for supporting the forepart, shank and heel portions of the pad, said members being pivotally connected together and arranged for relative angular adjustment about axes extending transversely of the pad, means movable longitudinally of the pad for supporting the pivot which connects the forepart and shank members in different heightwise positions to locate said members substantially in accordance with the longitudinal contours of corresponding portions of different shoes, and means for always maintaining the heel supporting member in a substantially horizontal position.

100. In a machine for applying pressure to shoe bottoms, the combination of a pad having an exposed surface for receiving a sole and shoe, separate members for supporting the forepart, shank and heel portions of the pad, said members being pivotally connected together for relative angular adjustment about axes parallel to the pad supporting surfaces of said members and extending widthwise thereof, thereby permitting the exposed surface of the pad to be conformed substantially to the longitudinal contour of a shoe bottom, and a slide movable longitudinally of the pad for holding said members in various adjusted positions, said slide having inclined surfaces provided with depressions at different heights for engaging the forepart member and supporting all of said members in different angular positions.

101. In a machine for applying pressure to shoe bottoms, the combination of a pad for receiving a sole and shoe, pivotally connected members for supporting the forepart, shank and heel portions of the pad, a fixed axis for the forepart member, means movable relatively to all said supporting members for holding said forepart member in different angular positions to conform the forepart of the pad to the toe spring of a shoe mounted thereon, a movable axis for supporting the joint between the shank and heel members, and a slot and pin arrangement at the other end of the heel member for permitting longitudinal movement thereof when the forepart member is adjusted about its fixed axis.

102. In a machine for applying pressure to shoe bottoms, the combination of a pad for receiving a sole and shoe, a plurality of members for supporting the pad in shoe receiving position, said members being pivotally connected together and arranged for relative angular adjustment about horizontal axes extending transversely of the pad to permit the pad to be conformed substantially to the longitudinal contour of a shoe bottom, a slide engaging one of said members and provided with steps of different heights for holding said member in different angular positions, and means for movably supporting the other members to permit such adjustment.

103. In a machine for applying pressure to shoe bottoms, the combination of a pad for receiving a sole and shoe, separate members for supporting the forepart, shank and heel portions of the pad, said members being pivotally connected together and adjustable about axes extending transversely of the pad, means movable longitudinally of the pad for supporting the pivot connecting the forepart and shank members in different heightwise positions to locate said members in accordance with the longitudinal contours of corresponding portions of different shoes, and a link for supporting the joint between the shank and heel members to permit longitudinal movement of said members when the pivot between the forepart and shank members is adjusted heightwise.

104. In a machine for applying pressure to shoe bottoms, the combination of a pad for receiving a sole and shoe, members for supporting the forepart, shank and heel portions of the pad, said members being pivotally connected together and arranged for relative angular adjustment about axes extending transversely of the pad to conform the sole engaging surface thereof substantially to the contour of a shoe bottom, a slide having grooves located thereon at different distances from its base for supporting the pivot between the forepart and shank members in different heightwise positions thereby adjusting said members angularly in accordance with the bottom contours of different shoes, means for supporting the shank and heel members for bodily movement longitudinally of the pad to permit angular adjustment of said forepart and shank members, and means for maintaining said heel member in a substantially horizontal position during its longitudinal movement.

105. In a machine for applying pressure to shoe bottoms, the combination of a pad for receiving a sole and shoe, a pad box for said pad comprising a plurality of members for supporting the forepart, shank and heel portions of the pad, said members being pivotally connected together and arranged for relative angular adjustment about axes extending transversely of the pad to conform the sole engaging surface thereof substantially to the longitudinal contour of a shoe bottom, a slide member for determining the angular adjustment of the forepart member about its axis to position said member in accordance with the toe spring of the shoe, said slide member being movable longitudinally of the pad, a spring for holding said member in the operative position, and means for supporting the other members for bodily movement longitudinally of the pad to permit angular adjustment of said forepart member.

106. In a machine for applying pressure to shoe bottoms, the combination of a pad for receiving a sole and shoe comprising a resilient member for engaging the sole and an expansible member arranged to be expanded to force said resilient member against the shoe bottom, means for expanding said expansible member, and means for controlling the expansion of a portion of said member.

107. In a machine for applying pressure to shoe bottoms, the combination of a pad for receiving a sole and shoe comprising a resilient member for engaging the sole and an expansible member arranged to be expanded to force said resilient member against the shoe bottom, means for expanding said expansible member, and means for preventing the expansion of a portion of said member at will and thereby controlling the pressure applied to a corresponding portion of the shoe bottom.

108. In a machine for applying pressure to shoe bottoms, the combination of a pad for receiving a sole and shoe comprising a molded resilient member for engaging the sole and shoe and a distortable member supporting said resilient member and arranged to be distorted by internal pressure to force said resilient member against the shoe bottom and thereby apply pressure to the shoe bottom, means for distorting said distortable member, and means for preventing distortion of a predetermined area of said member so that the portion of the resilient member supported thereby will not be forced against the shoe bottom.

109. In a machine for applying pressure to shoe bottoms, the combination of a pad for receiving a sole and shoe comprising a member of relatively soft resilient material for engaging the sole and an inflatable bag underlying said member and arranged to be inflated to force the latter against the shoe bottom to apply pressure thereto, means for inflating said bag to apply pressure to the entire shoe bottom, and means for preventing the inflation of a portion of the bag so that no substantial pressure will be applied to a corresponding portion of the shoe bottom.

110. In a machine for applying pressure to shoe bottoms, the combination of a pad for receiving a sole and shoe comprising a sole engaging member of relatively soft resilient material and an inflatable bag supporting said member, said bag having a relatively shallow chamber arranged to be inflated to press said member against the shoe bottom and thereby apply pressure thereto, means for admitting fluid under pressure to said bag to cause it to become inflated, and means for preventing inflation of the heel portion of the bag so that no substantial pressure will be applied to the heel portion of the shoe.

111. In a machine for applying pressure to shoe bottoms, the combination of a pad for receiving a sole and shoe comprising a sole engaging member of resilient material and an inflatable bag of rubber underlying said resilient member and arranged when inflated to force said member against the shoe bottom to apply pressure thereto, said bag having a relatively shallow chamber extending the full length thereof and divided at the heel portion by a relatively thick transverse wall to form separate compartments, a passage connecting said compartments, means for introducing fluid under pressure into the forward compartment to inflate the forepart, shank and heel portions of the bag and thereby apply pressure to the entire shoe bottom, and means for closing the passage connecting the compartments at will to prevent inflation of the heel portion of the bag and thereby prevent any substantial pressure from being applied to the heel portion of the shoe bottom.

112. In a machine for applying pressure to shoe bottoms, the combination of a pad for receiving a sole and shoe comprising a resilient member for engaging the sole and shoe and an inflatable bag underlying said resilient member and arranged to be inflated to force the latter against the shoe bottom, said bag having a shallow chamber divided at the heel portion by a thick transverse wall which separates the chamber into a forward and a heel compartment, a rubber projection underlying a portion of each compartment, a passage in the projection connecting said compartments, means for forcing fluid under pressure into the forward compartment and, through the passage, into the heel compartment, and a clamp for squeezing the rubber projection and closing the passage at will, thereby preventing fluid from entering the heel compartment so that when desired there will be no inflation of that portion of the bag and no consequent wrapping of the sole margin about the heel portion of the shoe bottom.

113. In a machine for applying pressure to shoe bottoms, the combination of a pad for receiving a sole and shoe comprising a resilient sole engaging member having at its periphery a substantially perpendicular flange, an inflatable bag located within said flange and provided with a relatively shallow chamber, a thick transverse wall connecting the top and bottom walls of the chamber and dividing it into two separate compartments located respectively at the forepart and shank portions of the pad and at the heel portion of the pad, and an integral rubber projection underlying said wall and provided with a passage connecting said compartments, means for forcing fluid under pressure into the forepart and shank compartment and to the heel compartment through said passage, means including a movable block for squeezing the rubber projection to close the passage connecting said compartments, and manually-operated means for moving the block.

114. In a machine for applying pressure to shoe bottoms, the combination of a pad for applying pressure to a sole and shoe, a jack for holding the shoe, said jack being constructed and arranged to swing transversely of the pad into and out of operative position, and means for swinging the jack out of operative position when pressure on the shoe is relieved to permit the shoe to drop from the jack.

115. In a machine for applying pressure to shoe bottoms, the combination of a pad for applying pressure to a sole and shoe, a jack arranged for swinging movement relatively to the pad for introducing a shoe on the pad and removing it therefrom, means for swinging the jack relatively to the pad to remove the shoe from the pad, and means for releasing the shoe from the jack after the jack has removed it from the pad to permit the shoe to drop from said jack.

116. In a machine for applying pressure to shoe bottoms, the combination of a pad for applying pressure to a sole and shoe, a jack for holding the shoe, said jack being constructed and arranged to swing transversely of the pad to introduce a shoe thereon and to remove the shoe therefrom, and automatic means for swinging the jack transversely to remove the shoe from the pad when pressure is relieved on the shoe, thereby permitting the shoe to drop from the jack.

117. In a machine for applying pressure to shoe bottoms, the combination of an inflatable pad for applying pressure to a sole and shoe, separate members for supporting the forepart, shank and heel portions of the pad, means connecting said members to each other located substantially in the plane of the sole-engaging surface of the pad, and means for causing said members to pivot about said connecting means thereby conforming said surface to the longitudinal contour of a shoe bottom.

SIDNEY J. FINN.